(12) United States Patent
Radow et al.

(10) Patent No.: US 7,833,135 B2
(45) Date of Patent: Nov. 16, 2010

(54) STATIONARY EXERCISE EQUIPMENT

(75) Inventors: Scott B. Radow, 1521 Alton Rd., #272, Miami Beach, FL (US) 33139; David A. Blau, Cupertino, CA (US)

(73) Assignee: Scott B. Radow, Miami Beach, FL (US)

( * ) Notice: Subject to any disclaimer, the term of this patent is extended or adjusted under 35 U.S.C. 154(b) by 213 days.

(21) Appl. No.: 12/147,694

(22) Filed: Jun. 27, 2008

(65) Prior Publication Data

US 2009/0011907 A1 Jan. 8, 2009

Related U.S. Application Data

(60) Provisional application No. 60/946,568, filed on Jun. 27, 2007.

(51) Int. Cl.
*A63B 22/06* (2006.01)
*A63B 69/16* (2006.01)

(52) U.S. Cl. .................................. 482/57; 482/4; 482/8

(58) Field of Classification Search ............... 482/3, 482/4, 8, 9, 51, 52, 54, 900–901
See application file for complete search history.

(56) References Cited

U.S. PATENT DOCUMENTS

| 3,375,717 A | 4/1968 | Impellizzeri et al. |
| 3,589,193 A | 6/1971 | Thornton |
| 3,859,840 A | 1/1975 | Gause |
| 3,903,613 A | 9/1975 | Bisberg |
| 3,964,742 A | 6/1976 | Carnielli |
| 4,060,239 A | 11/1977 | Pfleiderier et al. |
| 4,084,810 A | 4/1978 | Forsman |
| 4,235,437 A | 11/1980 | Ruis et al. |

(Continued)

FOREIGN PATENT DOCUMENTS

DE    32 18 086 A1    12/1983

(Continued)

OTHER PUBLICATIONS

"A Unified Treatment of Elastostatic Contact Simulation for Real Time Haptics", Doug James and Dinesh Pai, vol. 2, No. 1, Sep. 27, 2001.

(Continued)

*Primary Examiner*—Steve R Crow
(74) *Attorney, Agent, or Firm*—Price, Heneveld, Cooper, DeWitt & Litton, LLP

(57) ABSTRACT

A control system and method for exercise equipment and the like provides a way to simulate a physical activity in a manner that takes into account the physics of the physical activity being simulated to provide an accurate simulation. According to one aspect of the present invention, the control system and method takes into account the physics of the corresponding physical activity to generate a virtual or predicted value of a variable such as velocity, acceleration, force, or the like. The difference between the virtual or expected physical variable and a measured variable is used as a control input to control resistance forces of the exercise equipment in a way that causes the user to experience forces that are the same or similar to the forces that would be encountered if the user were actually performing the physical activity being simulated rather than using the exercise equipment.

78 Claims, 38 Drawing Sheets

U.S. PATENT DOCUMENTS

| | | | |
|---|---|---|---|
| 4,358,105 A | 11/1982 | Sweeney, Jr. | |
| 4,542,897 A | 9/1985 | Melton et al. | |
| 4,571,680 A * | 2/1986 | Wu | 377/24.2 |
| 4,600,016 A | 7/1986 | Boyd et al. | |
| 4,613,129 A | 9/1986 | Schroeder | |
| 4,642,070 A | 2/1987 | Walker | |
| 4,647,039 A | 3/1987 | Noffsinger | |
| 4,678,182 A | 7/1987 | Nakao et al. | |
| 4,687,195 A | 8/1987 | Potts | |
| 4,687,196 A | 8/1987 | Dubrinsky et al. | |
| 4,709,917 A | 12/1987 | Yang | |
| 4,775,145 A | 10/1988 | Tsuyama | |
| 4,817,938 A | 4/1989 | Nakao et al. | |
| 4,822,036 A | 4/1989 | Dang | |
| 4,822,037 A | 4/1989 | Makansi et al. | |
| 4,824,104 A | 4/1989 | Bloch | |
| 4,869,497 A | 9/1989 | Stewart et al. | |
| 4,880,230 A | 11/1989 | Cook | |
| 4,890,495 A | 1/1990 | Slane | |
| 4,891,764 A | 1/1990 | McIntosh | |
| 4,934,692 A | 6/1990 | Owens | |
| 4,938,475 A | 7/1990 | Sargeant et al. | |
| 4,941,652 A | 7/1990 | Nagano et al. | |
| 4,958,831 A | 9/1990 | Kim | |
| 4,976,424 A | 12/1990 | Sargeant et al. | |
| 4,998,725 A | 3/1991 | Watterson et al. | |
| 5,018,726 A | 5/1991 | Yorioka | |
| 5,027,303 A | 6/1991 | Witte | |
| 5,067,710 A | 11/1991 | Watterson | |
| 5,070,816 A | 12/1991 | Wehrell | |
| 5,154,677 A | 10/1992 | Ito | |
| 5,163,886 A | 11/1992 | Seol | |
| 5,181,904 A | 1/1993 | Cook et al. | |
| 5,215,468 A * | 6/1993 | Lauffer et al. | 434/236 |
| 5,230,673 A | 7/1993 | Maeyama et al. | |
| 5,234,392 A | 8/1993 | Clark | |
| 5,242,339 A | 9/1993 | Thornton | |
| 5,256,115 A | 10/1993 | Scholder et al. | |
| 5,259,611 A | 11/1993 | Dalebout et al. | |
| 5,267,925 A | 12/1993 | Boyd | |
| 5,312,311 A | 5/1994 | Pearson | |
| 5,318,487 A | 6/1994 | Golen et al. | |
| 5,324,242 A | 6/1994 | Lo | |
| 5,382,207 A | 1/1995 | Skowronski et al. | |
| 5,466,203 A | 11/1995 | Chen | |
| 5,470,293 A | 11/1995 | Schönenberger | |
| 5,492,513 A | 2/1996 | Wang | |
| 5,545,112 A | 8/1996 | Densmore et al. | |
| 5,562,572 A | 10/1996 | Carmein | |
| 5,577,598 A | 11/1996 | Schonenberger | |
| 5,580,249 A | 12/1996 | Jacobsen et al. | |
| 5,583,403 A | 12/1996 | Anjanappa et al. | |
| 5,587,937 A | 12/1996 | Massie et al. | |
| 5,625,576 A | 4/1997 | Massie et al. | |
| 5,690,591 A | 11/1997 | Kenmochi et al. | |
| 5,704,253 A | 1/1998 | Book et al. | |
| 5,738,612 A | 4/1998 | Tsuda | |
| 5,768,702 A * | 6/1998 | Kim | 2/1 |
| 5,779,596 A | 7/1998 | Weber | |
| 5,872,438 A | 2/1999 | Roston | |
| 5,888,172 A | 3/1999 | Andrus et al. | |
| 5,898,599 A | 4/1999 | Massie et al. | |
| 5,919,115 A | 7/1999 | Horowitz et al. | |
| 5,947,869 A | 9/1999 | Shea | |
| 5,952,796 A | 9/1999 | Colgate et al. | |
| 5,980,256 A | 11/1999 | Carmein | |
| 5,984,880 A | 11/1999 | Lander et al. | |
| 6,028,593 A | 2/2000 | Rosenberg et al. | |
| 6,050,822 A | 4/2000 | Faughn | |
| 6,050,920 A | 4/2000 | Ehrenfried | |
| 6,056,670 A | 5/2000 | Shu et al. | |
| 6,059,696 A | 5/2000 | Bohmer et al. | |
| 6,066,075 A | 5/2000 | Poulton | |
| 6,126,571 A | 10/2000 | Parks | |
| 6,126,575 A | 10/2000 | Wang | |
| 6,142,913 A | 11/2000 | Ewert | |
| 6,147,674 A | 11/2000 | Rosenberg et al. | |
| 6,152,854 A | 11/2000 | Carmein | |
| 6,162,151 A | 12/2000 | Tani et al. | |
| 6,162,189 A | 12/2000 | Girone et al. | |
| 6,171,218 B1 | 1/2001 | Shea | |
| 6,231,527 B1 | 5/2001 | Sol | |
| 6,251,048 B1 | 6/2001 | Kaufman | |
| 6,267,709 B1 | 7/2001 | Jacques et al. | |
| 6,356,848 B1 | 3/2002 | Cote et al. | |
| 6,366,272 B1 | 4/2002 | Rosenberg et al. | |
| 6,405,158 B1 | 6/2002 | Massie et al. | |
| 6,418,797 B1 | 7/2002 | Ambrosina et al. | |
| 6,436,008 B1 | 8/2002 | Skowronski et al. | |
| 6,450,922 B1 | 9/2002 | Henderson et al. | |
| 6,454,679 B1 | 9/2002 | Radow | |
| 6,464,618 B1 | 10/2002 | Shea | |
| 6,475,115 B1 | 11/2002 | Candito et al. | |
| 6,482,128 B1 | 11/2002 | Michalow | |
| 6,527,674 B1 * | 3/2003 | Clem | 482/8 |
| 6,527,681 B2 | 3/2003 | Tacx | |
| 6,554,252 B2 | 4/2003 | Kazerooni et al. | |
| 6,572,511 B1 * | 6/2003 | Volpe | 482/4 |
| 6,593,710 B2 | 7/2003 | Reck | |
| 6,605,021 B2 | 8/2003 | Kobayashi et al. | |
| 6,607,471 B2 | 8/2003 | Reck | |
| 6,634,992 B1 | 10/2003 | Ogawa | |
| 6,652,425 B1 | 11/2003 | Martin et al. | |
| 6,659,917 B1 | 12/2003 | Tacx | |
| 6,676,569 B1 | 1/2004 | Radow | |
| 6,730,003 B1 | 5/2004 | Phillips | |
| 6,736,762 B2 | 5/2004 | Chen | |
| 6,749,537 B1 | 6/2004 | Hickman | |
| 6,786,848 B2 | 9/2004 | Yamashita et al. | |
| 6,827,579 B2 | 12/2004 | Burdea et al. | |
| 6,852,068 B2 | 2/2005 | Ogawa | |
| 6,853,965 B2 | 2/2005 | Massie et al. | |
| 6,918,860 B1 | 7/2005 | Nusbaum | |
| 6,921,351 B1 | 7/2005 | Hickman et al. | |
| 6,930,590 B2 | 8/2005 | Ling et al. | |
| 7,004,888 B1 | 2/2006 | Weng | |
| 7,027,055 B2 | 4/2006 | Anderson et al. | |
| 7,033,176 B2 | 4/2006 | Feldman et al. | |
| 7,039,866 B1 | 5/2006 | Rosenberg et al. | |
| 7,044,891 B1 | 5/2006 | Rivera | |
| 7,047,817 B2 | 5/2006 | Lanham | |
| 7,050,050 B2 | 5/2006 | Tackett | |
| 7,066,865 B2 | 6/2006 | Radow | |
| 7,090,620 B1 | 8/2006 | Barlow | |
| 7,094,184 B1 | 8/2006 | Chen et al. | |
| 7,097,596 B2 | 8/2006 | Yang | |
| 7,113,166 B1 | 9/2006 | Rosenberg et al. | |
| 7,158,112 B2 | 1/2007 | Rosenberg et al. | |
| 7,163,490 B2 | 1/2007 | Chen | |
| 7,205,981 B2 | 4/2007 | Cunningham | |
| 7,220,219 B2 | 5/2007 | Papadopoulos et al. | |
| 7,257,468 B1 | 8/2007 | Costa et al. | |
| 7,311,640 B2 | 12/2007 | Baatz | |
| 7,354,380 B2 * | 4/2008 | Volpe, Jr. | 482/4 |
| 2001/0011052 A1 | 8/2001 | Shu et al. | |
| 2001/0019985 A1 | 9/2001 | Reck | |
| 2001/0036883 A1 | 11/2001 | Suzuki | |
| 2002/0013197 A1 | 1/2002 | Tacx | |
| 2002/0016236 A1 | 2/2002 | Stearns et al. | |
| 2002/0077221 A1 | 6/2002 | Dalebout | |
| 2002/0147079 A1 | 10/2002 | Kalnbach | |
| 2003/0013995 A1 | 1/2003 | Oshima et al. | |
| 2003/0073546 A1 | 4/2003 | Lassanske et al. | |
| 2004/0034282 A1 | 2/2004 | Quaid, III | |

| | | | |
|---|---|---|---|
| 2004/0034283 A1 | 2/2004 | Quaid, III | |
| 2004/0034302 A1 | 2/2004 | Abovitz et al. | |
| 2004/0034795 A1 | 2/2004 | Anderson et al. | |
| 2004/0036721 A1 | 2/2004 | Anderson et al. | |
| 2004/0040805 A1 | 3/2004 | Bailey | |
| 2004/0106502 A1 | 6/2004 | Sher | |
| 2004/0106916 A1 | 6/2004 | Quaid et al. | |
| 2005/0014610 A1 | 1/2005 | Wu | |
| 2005/0024331 A1 | 2/2005 | Berkley et al. | |
| 2005/0107221 A1 | 5/2005 | Vohryzka | |
| 2005/0142525 A1 | 6/2005 | Cotin et al. | |
| 2005/0148432 A1 | 7/2005 | Carmein | |
| 2005/0219228 A1 | 10/2005 | Alameh et al. | |
| 2005/0222830 A1 | 10/2005 | Massie et al. | |
| 2005/0227823 A1 | 10/2005 | Liao | |
| 2005/0233285 A1 | 10/2005 | Miyamaru et al. | |
| 2005/0264527 A1 | 12/2005 | Lin | |
| 2006/0003872 A1 | 1/2006 | Chiles et al. | |
| 2006/0030383 A1 | 2/2006 | Rosenberg et al. | |
| 2006/0064223 A1 | 3/2006 | Voss | |
| 2006/0094569 A1 | 5/2006 | Day | |
| 2006/0106326 A1 | 5/2006 | Krebs et al. | |
| 2006/0166790 A1 | 7/2006 | Wang | |
| 2006/0179837 A1 | 8/2006 | Buerger et al. | |
| 2006/0180225 A1 | 8/2006 | Buerger et al. | |
| 2006/0190093 A1 | 8/2006 | Buerger et al. | |
| 2006/0234840 A1 | 10/2006 | Watson et al. | |
| 2006/0281606 A1 | 12/2006 | Radow | |
| 2006/0293617 A1 | 12/2006 | Einav et al. | |
| 2007/0010772 A1 | 1/2007 | Ryan | |
| 2007/0013655 A1 | 1/2007 | Rosenberg et al. | |
| 2007/0023244 A1 | 2/2007 | Carlson et al. | |
| 2007/0049461 A1* | 3/2007 | Kim et al. | 482/8 |
| 2007/0066918 A1 | 3/2007 | Dewald et al. | |
| 2007/0082788 A1 | 4/2007 | Ciervo | |
| 2007/0232465 A1 | 10/2007 | Puzey | |
| 2007/0249468 A1 | 10/2007 | Chen | |
| 2007/0259756 A1 | 11/2007 | Kuykendall | |
| 2007/0275831 A1 | 11/2007 | Yoshida et al. | |
| 2008/0139307 A1* | 6/2008 | Ueshima et al. | 463/31 |
| 2009/0062080 A1* | 3/2009 | Guy et al. | 482/52 |
| 2009/0131224 A1* | 5/2009 | Yuen | 482/3 |
| 2009/0253558 A1* | 10/2009 | Lofgren et al. | 482/51 |
| 2009/0298651 A1* | 12/2009 | Stewart | 482/52 |
| 2010/0075806 A1* | 3/2010 | Montgomery | 482/8 |

FOREIGN PATENT DOCUMENTS

| | | |
|---|---|---|
| DE | 203 11 319 U1 | 11/2003 |
| NL | 1008474 C | 9/1999 |
| NL | 1019154 | 4/2003 |
| WO | WO 96/36399 | 11/1996 |
| WO | WO 01/24892 A2 | 4/2001 |

OTHER PUBLICATIONS

"Haptic Rendering of Cutting: A Fracture Mechanics Approach", Mohsen Mahvash and Vincent Hayward, vol. 2, No. 3, Nov. 20, 2001.

"Kane's Equations for Haptic Display of Multibody Systems", R. Brent Gillespie, vol. 3, No. 2, Aug. 18, 2003.

"Design and Performance of a Tactile Shape Display Using RC Servomotors (Short Paper)", C.R. Wagner, S.J. Lederman, R.D. Howe, vol. 3, No. 4, Aug. 6, 2004.

"Haptic Simulation of Linear Elastic Media with Fluid Inclusions", A.H. Gosline, S.E. Salcudean, J. Yan, vol. 3, No. 5, Mar. 30, 2005.

"The construction of a Haptic application in a Virtual Environment as a post-Stroke arm Rehabilitation exercise", Ulrika Dreifaldt & Erik Lövquist, Mar. 23, 2006.

"Arm wrestling with the robots", William Harwin, Department of Cybernetics, University of Reading, In association with The Oxford Trust for Venturefest 2004, http://www.person.

Comprehensive Power Meter Review—One Geek Perspective, Take Two, http://www..biketechreview.com/archive/pm_review.htm, Kraig Willet, Mar. 5, 2003.

Performance Measures for Haptic Interfaces, Vincent Hayward and Oliver R. Astley, 1996, pp. 1-20.

Closed-Loop Force Control for Haptic Simulation of Virtual Environments, Craig R. Carignan and Kevin R. Cleary, Haptics-e, vol. 1, No. 2, pp. 1-14, published Feb. 23, 2000.

The Mechanical Efficiency of Treadmill Running Against a Horizontal Impeding Force, B.B. Lloyd & R.M. Zacks, J. Physiol. 1972, 223: pp. 355-363.

Simulation of a Sprinter, Part I. Development of a Model, C.L. Vaughan, Int. J. Biomed. Comput. Jan. 1993; 14(1), pp. 65-74.

Simulation of a Sprinter, Part II. Implementation on a Programmable Calculator, C.L. Vaughan, Int. J. Biomed. Comput., Jan. 1983; 14(1): pp. 75-83.

Neural Adaptations with Chronic Physical Activity, R.M. Enoka, J. Biomechanics 1997, 30(5), pp. 447-454.

Force-Velocity Relations in Human Skeletal Muscle, R.W. Guelch, Int. J. Sports Med. 1994, 15, pp. S2-S10.

Neuromuscular Adaptation during Strength Training, Aging, Detraining, and Immbolization, K. Hakkinen, Crit. Rev. in Physical and Rehab. Med. 1994, 6(3): pp. 161-198.

"Control of Smart Exercise Machines—Part I: Problem Formulation and Nonadaptive Control", Perry Y. Li and Roberto Horowitz, vol. 2, No. 4, Dec. 1997.

* cited by examiner

FIG. 14

BASIC EQUATION OF MOTION: V(UPDATE) = V + [(Fa-Ff) - m1*GSIN)](Tinc/m1*).
BIKE EQUATION: V(UPDATE) = V + [Fa-Fd)-(m1+m2) gsine - 0.5 C₁ρQV²] (Tinc/(m1+m2))

| | | Variable | Description | Notes | | | |
|---|---|---|---|---|---|---|---|
| INPUT VARIABLES | | m1 | MASS OF SUBJECT | | | | |
| | | Q | CROSS-SECTIONAL AREA OF SUBJECT | SEE NOTES FOR CALCULATING | 0.4 TO 0.7 IS TYPICAL | | |
| | | m2 | MASS OF LOAD (e.g., ENTIRE BIKE) | APPROX. = 10 KG | | | |
| | | Fd | ADDITIONAL DRAG OF BIKE (ROLLING RESISTANCE + WHEEL ROTATION + DRAG FORCE FRONT & REAR WHEELS) | | | | |
| | | | (Sn (M1+M2) + 4Ifw/Dfw² + 4I rw/drw²) + (Cxofw ρV Dfw²/8) + (Cx0rwρV Drw²(1-RS)/8)) | | | | |
| | | | Crr = COEFFICIENT OF ROLLING RESISTANCE | CRR = .0024 TO .005 | | | |
| | | | Ifw = ROTATIONAL INERTIAL FRONT WHEEL | STD. RIM 36 SPOKE = 0.0885 | | | |
| | | | Irw = ROTATIONAL INERTIAL REAR WHEEL | STD. RIM 36 SPOKE = 0.1085 | | | |
| | | | dfw = DIAMETER OF FRONT WHEEL | .674M | | | |
| | | | drw = DIAMETER OF REAR WHEEL | .674M | | | |
| | | | Cx0fw = COEFFICIENT OF DRAG FRONT WHEEL | CONVENTIONAL = 0.0491 | | | |
| | | | Cx0rw = COEFFICIENT OF DRAG REAR WHEEL | CONVENTIONAL = 0.0491 | | | |
| | | | RS = EFFECT OF REAR WHEEL SHIELDING BY BIKE FRAME TUBE | 25% | | | |
| | | D_T OR T_T | TERMINATION VARIABLE (D = DISTANCE T = DURATION) | | 1500 M = 1.056 | 3000 M = 0.905 | |
| | | ρ | AIR DENSITY | SEA LEVEL = 1.226 KG/M3 | | | |
| CALCULATED VARIABLES | | C1 | DRAG COEF. OF SUBJECT | | | | |
| MEASURED DATA | | V | VELOCITY | | | | |
| | | Fa | FORCE (AFT) | | | | |
| CALCULATED DATA | | D | DISTANCE | | | | |
| | | V(UPDATE) | VELOCITY | | | | |
| | | A | INITIAL ACCELERATION | | | | |

FIG. 28

GEAR ROLLOUT 50 GEARS

| CHAINRING/COG | DUPLICATES | GEAR | ROLLOUT |
|---|---|---|---|
| 53x11 | | 50 | 10.157 |
| 53x12 | | 49 | 9.310 |
| 53x13 | | 48 | 8.594 |
| 53x14 | | 47 | 7.980 |
| 39x11 | 53x15 | 46 | 7.474 |
| 39x12 | 53x16 | 45 | 6.851 |
| 39x13 | 53x17 | 44 | 6.324 |
| 39x14 | 53x18 | 43 | 5.872 |
| 39x15 | 53x19 | 42 | 5.481 |
| 39x16 | 53x21 | 41 | 5.138 |
| 39x17 | | 40 | 4.836 |
| 39x18 | 53x23 | 39 | 4.567 |
| 39x19 | | 38 | 4.327 |
| 39x20 | 53x25 | 37 | 4.111 |
| 39x21 | | 36 | 3.915 |
| 39x22 | 53x27, 53x29 | 35 | 3.737 |
| 39x23 | | 34 | 3.574 |
| 39x24 | 53x31, 53x32 | 33 | 3.426 |
| 39x25 | | 32 | 3.288 |
| 39x26 | 53x33, 53x35 | 31 | 3.162 |
| 30x27 | | 30 | 3.045 |
| 39x28 | 53x37 | 29 | 2.936 |
| 39x29 | | 28 | 2.835 |
| 39x30 | 53x41 | 27 | 2.740 |
| 39x31 | | 26 | 2.652 |
| 39x32 | | 25 | 2.569 |
| 39x33 | | 24 | 2.491 |
| 39x34 | 53x45 | 23 | 2.418 |
| 39x35 | | 22 | 2.349 |
| 39x36 | | 21 | 2.284 |
| 39x37 | | 20 | 2.222 |
| 39x38 | | 19 | 2.163 |
| 39x39 | | 18 | 2.108 |
| 39x40 | | 17 | 2.055 |
| 39x41 | | 16 | 2.005 |
| 39x42 | | 15 | 1.957 |
| 39x43 | | 14 | 1.912 |
| 39x44 | | 13 | 1.868 |
| 39x45 | | 12 | 1.827 |
| 30x35 | | 11 | 1.807 |
| 30x36 | | 10 | 1.757 |
| 30x37 | | 9 | 1.709 |
| 30x38 | | 8 | 1.664 |
| 30x39 | | 7 | 1.622 |
| 30x40 | | 6 | 1.581 |
| 30x41 | | 5 | 1.542 |
| 30x42 | | 4 | 1.506 |
| 30x43 | | 3 | 1.471 |
| 30x44 | | 2 | 1.437 |
| 30x45 | | 1 | 1.405 |

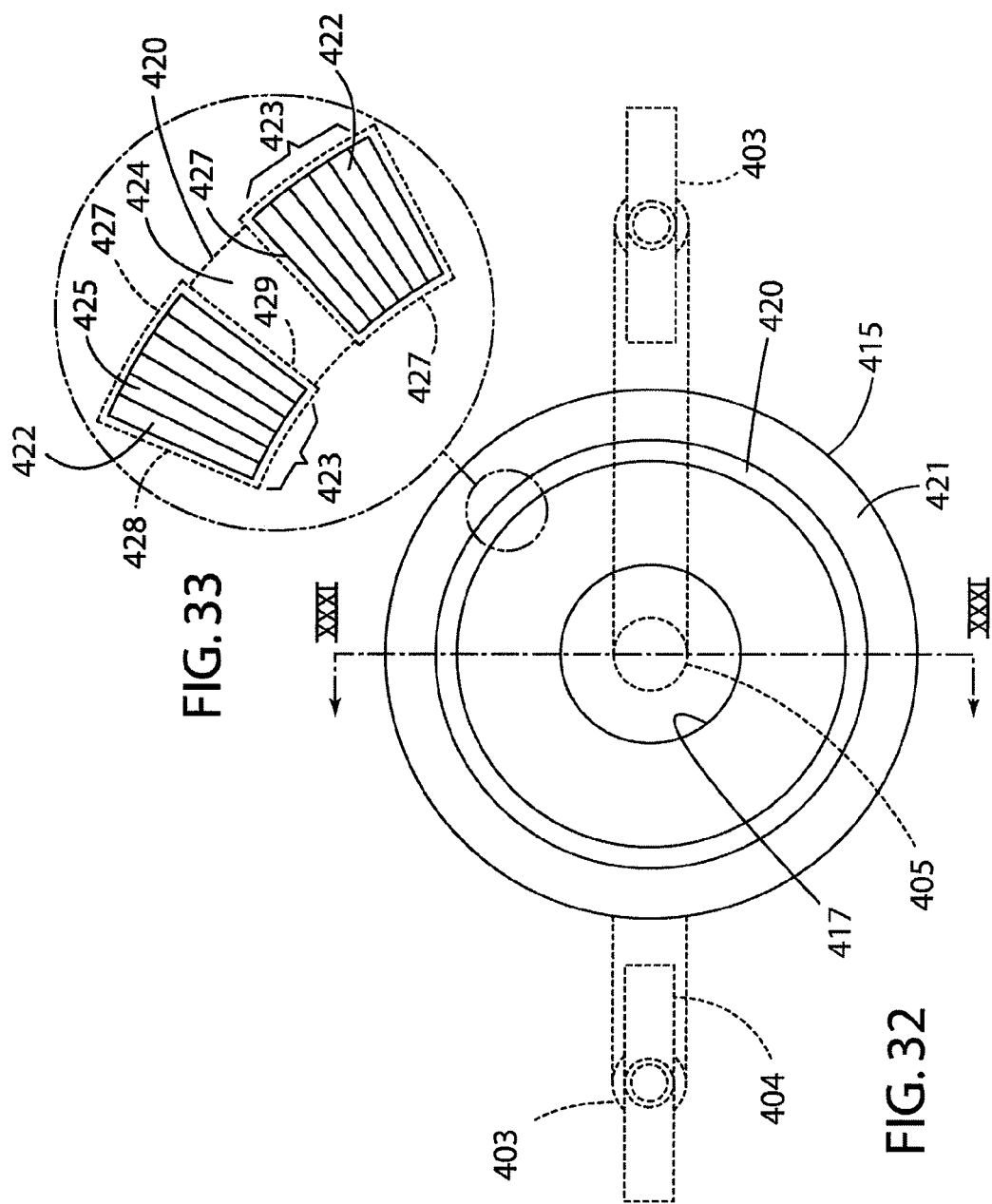

STATIONARY EXERCISE EQUIPMENT

CROSS REFERENCE TO RELATED APPLICATIONS

This application claims the benefit of U.S. Provisional Application No. 60/946,568, filed on Jun. 27, 2007, entitled STATIONARY EXERCISE EQUIPMENT, the entire contents of which are incorporated herein by reference.

BACKGROUND OF THE INVENTION

Various types of exercise devices such as stationary bikes, treadmills, stair climbers, rowing machines, and the like, have been developed. Such exercise devices mimic a corresponding physical activity to some degree. For example, known stair climbing machines typically include movable foot supports that reciprocate to simulate to some degree the foot and leg motion encountered when climbing stairs. Known stationary bikes typically include a crank with pedals that rotate upon application of a force to the pedals by a user.

Various ways to control the forces generated by such exercise devices have been developed. Known control schemes include constant-force arrangements and constant-power arrangements. Also, some exercise devices vary the force required in an effort to simulate hills or the like encountered by a user. However, known control schemes/methods do not provide force feedback that realistically simulates the forces encountered when performing the actual physical activity to be simulated.

Accordingly, a control system and exercise device that alleviates the problems associated with known devices would be advantageous.

SUMMARY OF THE INVENTION

The present invention relates to a control system and method for exercise equipment and the like. The present invention provides a way to simulate a physical activity in a manner that takes into account the physics of the physical activity being simulated. According to one aspect of the present invention, the control system and method takes into account the physics of the corresponding physical activity to generate a virtual or predicted value of a variable such as velocity, acceleration, force, or the like. The difference between the virtual or expected physical variable and a measured variable is used as a control input to control resistance forces of the exercise equipment in a way that causes the user to experience as forces that are the same or similar to the forces that would be encountered if the user were actually performing the physical activity rather than using the exercise equipment.

One aspect of the present invention is a stationary bike including a support structure defining a front portion and a rear portion. The stationary bike includes a seat mounted to the support structure and a crank rotatably mounted to the support structure for rotation about an axis. The crank includes a pair of pedals that are movable along a generally circular path about the axis. The circular path defines a forward portion in front of the axis, and a rear portion in back of the axis. The stationary bike includes a control system having a force-generating device such as an alternator, mechanical device, or the like that is connected to the crank to vary a resistance force experienced by a user pedaling the stationary bike. A controller controls the force-generating device and will in many/most instances similar to riding an actual bike cause the resistance force experienced by a user to be greater in the forward portion of the circular path than in the rear portion of the path.

Another aspect of the present invention is a stationary bike that substantially simulates the pedaling effort of a moving bicycle. The stationary bike includes a support structure and a pedal movably mounted to the support structure. The pedal structure includes two pedals that move about an axis to define an angular velocity. Forces applied to the pedals by a user define user input forces. The stationary bike further includes a controller that is operably connected to the pedal structure to provide a variable resistance force restraining movement of the pedals in response to user input forces. The variable resistance force substantially emulates at least some of the effects of inertia that would be experienced by a rider of a moving bicycle.

Another aspect of the present invention is an exercise device including a support structure and a user interaction member movably connected to the support structure for movement relative to the support structure in response to application of a force to the user interaction member by a user. The exercise device further includes an alternator operably connected to the user interaction member. The alternator provides a variable force tending to resist movement of the user interaction member relative to the support structure. The variable force varies according to variations of a field current applied to the alternator, and the variable force is substantially free of undulations related to voltage ripple.

These and other features, advantages, and objects of the present invention will be further understood and appreciated by those skilled in the art by reference to the following specification, claims, and appended drawings.

BRIEF DESCRIPTION OF THE DRAWINGS

FIG. 14 is a table showing an equation of motion that may be utilized in a control system for controlling a stationary bike according to one aspect of the present invention;

FIG. 28 is a table showing an example of a gear rollout having 50 different rollouts;

FIG. 32;

FIG. 32 is a view of the force sensor of FIG. 31 taken along the line XXXII-XXXII; FIG. 31;

FIG. 33 is a partially fragmentary enlarged view of a portion of the force sensor of FIG. 32;

DETAILED DESCRIPTION OF THE PREFERRED EMBODIMENT

Figure 1C:
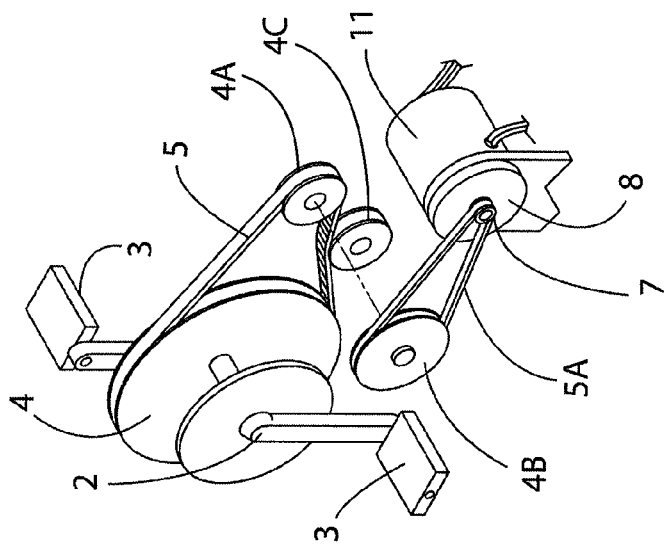
FIG. 1C is a partially fragmentary perspective view of a portion of the exercise device of FIG. 1.

The present application is related to U.S. Pat. No. 6,676,569, issued Jan. 13, 2004; U.S. Pat. No. 6,454,679, issued Sep. 24, 2002; and U.S. Pat. No. 7,066,865, issued Jun. 27, 2006; U.S. Pat. No. 7,608,015, issued on Oct. 27, 2009; and U.S. patent application Ser. No. 11/644,777, filed on Dec. 22, 2006, the entire contents of each are hereby incorporated by reference.

One aspect of the present invention is a control system/method for controlling an exercise device or the like. The control system/method can be utilized to simulate virtually any dynamic system. Another aspect of the present invention is an exercise device such as a stationary bike 1 (FIG. 1) that includes a dynamic system control that simulates riding a bicycle. The present invention provides a unique way to control an exercise device to more accurately simulate the dynamics of the exercise being simulated.

Various types of exercise equipment have been developed in an attempt to imitate the dynamics of conditions with which the exercising person is familiar. Such devices provide a very limited simulation of the actual activity. For example, stair climbing exercise equipment provides motion that is somewhat similar to that encountered when climbing stairs. Walking equipment (e.g., treadmills) provides a walking movement, and stationary exercise bikes provide leg movement that is similar to the leg movement when riding a "real" bicycle.

Although known exercise devices may provide a range of movement that is somewhat similar to that of an actual device or activity, known exercise devices do not accurately simulate the forces normally experienced by a user due to the dynamic effects of the activity, and the inability of these exercise devices to accurately simulate the Newtonian laws of motion.

Heretofore, known exercise equipment did not simulate the dynamics of the actual activity/device. Known exercise devices may include constant force, constant velocity or constant power control schemes. Such devices do not provide an accurate simulation of the actual device/activity. Thus, a new user will not be familiar with the equipment movement behavior, resulting in a less realistic and less effective experience, and not be as biodynamically correct. Also an inaccurate simulation may not provide proper loading for the user's muscles to maximize transference, or adaptation to the actual activity being trained. For example, the forces and speeds of walking equipment should accurately simulate the act of walking, since the human body is adapted for this form of exercise. Similarly, a stationary bike should recruit the muscles as appropriate for actual biking.

Familiarity with the equipment behavior is not the only advantage of making exercise equipment dynamically correct (i.e., accurately simulating the actual exercise). In order to provide optimum athletic advantage and performance for the user, the muscles of the exercising person should be challenged by the equipment in a way that requires the muscles to operate normally (i.e., in a natural manner). For example, the user's muscles may require periodic rest phases on each exercise stroke or cycle to produce normal blood flow and oxygenation of the muscles. Also, a user's perception of effort for a given amount of power may be minimized by using the muscles in a normal dynamic manner, and a user may thereby be able to exercise more effectively or longer with the same perceived effort if the machine provides accurate resistance forces simulating to actual physical activity.

Known exercise equipment may utilize motors, brakes, or other electrical devices or mechanical devices that provide resistance to the user. Such equipment typically includes mechanical devices that look and/or move somewhat like an actual activity. Known control schemes for exercise devices typically utilize constant force or constant torque, constant power, constant speed, or other simple control parameters to control levels or resistance settings of the exercise device. The human body, however, typically does not operate under such artificial load conditions. Typical muscle recruitment and resulting human movement creates inertial/momentum effects that may include high-output and low-output power on a given cycle or stroke during each exercise movement. For example, one type of stationary exercise bike utilizes a constant power load to create and or control the resistance force. The constant power load may be modified somewhat by a flywheel to sustain momentum throughout a given exercise cycle or stroke. Without the flywheel, a constant power stationary bike would be very difficult to ride and would feel to a user as if they were pedaling up a very steep hill, or under water, unable to gain momentum. Nevertheless even with a flywheel normal or correct inertial characteristics are only achieved at one pedal rate and power level. As a result, known stationary exercise bikes do not feel like a real bicycle to a user, and may seem more like pedaling a bike with the brakes on with any appreciable level of resistance force. When riding a "real" bicycle, the rider generates momentum and builds up speed, wherein the downward power stroke generates accelerations in the bike and the rider's muscles that carry them into the next pedal stroke. These normal conditions are not constant power, constant force, or any other simple control function utilized in known exercise systems. Rather, the actual conditions include a complex interaction between the rider's applied force, the bike and rider's weight, the slope of the road, the road smoothness, wind resistance, the bike speed, and other factors.

Also, the speed of the body while walking on a stationary surface is not constant as opposed to the velocity of a treadmill belt or conveyor. Not only do speed changes occur due to slope changes and user fatigue and strength, but also on each step the user's body is accelerated forward during the muscle power stroke and then carried forward by the body's momentum into the next step. Thus, operating a walking machine at constant speed is dynamically inaccurate and non-optimum for the user's muscles. The control arrangement of the present invention can be utilized to control exercise devices such as those discussed above, and also to control rowing machines, weight lifting machines, swimming machines, tennis or baseball practice machines, or any other machine or device used to simulate an exercise or other physical activity. In one aspect, the present invention utilizes unique control loops to determine the correct resistance force to put on the user at any given time, and to rapidly adjust the forces during the power stroke and/or return stroke to optimally load the muscles and accurately simulate the actual forces that would be experienced by the user performing a given physical task.

Figure 19:
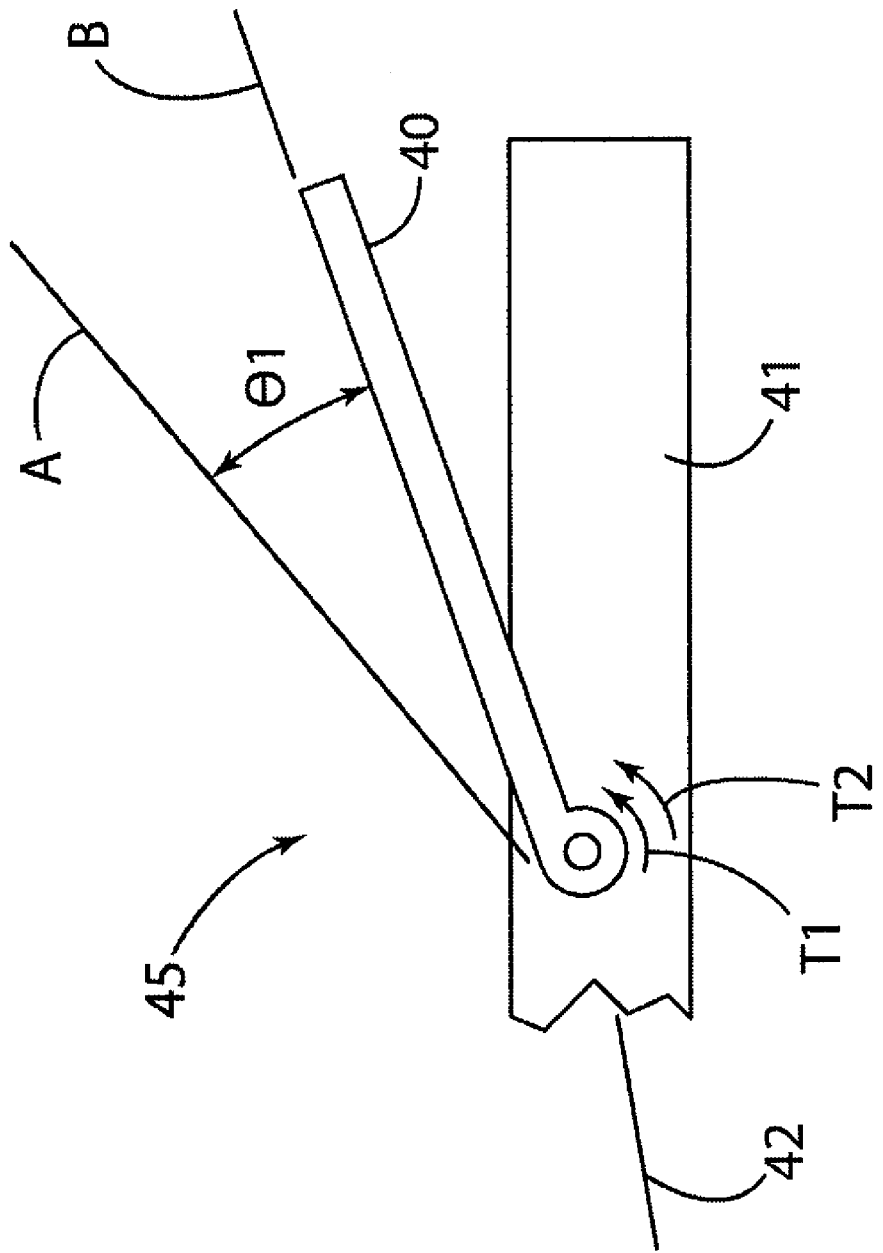
FIG. 19 is a partially schematic view of a brake lever that can be manipulated by a user to control the virtual velocity of a stationary bike according to another aspect of the present invention.

One aspect of the present invention is a unique control system by which complex conditions can be simulated by electrically-based load devices such as eddy current brakes, motors, or alternators. Alternately, other force-generating devices such as mechanical brakes or the like may be utilized instead of, or in conjunction with, an alternator or other such electrical force generating device. Numerous types of mechanical brakes are known, such that the details of all suitable brake arrangements will not be described in detail herein. Nevertheless, in general, most such mechanical brakes (e.g., disk brakes, calipers, drum brakes, etc.) include a friction member that is movable to engage another brake member that moves as the pedals and/or other moving drive train parts of the stationary bike move. If the mechanical brake is controlled by the control system, a powered actuator may be operably connected to the movable friction member such that the controller can generate a signal to the powered actuator to engage the friction member with the other brake member to provide the desired amount of resistance force to simulate the physical activity. The brake may also receive a control signal from a hand brake lever (FIG. 19) either directly or through the controller to vary the resistance force. Alternately, a hand brake lever as shown in FIG. 19 may solely provide a "virtual" brake signal to the controller, with the controller using the signal to adjust the virtual velocity of the bike road model.

For purposes of the discussion below, a stationary bike 1 (FIG. 1) will be used by way of example, but the reader will readily understand that the concepts, methods and control system can be utilized with virtually any type of exercise machine to simulate any type of physical activity or motion. For example a dynamically accurate walking machine according to the present invention mimics the changes in momentum experienced by the walker, and adjusts the forces to simulate the walker's velocity.

The system/method/exercise equipment of the present invention provides a physical experience for the human user that may be almost identical to a rider's experience on a real bike, including the forces applied and the feel of the pedal power stroke and the periodic variation of forces and/or velocity as the pedals rotate.

Figure 1:
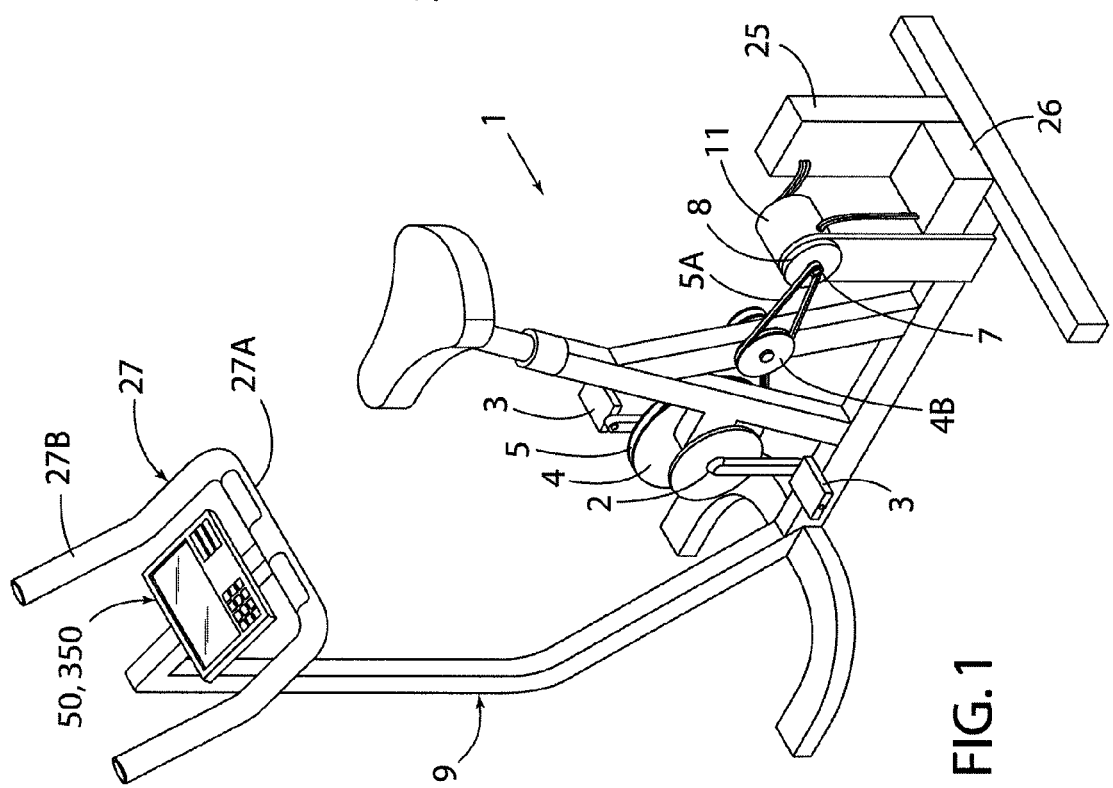
FIG. 1 is a perspective view of an exercise device according to the present invention.
Figure 11:
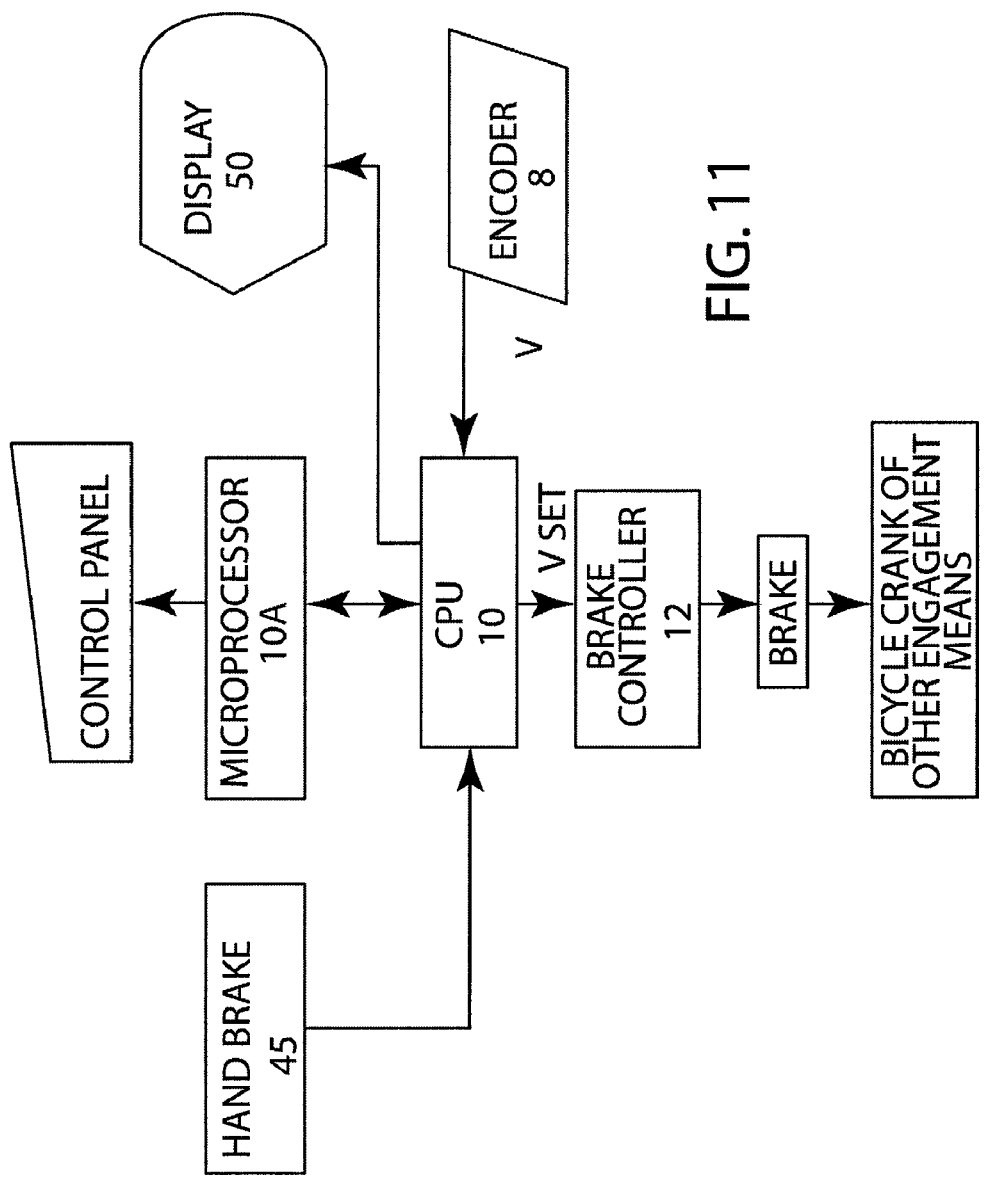
FIG. 11 is a display viewable by a user of an exercise device according to one aspect of the present invention.

With reference to FIGS. 1 and 1C, a stationary bike 1 according to one aspect of the present invention includes a crank 2 that is rotatably mounted to a support structure such as a frame 9. Crank includes a pair of pedals 3 that move about the crank axis in a generally circular path. A drive member 4 such as a pulley, gear, or the like is connected to the crank 2, and drives a flexible drive member 5. The flexible drive member 5 may be a belt, chain, or the like, or other suitable device or structure. In the illustrated example, flexible drive member 5 rotates a pulley or drive member 4A that is rotatably mounted to the frame 9. Pulley 4A is fixedly connected to a pulley 4B, such that rotation of pulley 4A rotates pulley 4B, and thereby moves a second flexible drive member 5A. A pulley 5C maintains and/or adjusts tension of drive member 5. The second flexible drive member 5A rotates a driven member such as a pulley 7. A sensor such as an encoder 8 is configured to detect the position and/or movement of the driven member 7. Because the size of the drive members 4, 4A, 4B and driven member 7 are known, the rotation rate of crank 2 can be determined from data from encoder 8. An alternator 11 is also connected to the driven member 7. As described in more detail below, an electronic control system 25 utilizes information from the encoder 8 or other sensors (e.g., force sensors) to control a resistance force generated by the alternator 11. The resistance forces generated by the alternator 11 felt by a user exerting force on the pedals 3. As also described in more detail below, the control system of the present invention utilizes one or more factors related to an actual physical activity (e.g., riding a moving bike) to determine the resistance force generated by alternator 11. As also described in more detail below in connection with FIG. 11, the electronic control 25 may be configured to provide information that is shown on a display screen 50. This information may include the rider's power output, the rider's velocity (i.e., virtual velocity), the crank r.p.m., and the slope of a virtual hill that the rider is encountering. Still further, the display 50 may display the gear of the bike, the ride time, the distance traveled, or the like. Handlebars 27 of bike 1 may include upper portions ("tops") 27A and "lower" portions ("drops") 27B. The tops 27A and/or drops 27B may include sensors that determine which portions of the handlebars 27 a user is grasping. As discussed below, the control system may use this information to adjust an aerodynamic drag factor to account for the different aerodynamic drag of the rider in each position. In general, bike 1 will provide greater resistance force at a given virtual velocity when a rider is using tops 27A relative to the resistance force generated when a rider is using drops 27B. Display 50 may include a feature that indicates if the rider is currently using tops 27A or drops 27B. As also discussed in more detail below, bike 1 may include a battery 26 that is charged by the alternator 11 in response to control signals from the electronic control 25. It will be apparent that a stationary bike 1 according to the present invention does not necessarily need to include a flywheel or other momentum storage device to account for variations in rider input force or the like. For those reasons discussed in more detail below, the A control system according to the present invention provides for simulation of an actual physical activity in a way that eliminates or reduces the need for flywheels or other devices that would otherwise be required to account for the affects of momentum that occur during the actual physical activity being simulated.

Figure 1A:
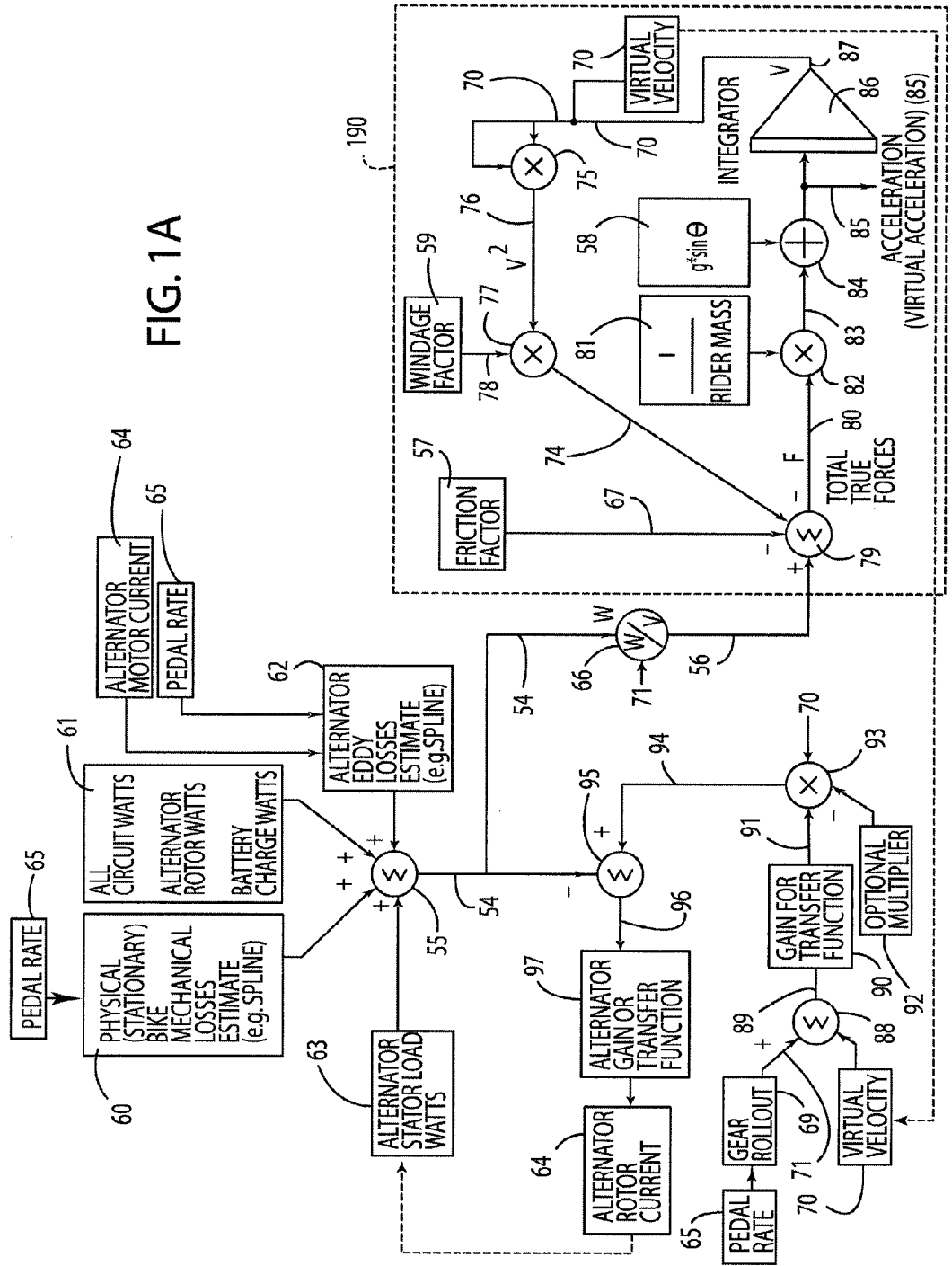
FIG. 1A is a schematic diagram of a control system and method for exercise devices according to one aspect of the present invention.

FIG. 1A is a block diagram of a control system/method for exercise equipment. In the illustrated example, the exercise equipment comprises a stationary bike. FIG. 2 is a diagram showing how the control system/method can be utilized to control virtually any mechanical axis, accounting for user position input, user power, internal power losses, momentum gain and loss, and other factors. Significantly, FIG. 2 shows one way that the method can be completely generalized by knowing the physics of the conditions on the user. Each of the forces represented in FIGS. 1A, 1B, 2 and 2A may be determined by measuring forces on actual bikes (i.e. empirical data) under various operating conditions, or from other actual exercises or physical activities. The actual forces for various rider weights under various conditions can be measured and utilized to generate a data base that is accessed by the system controller to set the control system for an individual user. The controller may be programmed to calculate a curve fit or an interpolation scheme to provide numerical values for the control variables in areas of operation (i.e. riding conditions) for which empirical data is not available. Such measured forces generally correspond to terms in the equations of motion for a particular activity. For example, an equation of motion for a biking scenario is described in more detail below (Equation 1.2). The equation of motion for a bike includes terms for forces due to aerodynamic drag, friction/rolling drag, hill angle, and dynamic forces under acceleration due to the bike's mass and rotational inertia. Preferably, all sources of acceleration are added up, and this sum is integrated to give a virtual bike velocity, following the equations $F=M\,A$ and $V=\text{Integral}[A\,dT]$. It will be understood that although any one acceleration source, or any combination of the sources of acceleration may be utilized, this will tend to result in a simulation that is less realistic.

As also described in more detail below, an additional force may result from application of the brakes on the bike. These terms correspond to the empirical terms discussed above. Similarly, equations of motion can be developed for other physical activities or exercises and utilized to implement the control system of the present invention utilizing the approach described herein for a bike. Alternately, the actual forces encountered during a given physical activity can be measured and used to implement a control system utilizing an empirical approach as described herein. Still further, a "blended" or combination approach may be utilized wherein some of the terms utilized for control are based on measured values, and other terms are calculated using the analytical approach. For instance multiple axes, with multiple control loops, can be implemented in the case of complex motions, in such a way the user experiences each movement as being dynamically "correct" or normal. An example might be a swimming machine, where each limb is either in contact with the water or not, and the water causes drag on the immersed limbs, and the speed of the swimmer would have momentum that carries the swimmer into the next stroke. Each limb would have a control system that handles that limb's conditions, speeds, immersion, and other factors. Each limb would contribute to the forward momentum of the swimmer, and experience loss from water turbulence. It should be understood this is merely another example of the use of the simulation method and control system described herein.

Sensors not described in the basic functionality of this method can be helpful, but not necessary, to the function of the exercise equipment. For example, a force sensor that is operably connected to the pedals of an exercise bike can make the measurement of user effort/force more accurate than calculating the force based on user watts effort and estimated losses due to stationary bike components that result in bike mechanical losses, eddy currents, and other electrical losses. The control system may operate as described: a velocity difference between user input and control system computed speed is used to control the braking device on the user. The force sensor, by way of example, may change the way the control system updates its acceleration and thereby velocity internally. The underlying control principle may remain the same.

Implementation of a dynamic system control that simulates a physical dynamic device according to the present invention preferably includes meeting a number of control conditions. However, the present invention includes control systems, methods, and devices that do not completely meet all control conditions. It will be understood that all aspects of the control systems described herein do not need to be included to provide a control system according to the present invention.

For example, simulating an actual bicycle may include accounting for rolling resistance/friction, aerodynamic drag, acceleration or rider weight. Nevertheless, the present invention contemplates that not all of these factors need to be included to provide a simulation that feels quite realistic to a user of a stationary bicycle or other exercise equipment. Also, some factors need not be precisely accounted for to provide an adequate simulation. For example, the aerodynamic loss can be modeled quite accurately if the coefficient of drag and surface area of a specific rider is known. However, the effects of aerodynamic drag can be taken into account using a set (i.e., the same) surface area and coefficient of drag for all users. Although the magnitude of the aerodynamic drag experienced by a given user may not be precise, an increase in pedaling resistance due to increased rider velocity will be experienced by a user. Similarly, although each rider's actual body weight may be entered into the control system to accurately simulate the forces due to hills, acceleration, rolling resistance, and the like, the same rider weight may be used for all users. Although the total resistance forces experienced by a given user will likely be at least somewhat inaccurate if the weight of the individual user is not utilized by the control system, the rider will still experience variations in force due to hills, acceleration, and the like. This provides a somewhat simplified way to simulate actual bicycle riding conditions without requiring input of the weight of a given user. It will be further understood that the input of variables such as rider weight may be simplified by providing a choice of input weights/ranges such as "low rider weight," "medium rider weight," and "high rider weight." In this example, the system utilizes a single numerical weight associated with each weight range. Also, such interactions such as how the rider's weight affects windage loss can be taken into account.

Still further, it will also be understood that the actual terms from the equation of motion for a specific physical activity do not need to be utilized if a highly accurate simulation is not desired or needed. For example, in general the aerodynamic drag is a function of the velocity squared. However, the effects of aerodynamic drag could be calculated utilizing velocity raised to the 2.10 power or other power other than velocity squared. Although accurate simulation of the physical activity may be preferred in many situations, the present invention contemplates variations including equations, formulas, rules, and the like that may not utilize the actual equation of motion for the physical activity being simulated. The principles and concepts of the present invention may be utilized to simulate the physics of an actual physical activity in by taking into account the factors affecting the forces experienced by user without using the actual equations of motion, or using equations of motion that capture the non-ideality of real systems. According to one aspect of the present invention, the dynamic conditions of the system are simulated arithmetically in a control loop, the dynamic system power losses and gains associated with the user are distinguished from other losses and gains applied to the user power input, and a control signal to an electronic brake or the like is generated to control the forces on the user.

In general, when a user interacts with the environment in a way that uses significant user power, there are virtually always factors such as the speed and momentum of objects with which the user interacts. Thus, one aspect of an accurate simulation is to simulate the mass and momentum of objects that the user interacts with. The mass and momentum effect is frequently a very important dynamic element, because muscles are often recruited explosively, to rapidly put energy into overcoming inertia, and the momentum assists completion of the remaining portion of the exercise stroke or cycle. This dynamic action occurs on a "real" bicycle when the user generates a high force on the down stroke and then less force on the upstroke. Simulating the bike momentum achieves this effect. The following is a description of one aspect of the present invention, using a bicycle simulation by way of example. FIG. 1A shows a loop control diagram for a stationary bicycle having a control system that simulates actual riding forces, accelerations, and the like experienced by a rider on a real bicycle.

One aspect of the present invention is a software control system that incorporates a control system to simulate the dynamics of an actual device. A bicycle simulation according to the present invention (FIG. 1A) includes generating a virtual "bike velocity." The virtual bike velocity, as on a real bicycle, is modified by the power inputs to the system. (The virtual "bike velocity" has no physical reality, it is just a computed number.) The velocity is increased by going down a hill, or by the rider applying sufficient torque to the pedals. The velocity is decreased by aerodynamic loss (also referred to herein as "windage loss"), friction, or going uphill on the bicycle. Similarly, when walking there is a walking speed; when hitting a baseball with a bat, there are rotational, vertical and horizontal bat speeds.

Referring again to FIG. 1A, a control system/method according to one aspect of the present invention separates the system losses and gains into those that are directly applied to the user as force and power demand from the user from those losses that are not directly applied to the user. In the case of a bicycle, an example of a force directly applied to the user is the rider's application of torque on the pedals. This torque multiplied times the rotation rate is the user input power. Examples of system losses and gains that are not directly applied to the user would be windage loss, friction loss, power going into raising the bike on an uphill slope, and power going into accelerating the bike. These "virtual" forces and/or power losses/gains are not directly applied to the rider, but rather they are inputs to the bike road model 190 of the dynamic system control that eventually affect the rider torque. These indirect or virtual forces are applied to the acceleration and deceleration of the effective (virtual) bike speed computed by the control system. These virtual forces indirectly affect the actual forces experienced by the rider because they modify the dynamic system control speed, and user input of force is necessary to increase or decrease this speed by pedaling.

With reference again to FIG. 1A, the friction factor 57, slope 58, and aerodynamic drag factor 59 are not applied to the rider directly. Rather, these factors are taken into account by the bike road model 190 portion of the system and applied to the increase and decrease of the calculated virtual bike velocity through positive or negative acceleration. In absence of actual rider input forces, the control system "decelerates" the virtual velocity. If the rider is to keep this internal "speed" up, the rider must pedal. This aspect of the control system provides a much more realistic simulation of an actual bicycle.

For example, if a rider of a stationary bike utilizing the control system of the present invention stops pedaling for a moment, upon resuming pedaling the rider will need to pedal at a rate equal to the virtual velocity of the bike before experiencing significant resistance force on the pedals. In this way, the user can "coast" as needed to rest from time to time without immediately experiencing full resistance force from the pedals even at very low pedal speeds upon resuming pedaling. It will be appreciated that prior constant force and constant power control schemes do not provide a realistic coasting experience. Although prior control arrangements may include a flywheel that retains some momentum, such systems do not accurately take into account the drag forces and the like of an actual bicycle, such that the forces experienced by a user of a prior flywheel type system will be quite different than would be experienced riding a real bicycle. In a control system/method according to the present invention, almost all mass and momentum is simulated such that a flywheel is not needed. In general, all real physical mass and momentum buildup in the equipment is minimized or avoided so it does not interfere with the simulation to an appreciable degree.

Rider input power 54, and therefore rider force 56, is calculated by adding up the losses in the real physical mechanism and the electrical power generated by the rider at diagram summation element 55. For example, when an alternator is used as an electrically controlled brake, the bike simulator has estimated mechanical losses 60, electrical losses 61 including estimated alternator eddy current losses 62 and estimated battery charging losses. As shown in FIG. 1A, alternator rotor current 64 and pedal rate 65 are utilized to estimate the eddy losses of the alternator. Methods for estimating eddy current losses are known. For example, the alternator could be tested to determine a mathematical relationship or a look-up table. As also shown in FIG. 1A, the alternator rotor current 64 may also be utilized to determine the alternator stator load (watts) for input to summation element 55. Pedal rate 65 is also utilized to estimate the mechanical losses 60 of the stationary bike. Although this mechanical loss could be estimated or measured in a variety of ways, in the illustrated example, the mechanical losses of the stationary bike under various operating conditions are measured. A spline or other curve fitting algorithm is utilized by the system to generate a mechanical loss estimate for the operating conditions (e.g., pedal rate). These losses in addition to the main "loss," which is electrical power 63 generated by the rider through current generated in the alternator output 64. The total of these real power losses is taken as the rider's power input that modifies the virtual bike velocity.

Figure 8:
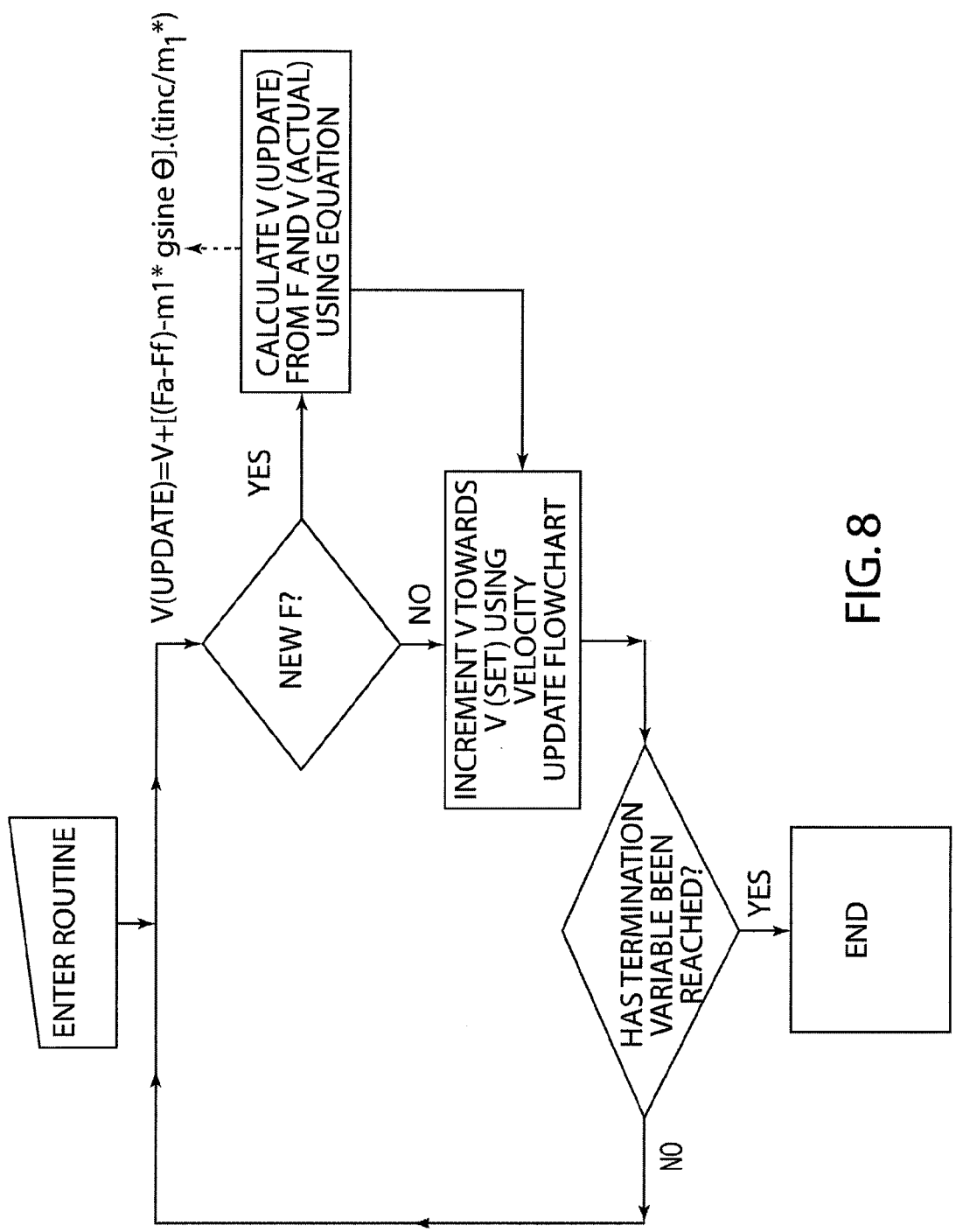
FIG. 8 is a diagram illustrating a routine that may be utilized in a control system according to the present invention.
Figure 9:
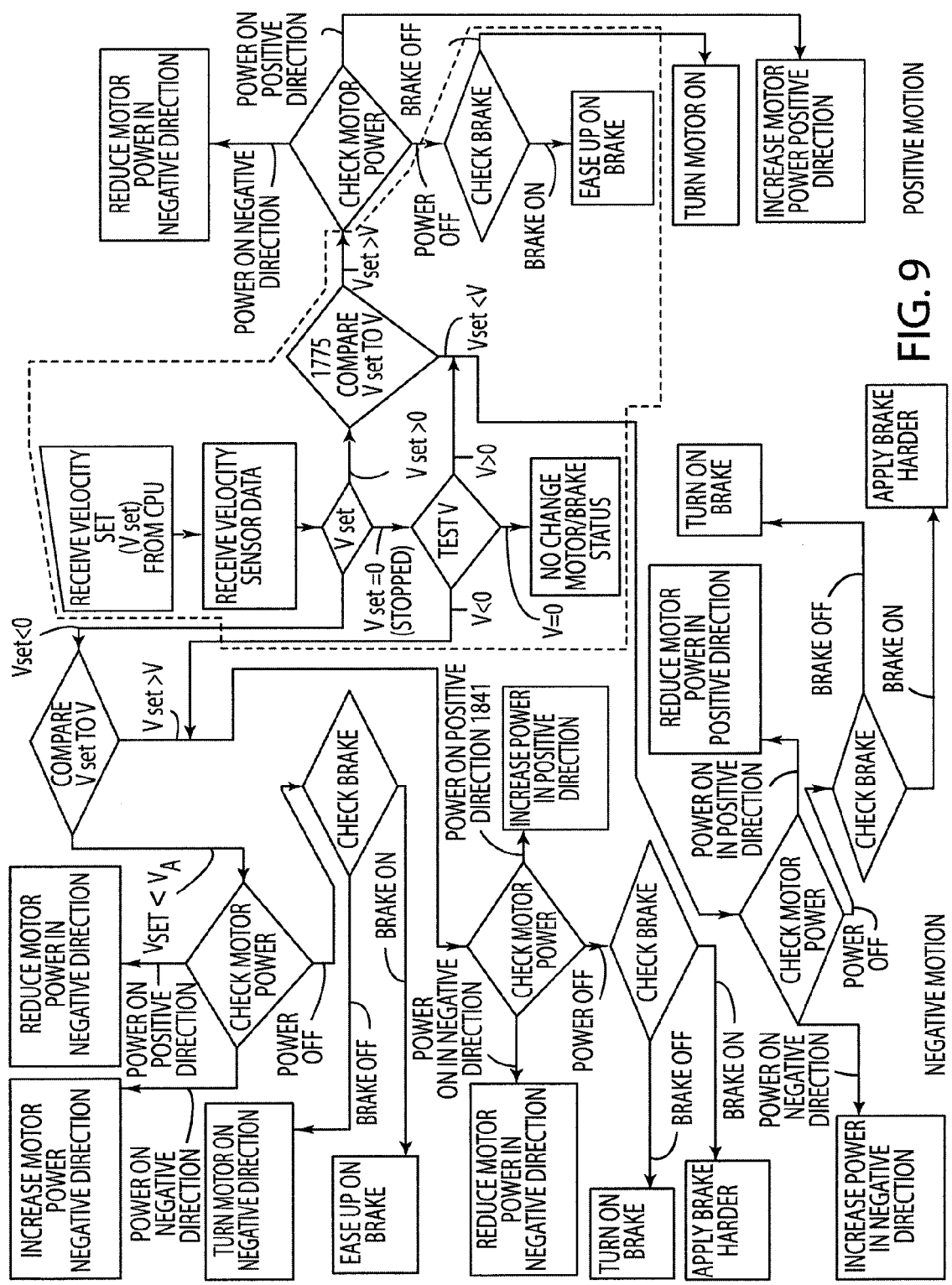
FIG. 9 is a diagram illustrating a routine that may be utilized in a control system according to another aspect of the present invention.
Figure 10:
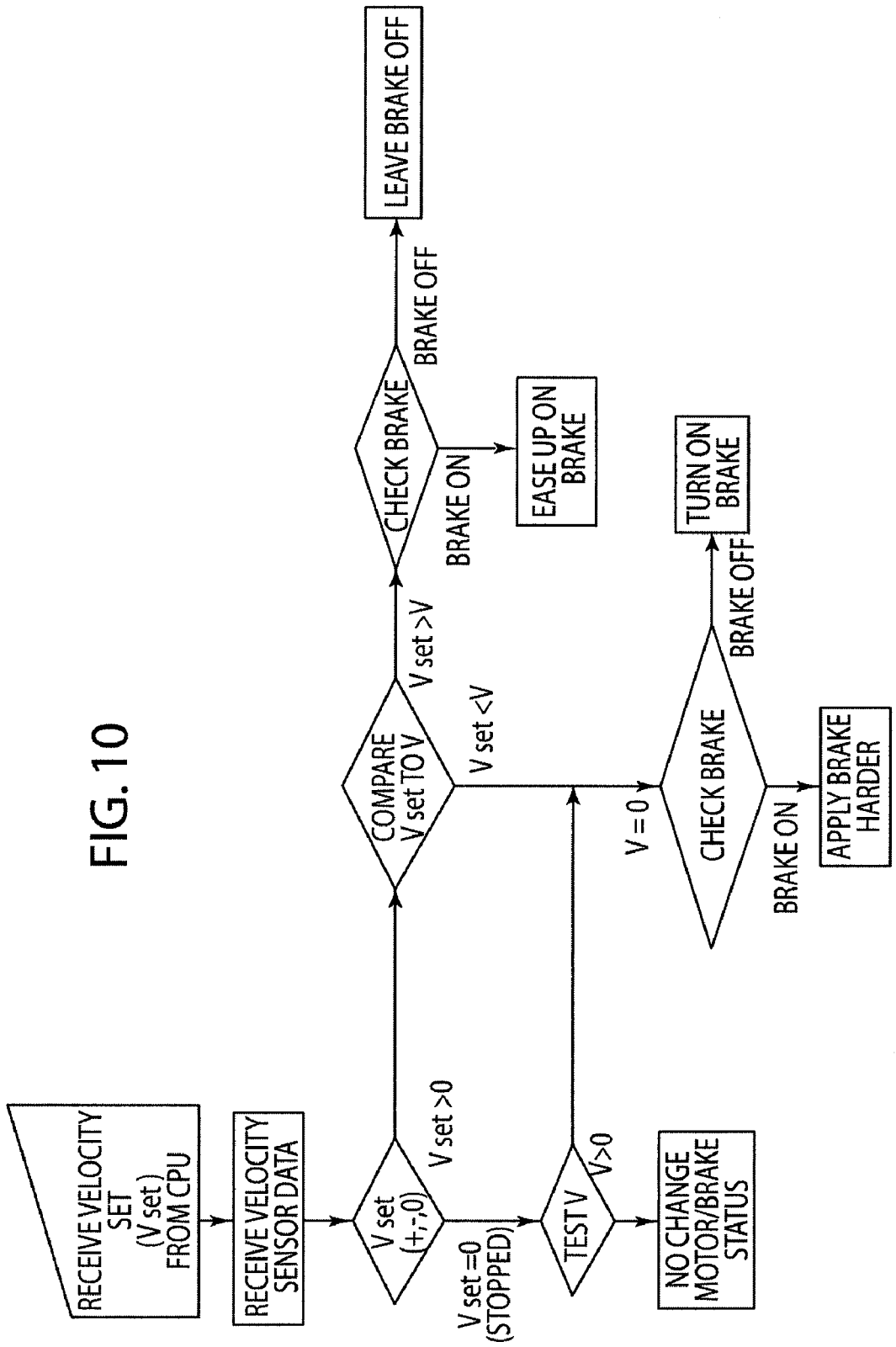
FIG. 10 is a diagram illustrating a routine that may be utilized in a control system according to another aspect of the present invention.

In FIG. 1A, the pedal rotation rate 65 is measured with a sensor, and the bike simulation's "gear rollout" 69, that is, meters of forward motion for each rotation of the pedals, for each gear, is known. As discussed in more detail below in connection with FIG. 28, the bike may include a number of discreet gear ratios ("rollouts") that simulate specific chainring/cog combinations. The rider can shift to different virtual gears using a knob or other input device as required to climb hills, descend hills, adjust rider velocity, adjust rider effort, and the like. As also discussed in more detail below, display screen 50 (or 350) may include a visual representation showing the virtual gear of the bike. Since the rider's measured bike forward velocity 71 (measured pedal rate 65 times rollout 69) and the total pedal power 54 applied are known, the estimated rider force 56 can be calculated by dividing total rider true watts 54 ("W") by the measured bike velocity 71 (V) at diagram element 66 to determine estimated rider forces 56. The "virtual" friction losses 67 are calculated using the virtual bike velocity 70 at diagram element 57. As described in more detail below in connection with FIG. 8, the frictional (rolling) losses of the virtual bike may be calculated or determined in a variety of ways. As also described in more detail below, the virtual aerodynamic drag force (loss) 74 may be determined in a variety of ways. In general, the virtual velocity 70 is squared as shown at diagram element 75 to form virtual velocity squared 76. The square 76 of the virtual velocity 70 goes into diagram element 77. Diagram element 77 includes a mathematical formula, look-up table based on empirical data, or other rule or information that is utilized to determine the "virtual" aerodynamic drag 74. In the illustrated example, the factor 78 is equal to $-0.5 C_1 {}_p Q$. This and other factors affecting the virtual velocity are discussed in more detail below in connection with FIG. 8.

The estimated rider forces 56, friction losses 67, and aerodynamic losses 74 are added together at diagram element 79 to provide the total "true" force 80. The total true force 80 is multiplied times the inverse 81 of the rider mass at diagram element 82 to generate a first acceleration value 83. The first acceleration value 83 is increased or decreased at diagram element by adding the slope factor 58 to provide the total "true" (virtual) acceleration 85 of the virtual bike and rider. The total acceleration 85 is integrated at integrator 86 to provide the virtual bike velocity 90 at the output 87 of the integrator 86.

An electronic brake or the like may be utilized to provide a variable resistance force to the user. The electronic brake may comprise an alternator that utilizes a control input to provide the desired force to the user. In the illustrated example (FIG. 1A), this control input is generated by taking the difference between the measured velocity 71 and the virtual velocity 70. The measured velocity is the pedal rate 64 times the gear rollout 69, and the virtual bike velocity 70 is produced by the integrator 86. In the illustrated example, the difference between the virtual velocity 70 and the measured velocity 71 occurs at diagram element 88. The result is a velocity difference value 89 (it will be understood that the virtual velocity value 70 from integrator 86 is stored internally in the control system). On a real bike, when the rider is applying force to the pedals to move a bike forward, these two speeds are the same when forces are constant, but in actual fact the bike acts as a spring and as this spring winds up, force is applied to the pedal. So, in fact, a real bike works by the same mechanism of speed differences, although on a real bike these differences are subtle. In the simulation/control system/method according to the present invention, these speed differences are preferably very small as a result of the control system, similar to a real bike. It has been found that the control system, however, need not be as "stiff" as real bike to provide a good simulation. In the simulation, the velocity difference 89 between the measured velocity 71 and the virtual velocity 70 is multiplied by a relatively large number and fed into the electronic brake (e.g., alternator) control. In the system of FIG. 1, the output 91 is multiplied by an optional multiplier 92 and the virtual velocity 70 at diagram element 93, and the result 94 (in watts) is added to the rider input power 54 at diagram element 95. The result 96 of the summation 95 is input to an alternator gain or transfer function 97 to provide input for the alternator rotor current 64. If the pedal apparent speed (measured velocity 71) is faster even by a small amount than the internal control speed (virtual velocity 70) of the control system, a great amount of current is applied to the electronic brake input, and the rider feels large forces resisting motion on the pedals. However, the difference in velocity between the measured velocity 71 and the virtual velocity 70 is preferably very small and therefore imperceptible to a rider.

The pedal apparent speed (measured velocity 71) is preferably known (measured or calculated) with high precision, because the difference 89 between two relatively large numbers is used to determine the control input to the electronic brake. For example, if for the bike we expect the pedal apparent speed (measured velocity 71) and the internal control speed (virtual velocity 70) to be the same within 0.1 mile per hour (for a bike simulation this speed difference is generally imperceptible to a rider), a resolution of at least about 10 to 100 times 0.1 (i.e., 0.01 to 0.001 mph) provides control of the electronic brake that is smooth, without a "cogging" feel to the rider. It will be understood that even higher resolutions may also be utilized. Thus, the speeds of the bike control system and the pedal apparent speed are preferably very high resolution to ensure the simulation is accurate.

Multiplying the velocity difference 89 by a relatively large number may be thought of as being somewhat similar to the proportional gain control of a Proportional-Integral-Derivative (PID) controller. In general, PID controllers output a control variable that is based on the difference (error) between a user-defined set point and a measured variable. However, rather than using an error that is the difference between a measured value and a set point, the controller of the present invention utilizes the difference between a measured variable such as velocity and a "virtual" set point that is continuously and rapidly recalculated utilizing the equations of motion for the device/exercise/activity being simulated.

The PID system captures or utilizes the behavior of the real exercise equipment, for example, the spring windup effect in a bike frame.

Figure 1B:
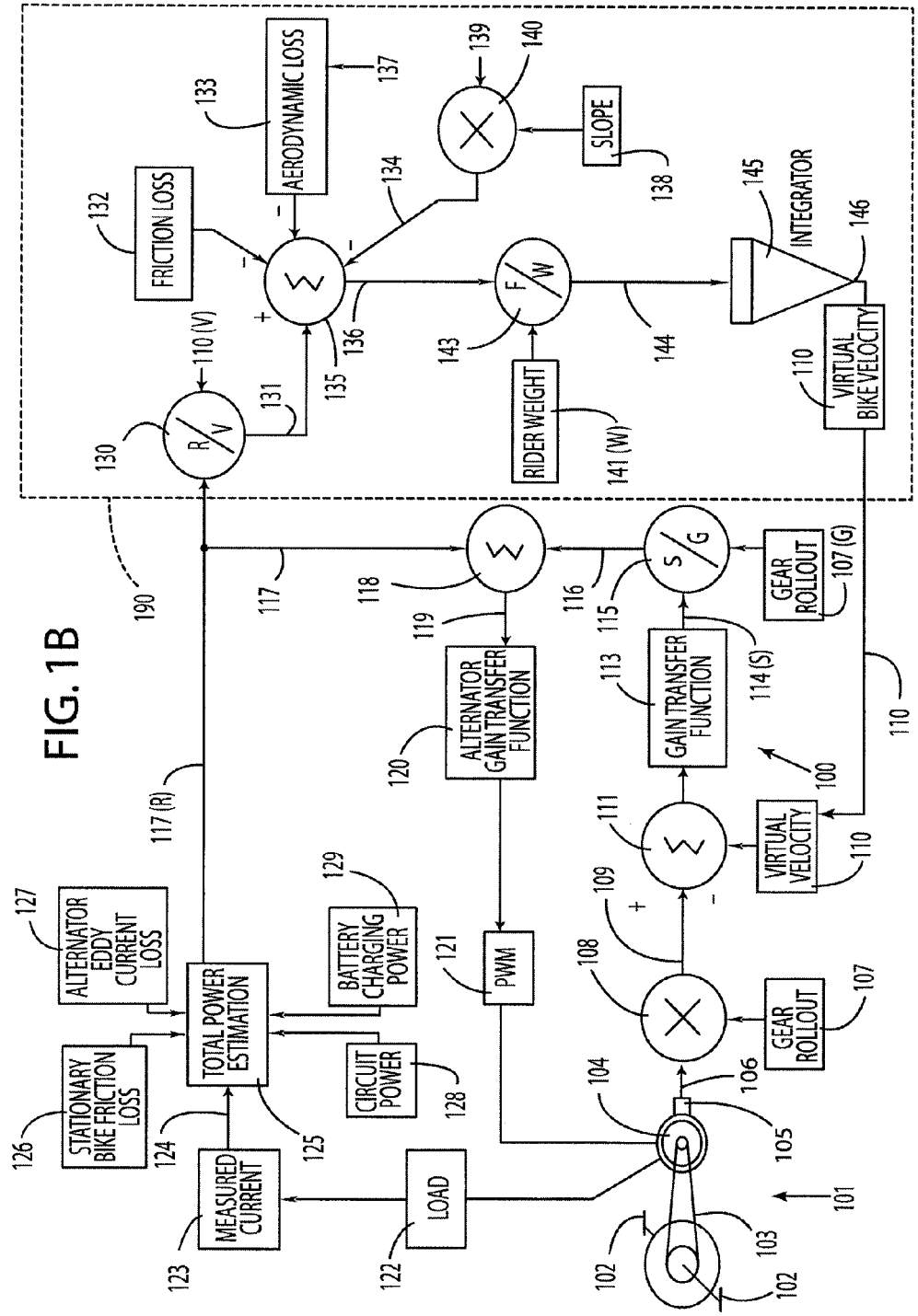
FIG. 1B is a schematic diagram of a control system and apparatus according to another aspect of the present invention.
Figure 2:
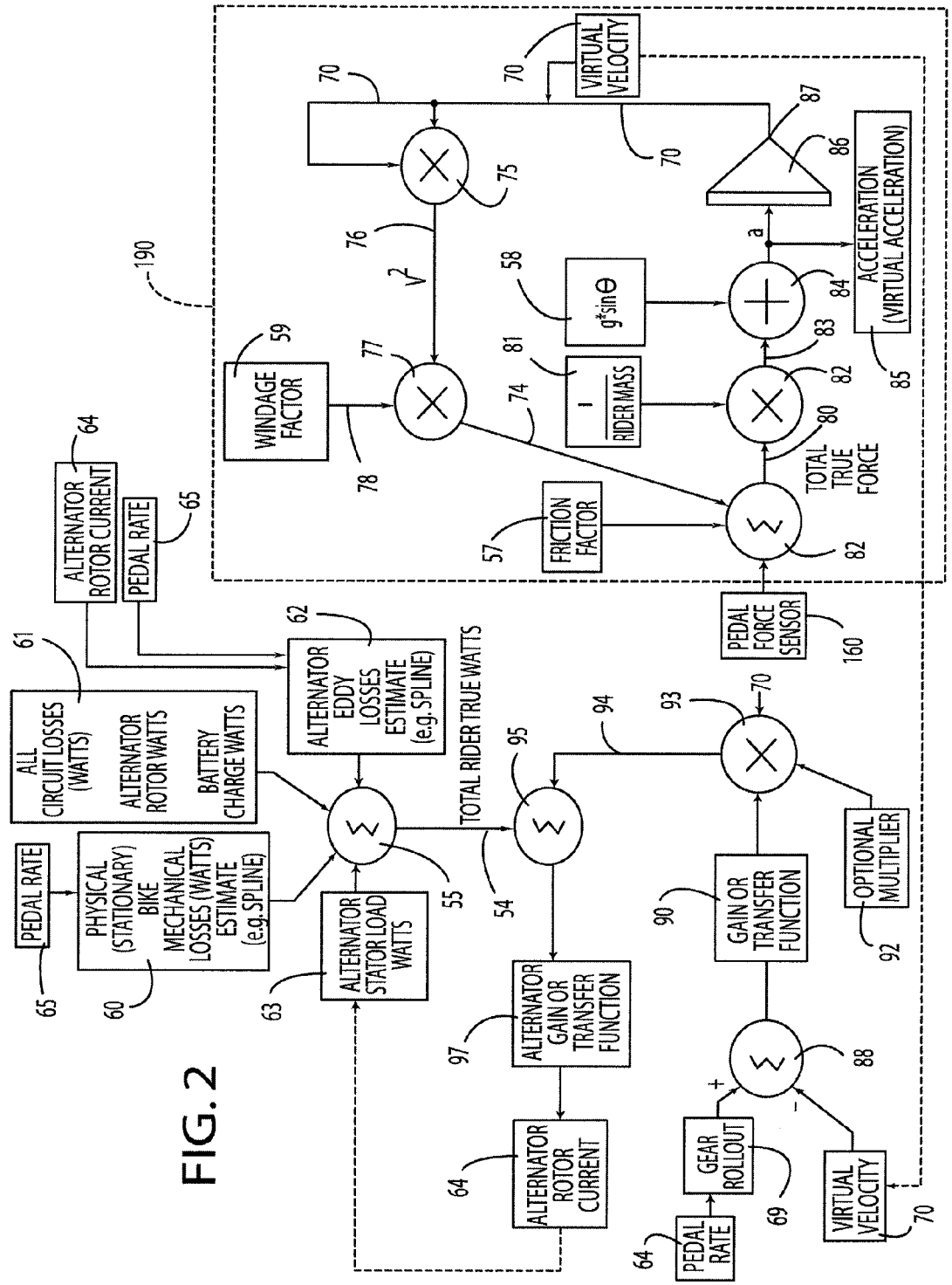
FIG. 2 is a schematic diagram of a control system and apparatus according to another aspect of the present invention.

FIG. 1B is a diagram showing a control system 100 according to another aspect of the present invention. A stationary bike 101 includes pedals 102 that drive a connecting member such as a belt or chain 103. The chain 103 drives a rotor 104 that is connected to an alternator or the like to provide a variable resistance force. A sensor such as an encoder 105 provides position and/or velocity and/or acceleration data concerning the rotor 104. Because the pedals 102 are connected to the rotor 104 by chain 103, the velocity detected by encoder 105 corresponds to the pedal velocity 102.

Pedal rate 106 from encoder 105 is multiplied times gear rollout 107 at diagram element 108. As described in more detail below, the virtual bike velocity 110 is calculated utilizing the virtual friction, aerodynamic and other losses, along with the effects of rider weight, gravity, hill angle, and other factors. As also described in more detail below, the estimated total rider power (watts) is also utilized in calculating the virtual velocity 110.

The difference between the virtual velocity 110 and the measure velocity 109 is taken at the diagram element 111, and the velocity difference 112 is utilized as an input to the gain transfer function 113 to provide a control signal or value 114. The value 114 is divided by the gear roll out 107 at diagram element 115, and the resulting output (watts) 116 is added to the rider total watts 117 at diagram element 118. The output 119 is supplied to the alternator gain transfer function 120. The alternator gain transfer function 120 is utilized to generate a pulse with modulation (PWM) signal 121 to control the alternator.

The load 122 and power (watts) 123 from the alternator is utilized as an input 124 to the total power estimation 125. Each of the losses in the actual stationary bike system is also supplied to the total power estimation 125. These losses include the bike frictional loss 126, the alternator windage and any current loss 127, the circuit power losses 128, and the losses 129 due to battery charging. The total power estimation 125 provides the total rider wattage 117 to the other portions of the control system.

As shown at diagram element 130, the total rider watts are divided by the virtual velocity 110 to provide rider estimated forces 131. The estimated rider forces 131 are summed with the virtual friction loss 132, virtual aerodynamic loss 133, and the hill forces 134 to provide a total rider force 136. The frictional loss 132 may be calculated utilizing the virtually velocity 110 according to a variety of suitable methods. Similarly, the aerodynamic loss 133 is determined utilizing the virtual velocity squared 137. The hill forces 134 are determined by multiplying the slope or hill angle 138 by the weight 139 of the rider and bike as shown at diagram element 140. The rider and virtual bike weights are added together at 141 to provide a weight 142. The total rider force 136 is divided by the bike and rider weight 142 as shown at diagram element 143 to determine the virtual rider acceleration 144. The virtual rider acceleration 144 is integrated by an integrator 145, and the output 146 of integrator 145 is the virtual bike velocity 110.

With further reference to FIG. 2, a diagram 150 of a control system according to another aspect of the invention is somewhat similar to the control system of FIG. 1A, and the corresponding features are therefore numbered the same as in the diagram of FIG. 1A. The primary difference between the diagram of FIG. 2 and the control system of FIG. 1A is the utilization of measured pedal force 160 as an input into the calculation of total true forces 80 as illustrated at diagram element 79. As described above, the system of FIG. 1A utilizes total rider true watts 54 (FIG. 1A) divided by measured velocity 71 to determine an estimated force 56. In contrast, the system of FIG. 2 utilizes the actual measured forces 160. The other aspects of the control system of FIG. 2 are substantially similar to the corresponding elements described in detail above in connection with FIG. 1A, such that these elements will not be further described in detail.

Figure 3:
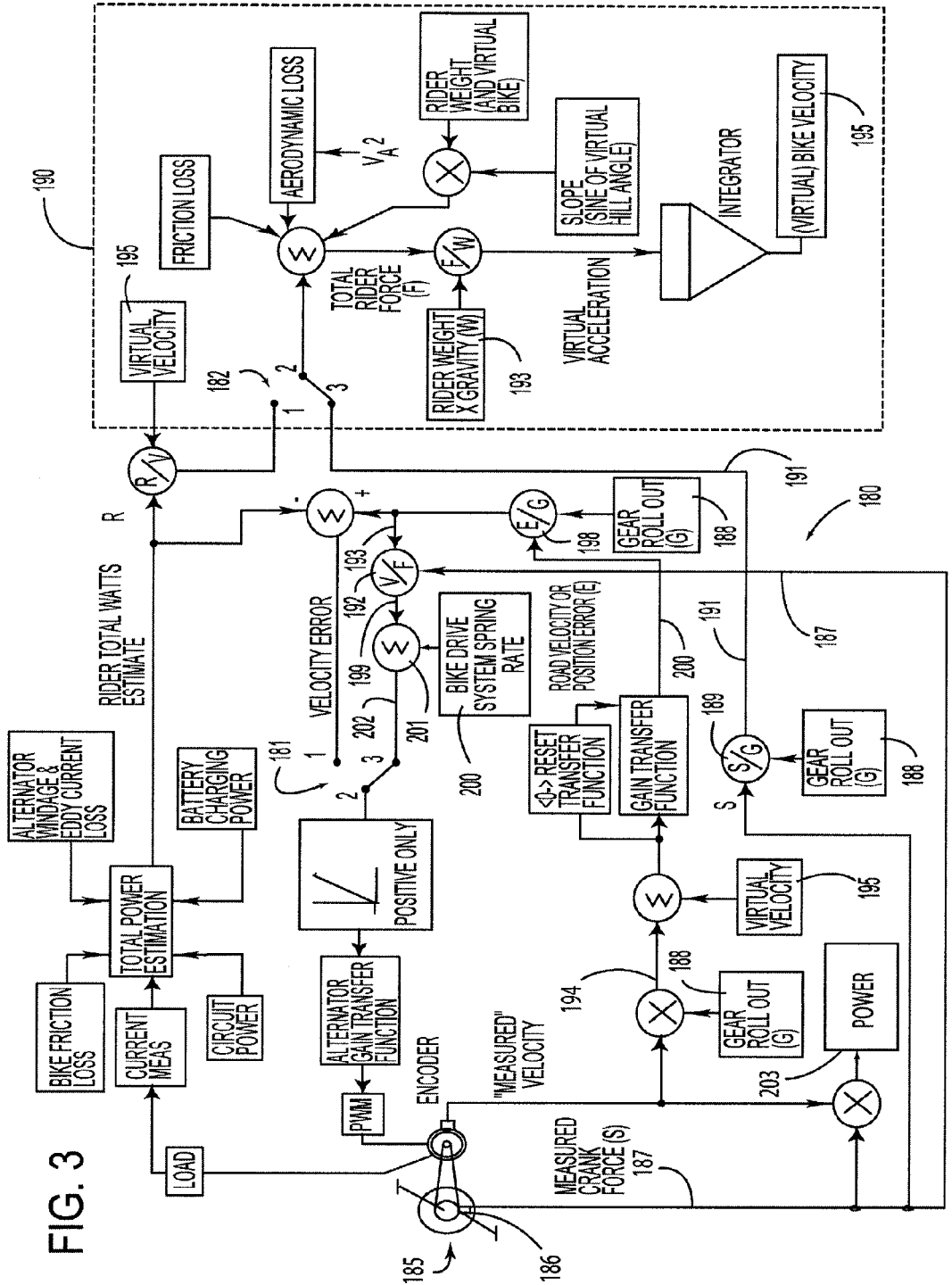
FIG. 3 is a schematic diagram of a control system and exercise apparatus according to another aspect of the present invention.

With further reference to FIG. 3, a control system 180 according to another aspect of the present invention includes a first switch 181 and a second switch 182. When the switch is in the upper position (i.e., connecting nodes I and II), and the second switch 182 is also in the upper position (i.e., interconnecting nodes I and II of switch 182), control system 180 operates in substantially the same manner as the control systems described in detail above in connection with FIGS. 1A, 1B, and 2. However, when switches 181 and 182 are in the second position (i.e., nodes II and III of switches 181 and 182 are connected), control system 180 operates in a different mode, and utilizes a force sensor to provide a force 187 to control the bike 185. When the control system 180 is in the second mode utilizing force input 187, the force input 187 ("S") is divided by gear rollout 188 ("G") at diagram element 189, and the resulting measured force 191 is supplied to a bike road model 190 through switch 182 instead of the estimated rider forces utilized in the control systems of FIGS. 1A, 1B, and 2. The bike road model 190 is substantially the same as the corresponding components of the control systems shown in FIGS. 1A, 1B, and 2 above. In contrast to the control systems described above, control system 180 utilizes the measured force 187 as a control input rather than an estimated force calculated from the user's estimated power input. As shown at diagram element 192, the velocity difference 193 between the measured velocity 194 and the virtual velocity 195 is divided by the measured force input 187 ("S") at diagram element 192. The result 199 is added to a spring rate 200 at diagram element 201 to provide a value 202 that is utilized by the alternator gain transfer function to control the alternator. The spring rate 200 represents the stiffness of the entire stationary bike system.

The control system 180 generates a signal to the alternator to generate a force that is proportional to the displacement in the stationary bike. Thus, if the controller "senses" that a large bike frame deflection is present, the controller generates a signal to the alternator to generate a correspondingly large resistance force that is, in turn, felt by the rider. The control system 180 is capable of providing a very accurate model of an actual bike. Also, because the control system 180 utilizes actual forces, the controller 180 automatically compensates for variations in forces generated by friction and the like in the stationary bike. Thus, if the forces resulting from friction, for example, vary as the stationary bike gets older due to bearing wear or the like, the control system 180 will still provide an accurate force feedback to the rider. Also, the control system 180 similarly provides accurate force feedback regardless of whether or not various stationary bikes in production have different frictional characteristics due to manufacturing tolerances and the like. Still further, the control system 180 also compensates for variations that would otherwise occur due to the operating conditions of the stationary bike.

The control system 180 may also provide an accurate display of the power input by the user. The product of the measured crank speed and the measured crank force is the true rider power 203. The true rider power 203 may be displayed on display unit 50 (FIG. 11) utilizing a suitable visual representation.

Figure 4:
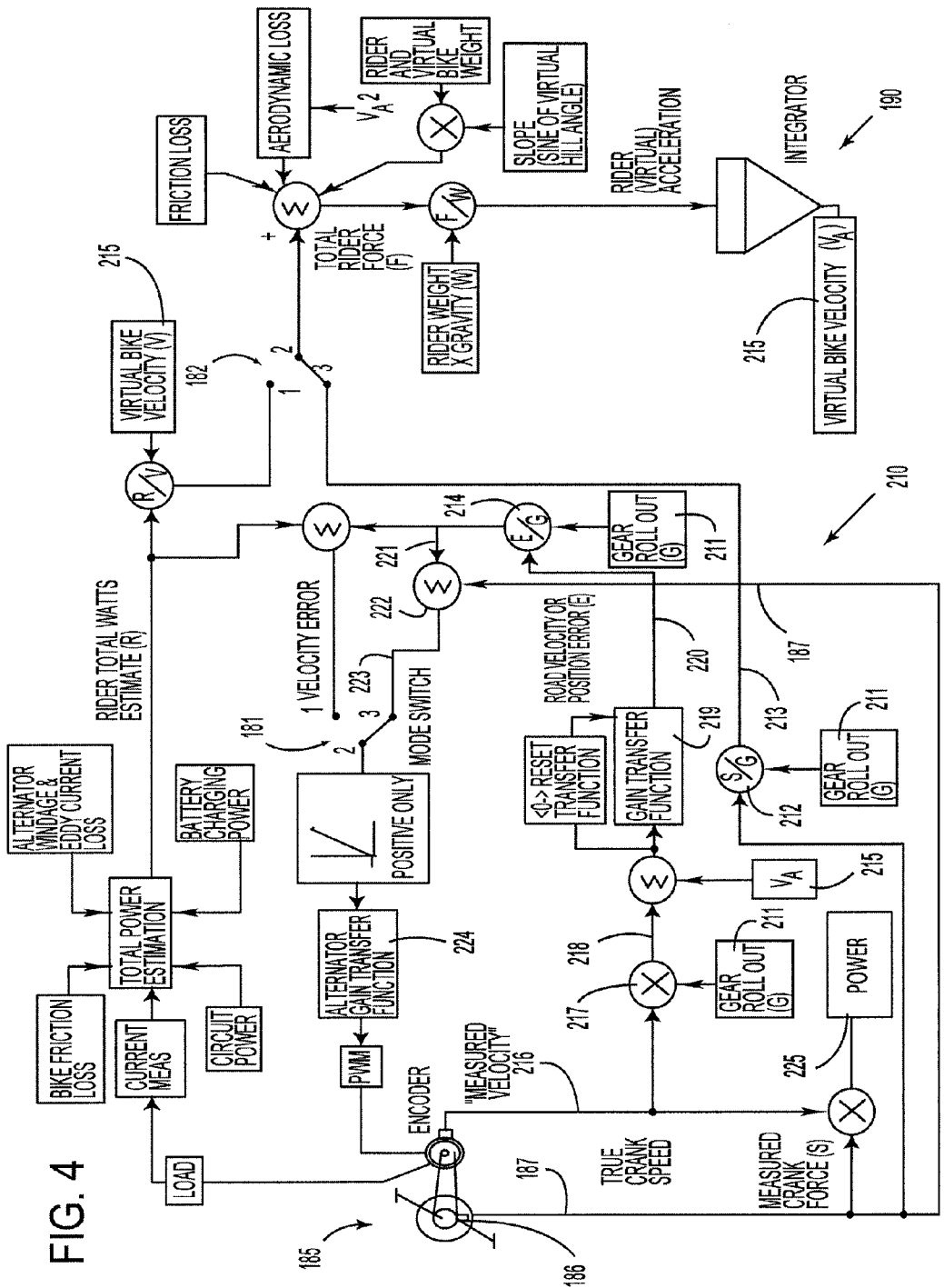
FIG. 4 is a schematic diagram of a control system and exercise apparatus according to another aspect of the present invention.

Yet another control diagram or system 210 is illustrated in FIG. 4. The control system 210 is somewhat similar to the control system 180, and includes a force sensor 186 providing a measured force 187. Switches 181 and 182 provide for switching modes between an estimated power mode that is similar to the arrangements described in detail above in connection with FIGS. 1A, 1B, and 2, and a force measurement mode. In the force measurement mode, the force 187 is divided by the gear rollout 211 at diagram element 212 to provide a measured force 213 that is utilized as an input in bike road model 190 in substantially the same manner as described above in connection with FIG. 3. The measured crank velocity 216 is multiplied times gear rollout 211 at diagram element 217, and the difference between the resulting measured bike velocity 218 and the virtual velocity 215 from the bike road model 190 is input to gain transfer function 219. The gain transfer function 219 provides a velocity difference or error 220 ("E") which is divided by gear rollout 211 ("G") at diagram element 214 to provide a crank velocity or position error 221. The difference between the position error 221 and the measured force 187 is taken at diagram element 222, and the resulting value 223 is used by the alternator gain function 224 to generate a signal controlling the alternator and corresponding resistance force experienced by a user. Control system 210 also provides for true rider power 225 by taking the product of the measured crank velocity 216 and the measured crank force 187. The true rider power 225 may be shown on display 50 or other suitable device.

Figure 5:
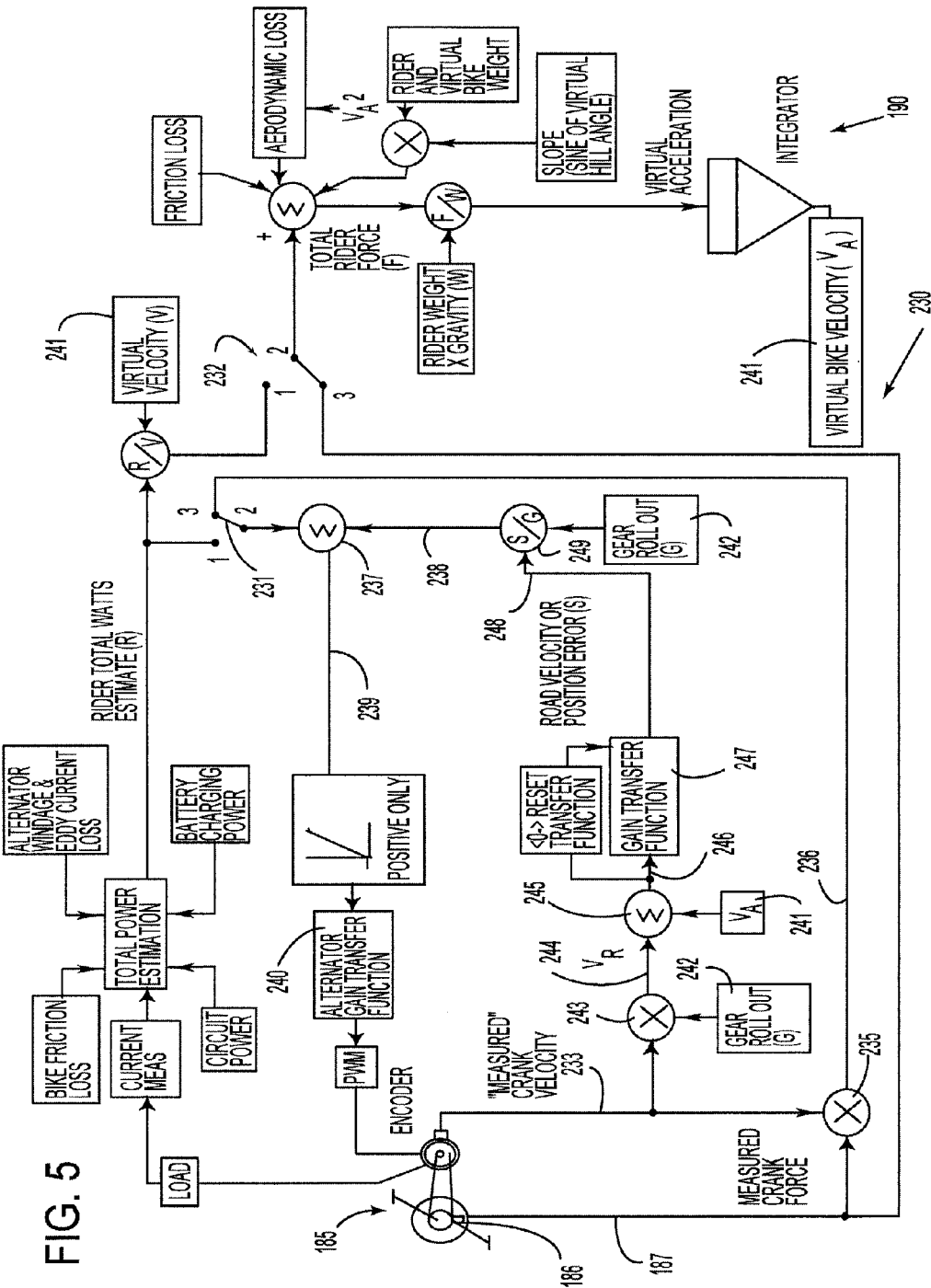
FIG. 5 is a schematic diagram of a control system and exercise apparatus according to another aspect of the present invention.

A control system 230 according to yet another aspect of the present invention is illustrated in FIG. 5. Control system 230 includes first and second switches that enable the controller 230 to be changed between an estimated rider force mode similar to the control method/scheme of FIGS. 1A, 1B and 2, and a force measurement mode that is somewhat similar to the control arrangement discussed above in connection with FIGS. 3 and 4. The controller 230 utilizes the product of the measured velocity 233 and the measured force 234 as shown at diagram element 235 to produce "true" (measured) rider power 236. When the control system 230 is in the measured force mode, the true rider power 236 is added to the velocity or position difference or error 238 at element 237, and the resulting value 239 is utilized by the alternator gain transfer function 240 to control the alternator or other force-generating device. In the control scheme 230, the measured velocity 233 is multiplied by gear rollout at 243, and the resulting measured velocity 244 is added to the virtual velocity 241 at 245. The resulting velocity 246 is then provided to gain transfer function 47, and the resulting velocity difference or error 248 is divided by gear rollout 242 at 249 to, in turn, generate the velocity or position difference 238.

The gear rollouts of the control as described above in connection with FIGS. 1A, 1B, 2, 2A, 3, 4, and 5 may correspond to the gear ratios of an actual bike having, for example, 18 or 24 gears as may be commonly found on an actual bike. Also, the controller may include a plurality of data sets corresponding to different gear rollout configurations that correspond to different actual gear sets. For example, the controller may include a first gear set corresponding to gearing found on a mountain bike, and the controller may include a second gear set (i.e., stored data) corresponding to a gear set from an actual road bike. A variety of such gear sets may be stored in the memory of the controller, and a particular gear set may be selected based upon the requirements of a particular user and/or the particular type of virtual course that the rider is experiencing. In this way, the rider cannot only change gears, but can also select a gear set that is suitable for the individual rider's mass, ability, and/or fitness level and the virtual course that the rider is on.

Figure 6:
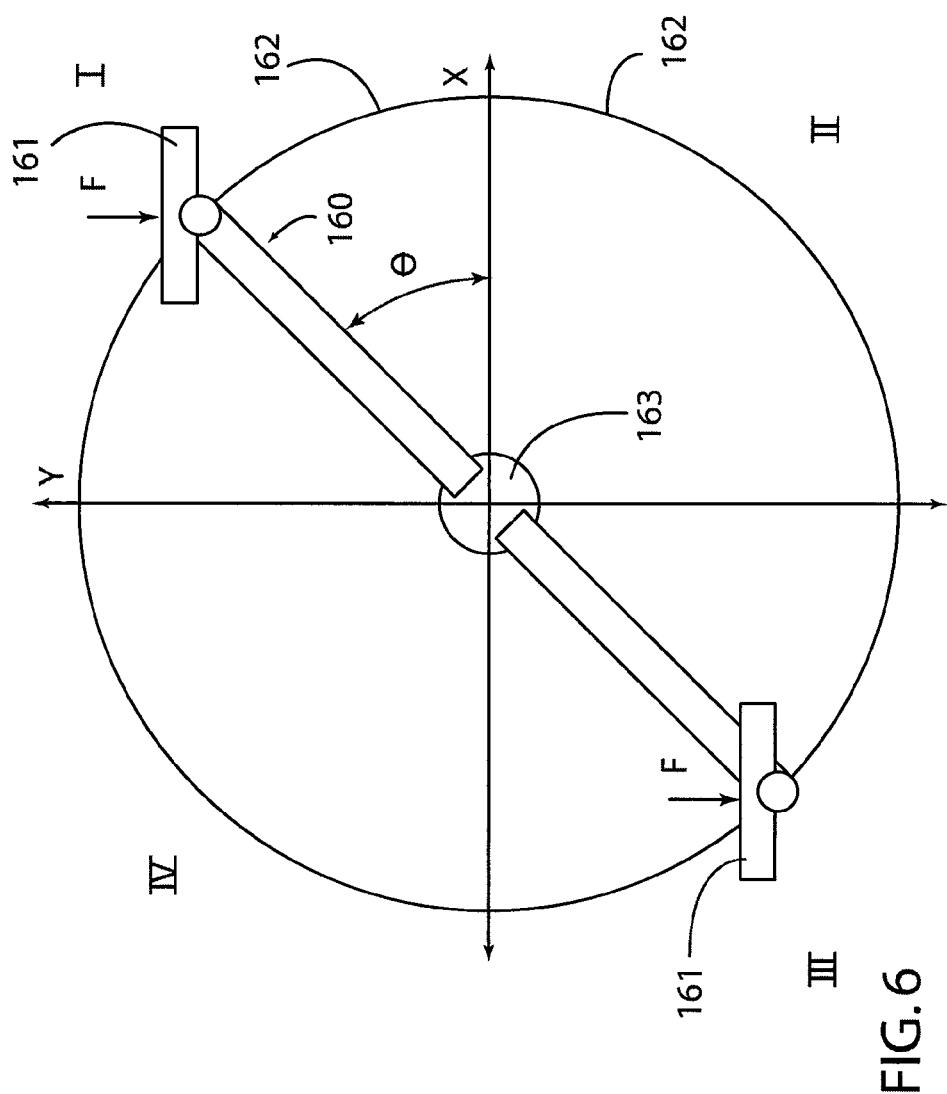
FIG. 6 is a schematic view of a crank and pedals of a stationary bike or a movable bike.
Figure 7:
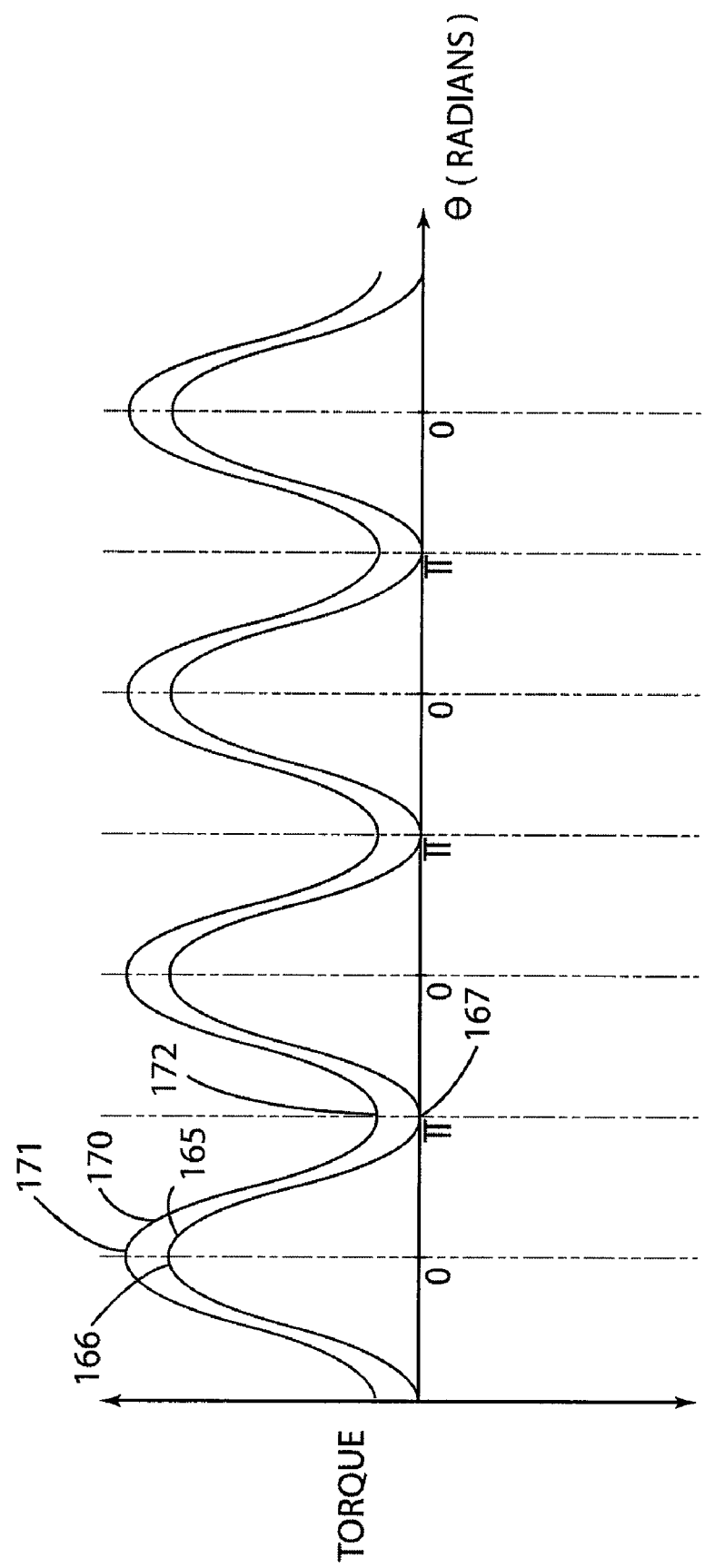
FIG. 7 is a graph showing force (torque) variations produced and experienced by a user as a function of crank angle.

With reference to FIG. 6, a bike crank 160 includes pedals 161 that rotate about axis 163 in a circular path 162. When a rider is riding on a real bike, the rider will generally tend to generate a higher force on a pedal 161 as the individual pedal 161 travels through the first quadrant I and second quadrant II adjacent the X axis. As each pedal 161 rotates around the circular path 162, the force generated by a rider will tend to be close to zero at 90° and negative 90° (top and bottom). Also, the force tends to be lower in quadrants III and IV than in quadrants I and II. In general, the force generated on an individual pedal 161 will vary periodically. The total torque generated by the rider is the sum of the forces applied to each pedal at each instant. Although the total torque generated by a user will tend to vary somewhat from one pedal revolution to the next, the total torque for most riders will be in the form of a periodic curve 165 as shown in FIG. 7. Although the exact shape of curve 165 will vary from rider to rider, and also will vary somewhat from one revolution of the crank 160 to another, and also under different riding conditions (slope, wind, riding surface, etc.) the curve 165 tends to have a shape that is similar to a sine wave. The graph of FIG. 7 illustrates the total torque generated on a crank by both pedals 161 as a function of the crank angle θ where the angle is in radians. In general, a force peak 166 in FIG. 7 will occur each time one of the pedals is at or near the X axis (FIG. 6) and the crank angle θ is zero or 180°. As the crank 160 rotates, the force generated by a rider falls off until it reaches a low point 167 that generally occurs when the pedals 161 are directly above and below the axis 163.

Due to the physics involved in riding an actual bike, the force exerted by the rider on an actual bike is equal to the resistance force felt by the rider from the pedals 161 due to the affects of acceleration, aerodynamic drag, friction, rolling resistance, hill angle, and the like. Thus, for a real (non-stationary) bike, the force both the rider input, and the resistance force experienced by the rider may take the form of curve 165. It will be appreciated that the present control system provides a force variation that varies periodically in substantially the same manner as a real bike, such that the force curve 165 is substantially duplicated by the control system of the present invention. In this way, the control system of the present invention provides a much more accurate simulation of the actual forces experienced by a rider.

Also, it will be understood that different riders may have different force curves. For example, a highly-trained experienced rider may produce a force curve 170. The force curve 170 includes a peak 171 at substantially the same crank angle as peak 166, and also includes a low force point 172 that occurs at the same crank angle θ as the low force point 167. However, because an experienced rider can generate force on the pedals throughout the pedal's range of movement, the low force point 172 may be a positive number that is above the zero force axis.

Although the forces are illustrated as having the shape of a sine wave in FIG. 7, it will be understood that the actual applied and resistance forces may not have the exact shape of a sine wave. Nevertheless, in steady-state cycling, most riders will tend to apply a periodic force to the pedals that is similar to a sine wave, and the resistance force is also generally a periodic function similar to a sine wave. Significantly, the controller of the present application provides a resistance force that is substantially the same as the periodic forces illustrated in FIG. 7. As discussed in detail above, the control system of the present application generates a force based, at least in part, upon the virtual acceleration. Because the control system and apparatus of the present invention provides for the various dynamic and other factors associated with riding a real bike, the force experienced by a rider is substantially the same as those experienced by a rider on a real bike.

Figure 12:
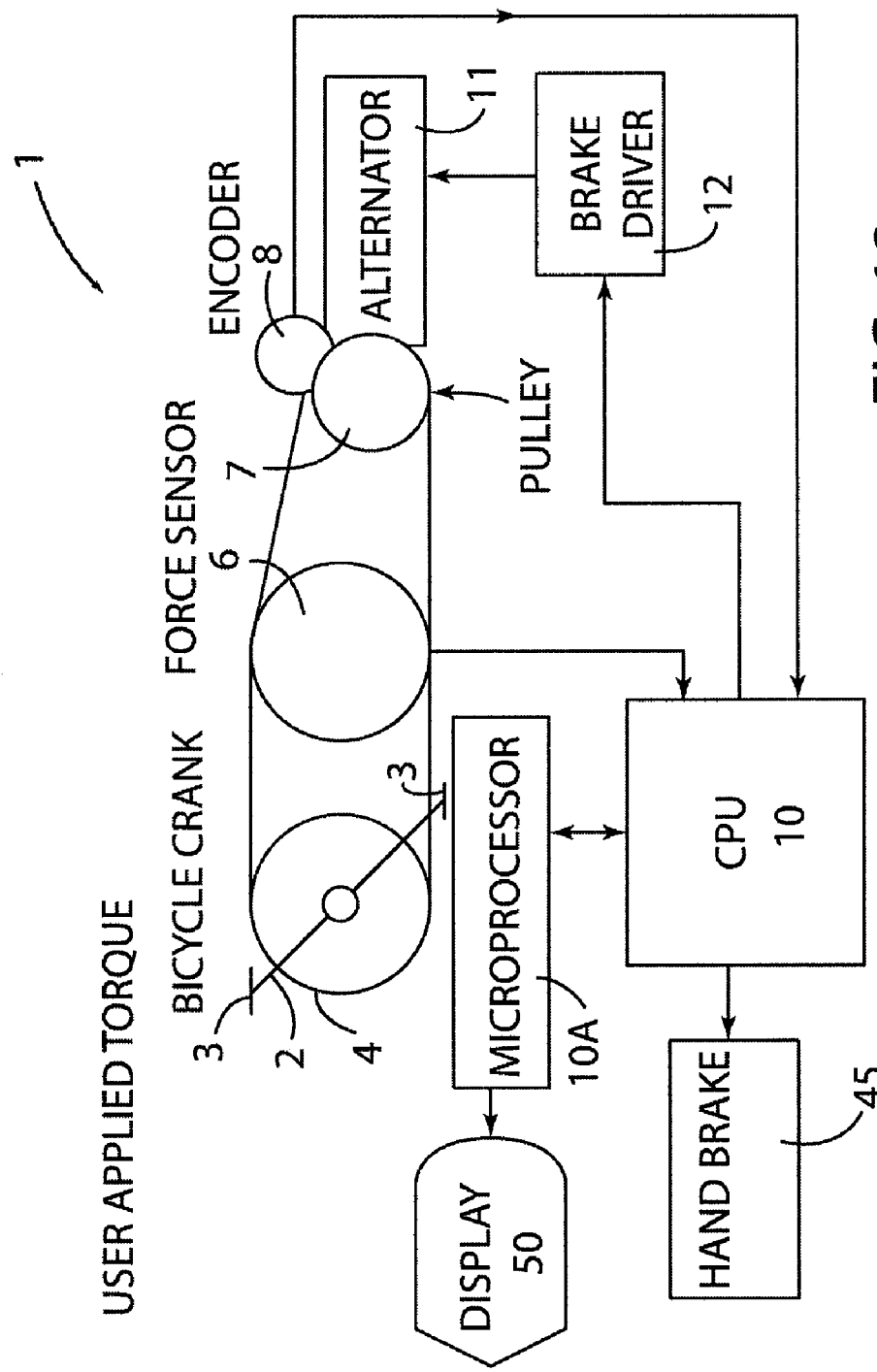
FIG. 12 is a schematic diagram of a stationary bike and control system according to one aspect of the present invention in which a forced sensor is utilized in the control system.

FIG. 12 is a schematic drawing of a stationary bike 1 including a force sensor 6 according to another aspect of the present invention. The stationary bike 1 includes a crank 2 with pedals 3 and a drive member 4 such as a pulley, toothed cog or the like. The drive member 4 engages a flexible drive member 5. The flexible drive member 5 may be a toothed belt, chain, or the like. A rotary inline force sensor 6 engages the flexible drive member 5, and measures the tension in the flexible drive member 5. Although force sensor 6 is preferably a rotary inline type sensor, numerous other force sensing devices could be utilized. For example, a force sensor could be configured to measure the force applied to the alternator. The force sensor could be positioned between the alternator and the support structure holding the alternator. Alternately, a force sensor could be configured to measure the force acting on the crank arms, or on the pedals. A belt tension monitoring device or the like could also be utilized. A force sensor could also be mounted to the alternator pulley with a slip ring set-up. Still further, if the degree of movement of a particular structure as a function of applied force is known, the deflection may be measured and utilized to calculate the applied force.

Rotary inline force sensor 6 is operably coupled to a Central Processing Unit ("CPU") 10, and provides force data to the CPU 10. The flexible drive member 5 engages a driven member 7 that is operably coupled to an encoder 8. The encoder 8 is configured to determine the position and/or velocity of the flexible drive member 5, so the rotational rate (angular velocity) of crank 2 can be determined. The encoder 8 is operably connected to the CPU 10, and thereby provides velocity and/or position data to the CPU 10. An alternator 11 is operably coupled to the driven member 7 to thereby provide an adjustable resistance force based upon input from the brake driver 12. The brake driver 12 is operably coupled to the CPU 10 to provide force control. Microprocessor 10A is operably coupled to display 50 to provide visual information (see also FIG. 11) to the user concerning the bike's virtual speed, the power generated by the user, pedal r.p.m., virtual hill angle, and the like. Also, as described in more detail below, a hand brake 45 is operably coupled to CPU 10 to provide a braking force feedback that may be utilized in control of the bike 1.

Figure 2A:
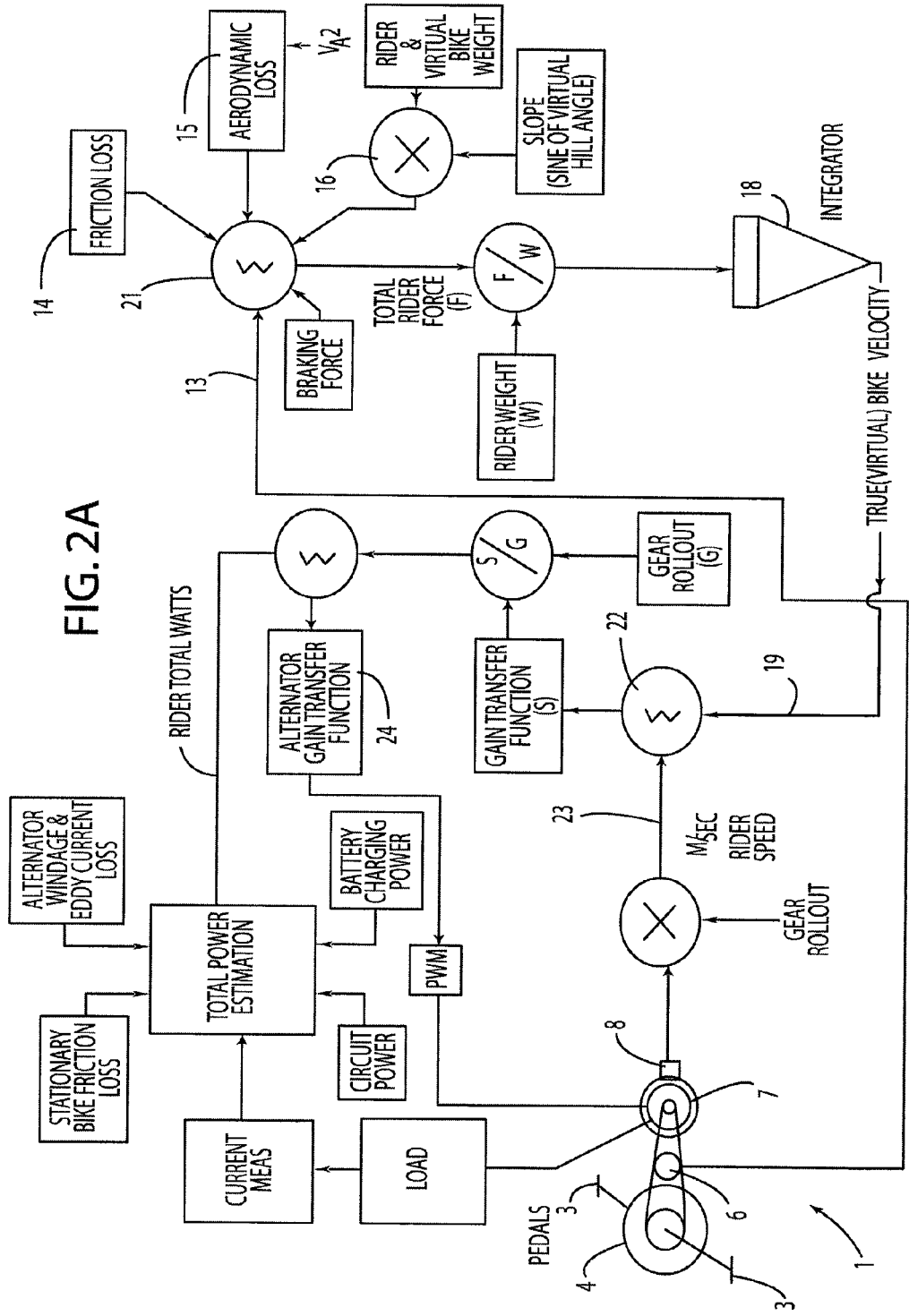
FIG. 2A is a schematic diagram of a control system and apparatus according to another aspect of the present invention utilizing a measured force.

With reference to FIG. 2A, a control system arrangement for a bike 1 according to another aspect of the present invention (FIG. 12) utilizes the measured force from force sensor 6 instead of the estimated force as illustrated in FIGS. 1A and 1B. In the system of FIG. 2A, the force measured by the force sensor 6 is input into the summation 21 and added to the friction loss 14 and windage/aerodynamic drag loss 15, braking force (optional) and the force 16 due to gravitational forces and the slope of the virtual hill to calculate the total force F. The acceleration is then calculated by dividing force F by the rider mass, and the acceleration is then integrated in the integrator 18 to provide the velocity. The true bike velocity 19 from the integrator goes into a summation 22 along with the measured velocity 23. The difference between the measured velocity 23 and the true bike velocity 19 is then multiplied by a large gain transfer function 24 as discussed above. Thus, although the principle of operation of the system illustrated in FIG. 2A is substantially similar to the system of FIG. 1B, the use of measured force rather than estimated force provides for a potentially more accurate simulation. FIG. 2 shows another control system that utilizes measured force at the pedals rather than a force estimate.

The control systems may optionally include a brake feature to simulate the effects of braking. With reference to FIG. 2A, a braking force may also be added to the other forces at summation 21 to thereby reduce the calculated bike velocity. A braking force may also be added to total true forces shown in FIGS. 1A and 1B. Braking may be utilized when the bike simulator is part of a full rider experience, like a computer game, where riders might ride together, jockey for position, go around curves, draft each other and the like. In this example, the brake may be used to prevent collisions or falling in the simulation. A simulation of this type may include a display of the rider's position and the environment of the ride.

With reference to FIG. 19, a brake lever 40 may be rotatably mounted to a handle 41 of a stationary bike. Handle 40 is biased away from a "brake engaged" position shown as line "B" in FIG. 12 towards a disengaged position shown as line "A" (FIG. 19). As a rider rotates handle 40 from disengaged position A through angle θ1 to the brake engaged position B, a relatively small torque T1 is generated due to a rotary spring (not shown) or the like. However, once the handle 40 reaches engaged position B, the handle 40 hits a very stiff spring or a rigid stop to thereby provide a tactile feel to a rider that is substantially similar to a real bicycle having caliper type brakes. The force (torque) T2 acting on handle 40 in engaged position B can be measured and utilized as feedback (i.e., input) into the control systems of FIGS. 1A, 1B, and 2A. Alternately, if a stiff spring (not shown) is used instead of a stop at position B, the movement of handle 40 can be multiplied times the spring constant to provide a brake force for the control system. An electrical or optical line 42 may be utilized to operably connect the force (or displacement) sensor to the controller 10 of FIGS. 12 and 13.

The controller may utilize the measured (applied) force on the brake in a variety of ways to control the resistance force. For example, the function describing the velocity lost from the virtual bike velocity may be a linear equation, a polynomial, or an exponential function of the force applied to brake lever 40. Alternately, the velocity (power) loss may be estimated from empirical data utilizing a look up table or a curve-fit such as a spline.

Figure 13:
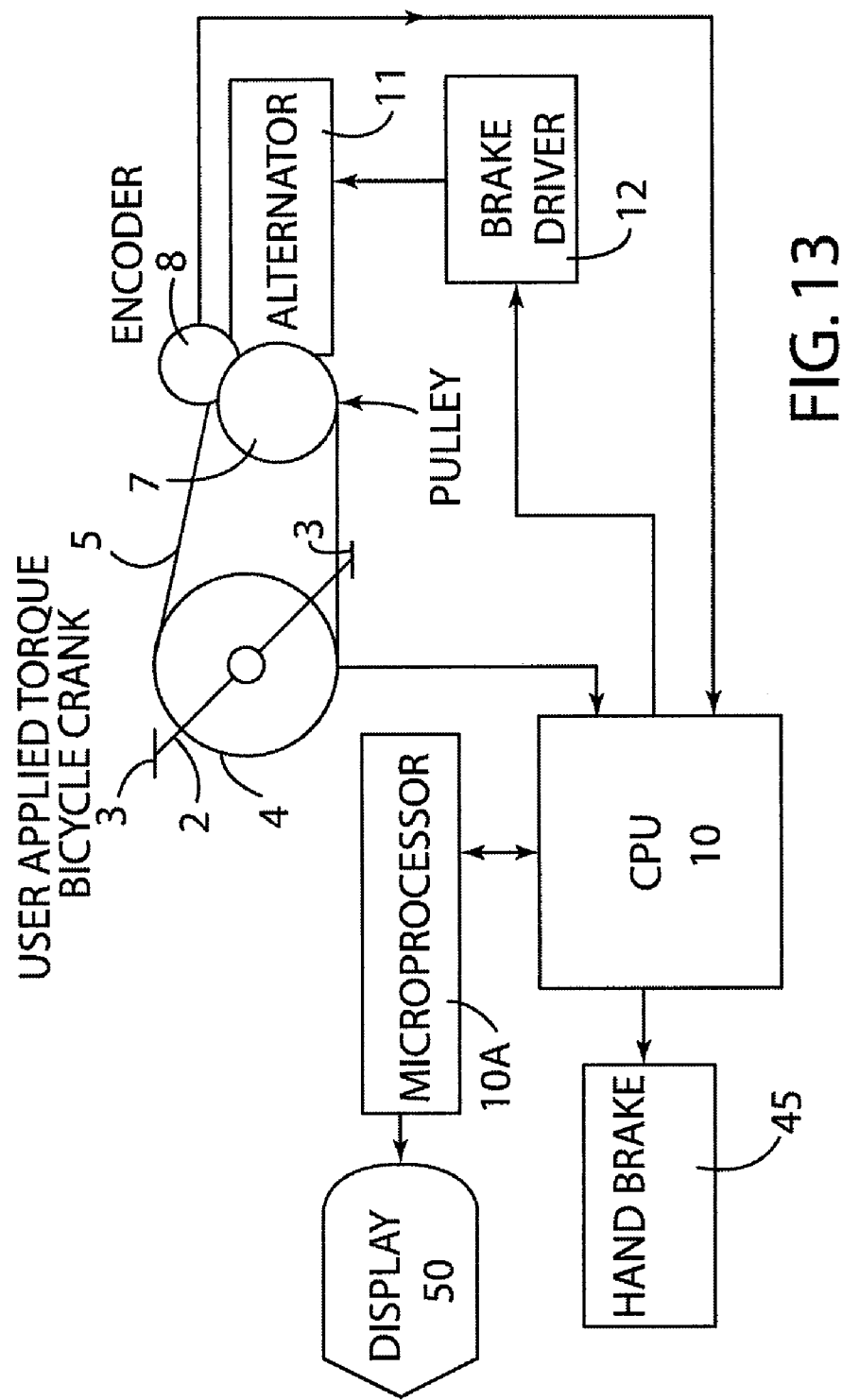
FIG. 13 is a schematic diagram of an exercise bike according to another aspect of the present invention in which the bike does not include a force sensor.

With further reference to FIG. 13, a stationary bike 20 according to another aspect of the present invention is similar to the stationary bike 1 of FIG. 12, except that stationary bike 20 does not include a force sensor 6. Stationary bike 20 includes a crank 2, pedals 3, drive member 4, flexible drive member 5, driven member 7, encoder 8, processor 10, alternator 11, hand brake 45, display 50 and brake driver 12. These components are substantially the same as described above in connection with stationary bike 1 (FIG. 12). However, because stationary bike 20 does not include a force sensor, control of bike 20 may be implemented via a power-based force estimation arrangement as illustrated in FIGS. 1a and 1B.

As discussed in detail in U.S. Pat. No. 6,454,679 (previously incorporated herein by reference), a basic equation of motion can be expressed as:

$$V(\text{update}) = V + [(F_a - F_d) - m_1 * g \sin \theta](t_{inc}/m_1*) \quad (1.1)$$

With further reference to FIG. 14, for a bicycle simulation, this equation becomes:

$$V(\text{update}) = V + [(F_a - F_d) - (m_1 + m_2) g \sin \theta - 0.5 C_{1\rho} Q V^2] \\ (t_{inc}/(m_1 + m_2)) \quad (1.2)$$

The input variables for the bike equation are illustrated in FIG. 14.

Figure 15:
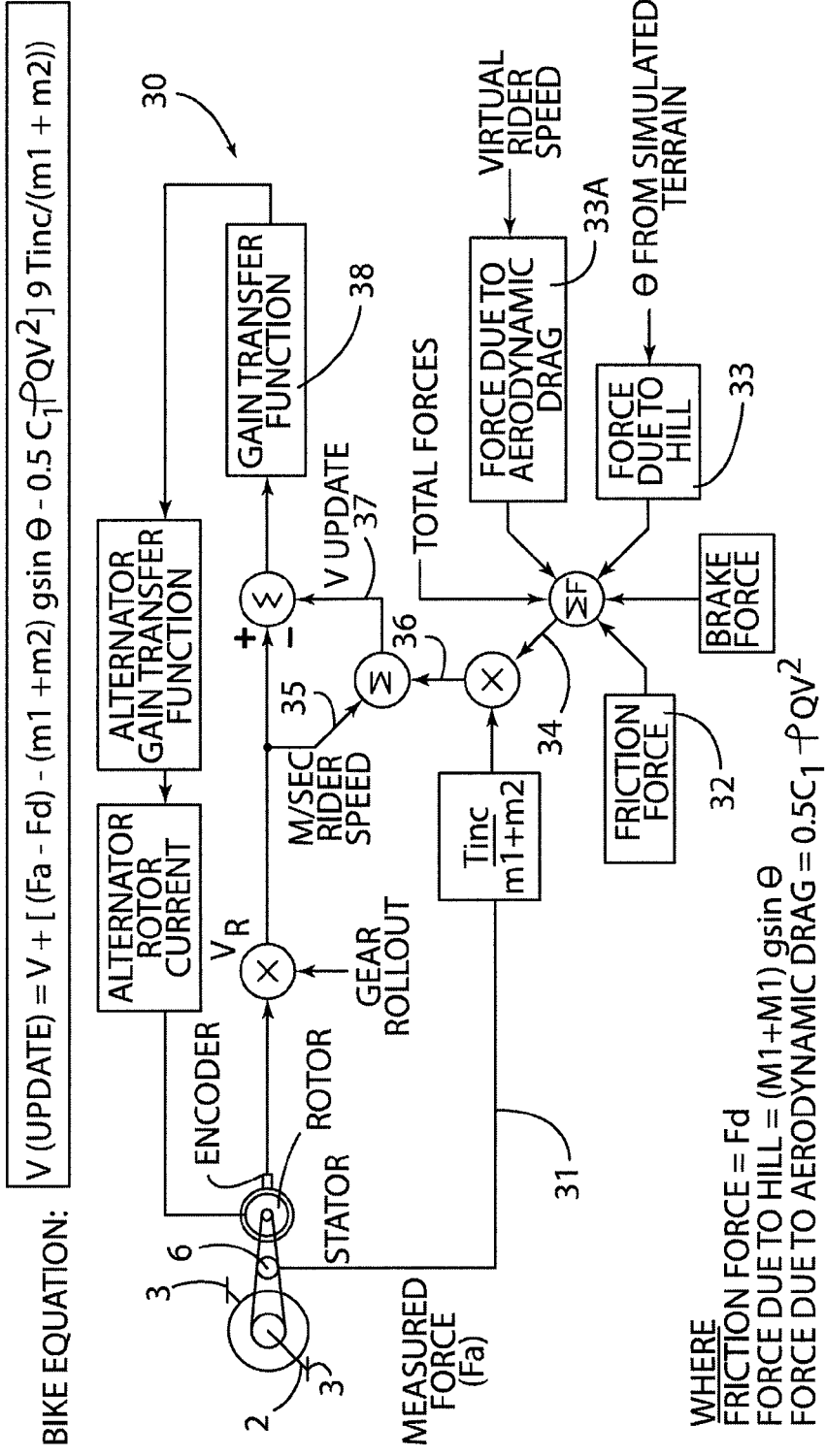
FIG. 15 is a schematic diagram showing a control system according to another aspect of the present invention.

With further reference to FIG. 15, a stationary bike system 30 utilizing the bike equation (1.2) utilizes the difference between the update velocity (V(update)) and the measured velocity V multiplied times a large gain (i.e., numerical value) to determine the amount of force to be generated by the alternator. A force 31 from force sensor 6 is added to the friction force 32, the force due to the hill 33, and the force due to aerodynamic drag 33A at summation 21 to provide a total force 34. The drag force $F_d$ is given in FIG. 14, and the force due to a virtual "hill" is given by:

$$-F_{hill} = (m_1 + m_2) g \sin \theta; \text{ where } \theta = \text{the slope angle of virtual hill} \quad (1.3)$$

The force due to aerodynamic drag is given by:

$$F_{aero} = -0.5 C_{1\rho} Q V^2 \quad (1.4)$$

It will be understood that the coefficient of drag $C_1$ may be adjusted to account for the differences between individual users. Also, the control system may adjust the coefficient of drag $C_1$ based upon whether or not a user's hands are grasping the tops 27A (FIG. 1) or drops 27B of handlebar 27. This may be done based upon a signal from sensors on the handlebars. Alternately, the bike 1 may include a user input feature that permits a user to select either a "tops" riding configuration or a "drops" riding configuration. The controller may have stored information concerning coefficients of drag for the two riding positions, and thereby adjust the aerodynamic drag factor accordingly. Or the controller may contain information that will allow it to calculate aerodynamic drag coefficients based on user mass, and or height and or other bodily dimension.

Also, the controller may be programmed to provide coefficients of drag that simulate aerodynamic drag associated with different types of bikes. For example, the controller may have stored coefficients of drag for mountain bikes and for road bikes or recumbent bikes. Still further the controller may include a feature that permits it to calculate or otherwise determine the coefficient of drag for a particular user based on the user's weight, height, or the like. In this way, the controller can simulate the effects of aerodynamic drag for different size riders, different rider handlebar positions, and different bike styles/configurations. The total forces 34 are divided by $T_{inc}/(m_1+m_2)$, and this quantity 36 is added to the measured rider velocity V to give V(update) 37. The difference between the velocity V and V(update) is multiplied by a relatively large number (gain) to provide the feedback for the amount of braking force generated by the alternator.

Alternately, equation (1.2) can be expressed as:

$$\Delta V = V(\text{update}) - V = V + [(F_a - F_d) - (m_1 + m_2) g \sin \theta - 0.5 C_{1\rho} Q V^2] / (t_{inc}/(m_1 + m_2))$$

Figure 16:
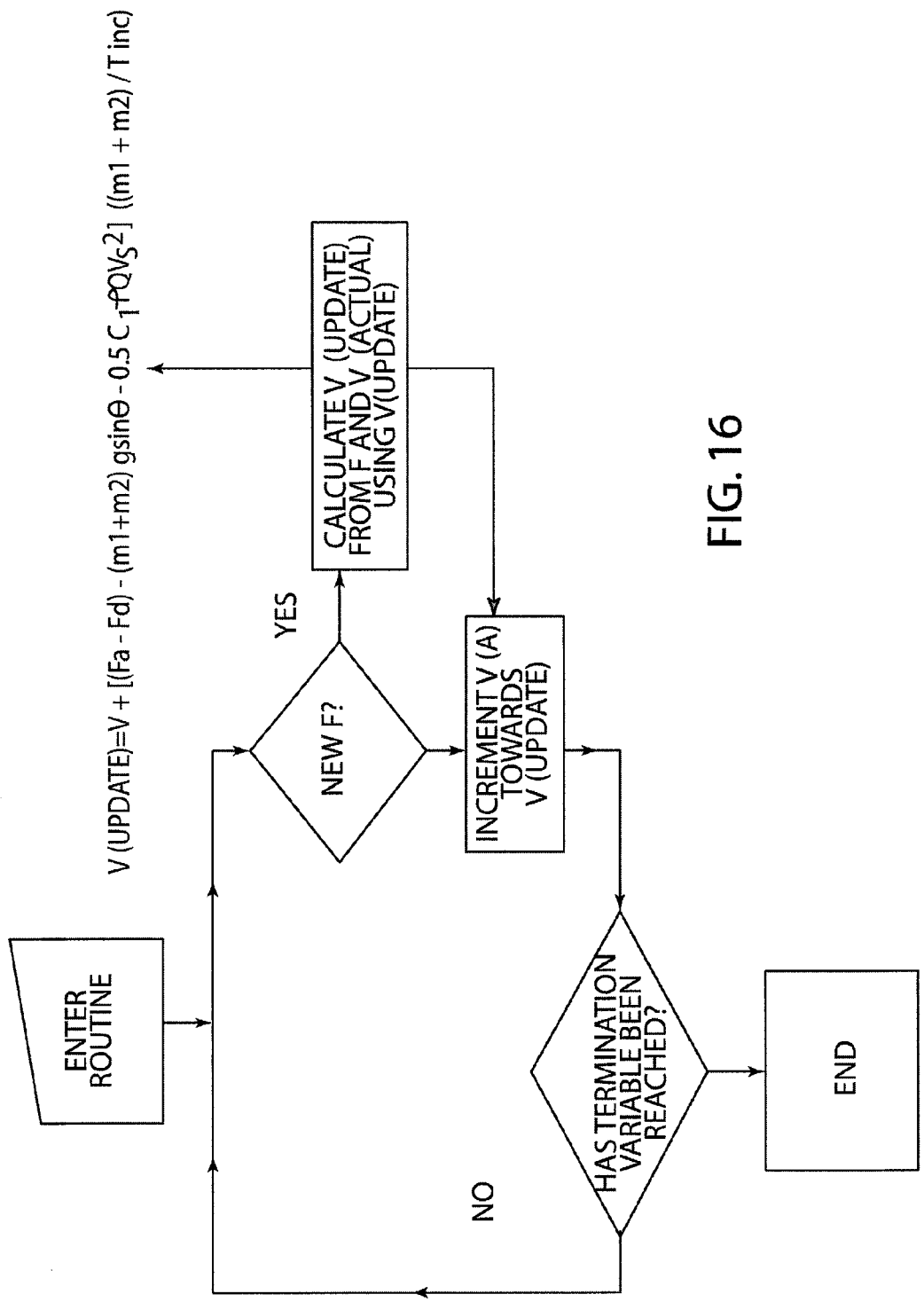
FIG. 16 is a diagram showing a haptic routine implementing the equation of FIG. 8.
Figure 17:
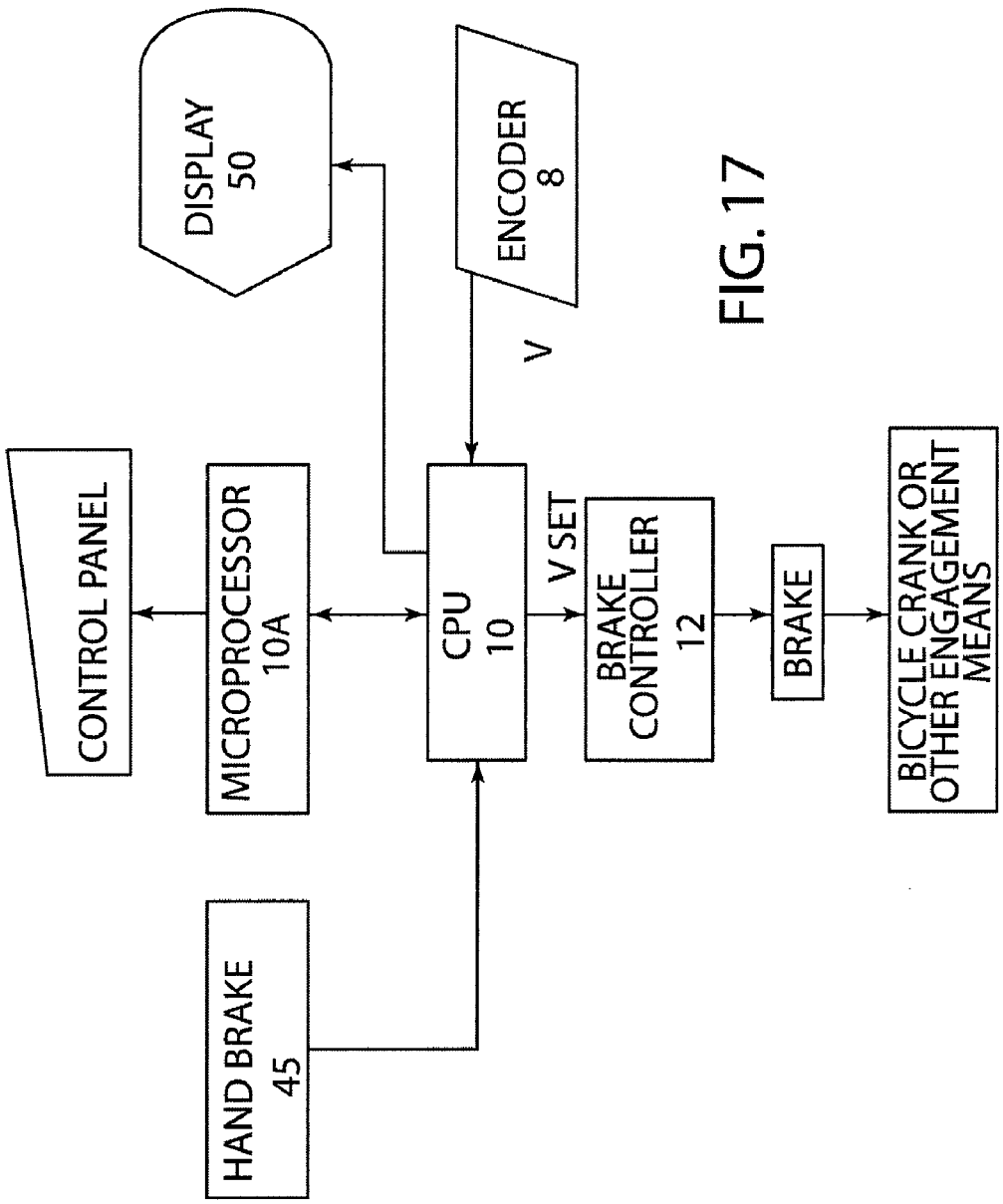
FIG. 17 is a diagram showing a control system that does not utilize a force sensor according to another aspect of the present invention.
Figure 18:
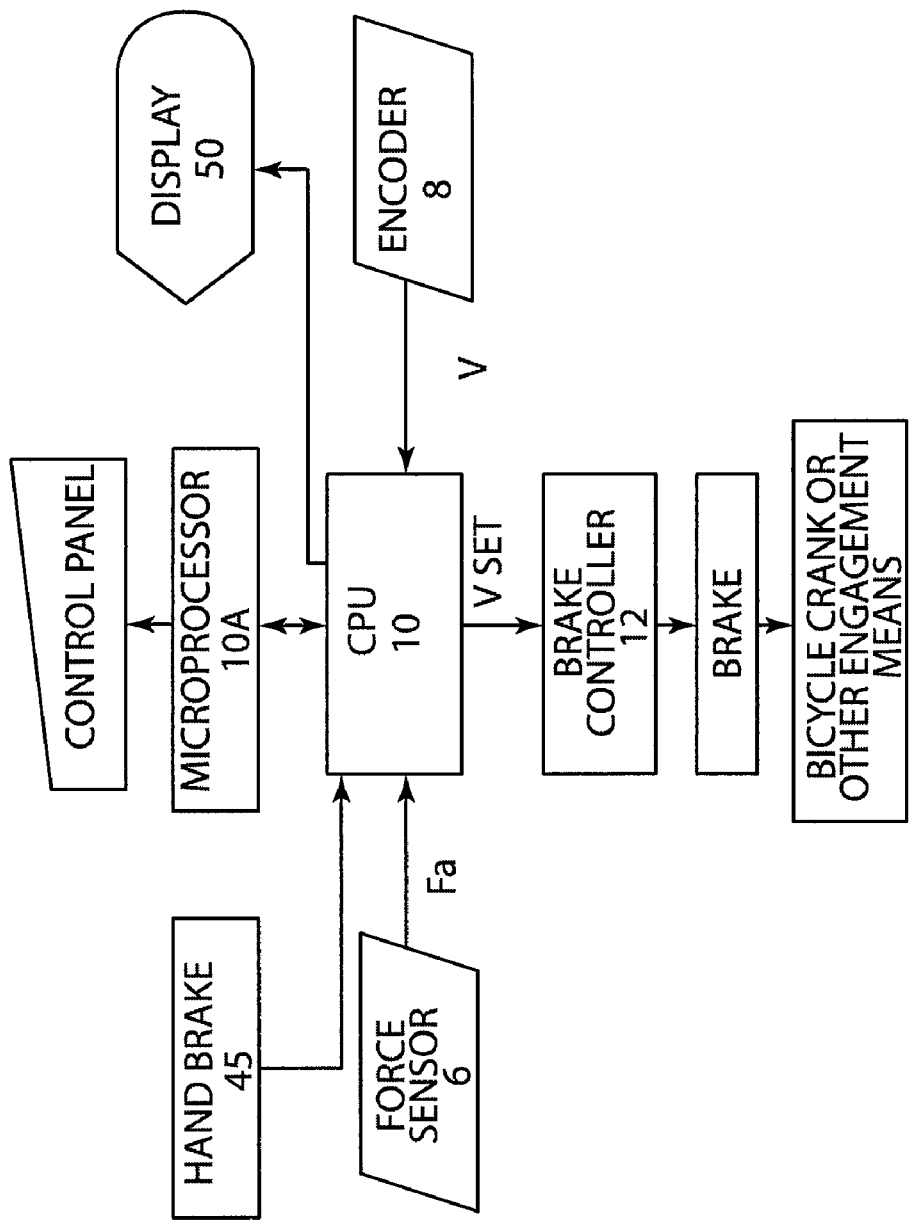
FIG. 18 is a diagram of a control system utilizing a force sensor according to another aspect of the present invention.

In this way, the difference $\Delta V$ between the measured velocity V and V(update) can be directly calculated and multiplied by a large gain to provide feedback control. Thus, the quantity 36 in FIG. 15 can be directly input to the gain transfer function 38 to provide feedback to the alternator to control the force generated by the alternator. The haptic routine for implementing the system of FIG. 15 is illustrated in FIG. 16, and a block diagram illustrating the system of FIG. 15 is shown in FIG. 17.

As discussed above, the drag force $F_d$ for a bicycle can be calculated utilizing the equation of FIG. 14. Also, the force a rider experiences due to a hill is:

$$F_{hill} = (m_1 + m_2) g \sin \theta \quad (1.3)$$

and the aerodynamic drag can be calculated as:

$$F_{aero} = -0.5 C_{1\rho} Q V^2 \quad (1.4)$$

Each of the forces $F_d$, $F_{hill}$ and $F_{aero}$ are functions of velocity or the slope of the virtual hill. The other forces acting on the rider are the result of the angular and linear acceleration of the rider/bike and the moment of inertia and mass of the rider/bike.

Accordingly, a stationary bike according to another aspect of the present invention may include a flywheel having an adjustable moment of inertia. The flywheel may be operably coupled to a controller, such that the rider's weight can be input, and the flywheel can be adjusted to provide an inertia that is the equivalent of an actual rider on a bicycle. In other words, the inertia of the flywheel can be adjusted to provide the same amount of acceleration for a given force on the pedals as a rider would experience on a "real" bicycle. The friction force Fd (including rolling resistance), the force due to the virtual hill (Fhill), and the forces due to the aerodynamic drag (Faero) can be calculated based on velocity and hill angle (and rider/bike mass) and input into the processor and utilized to adjust the resistance force generated by the alternator or friction brake. In this way, the adjustable inertia flywheel can be utilized to model the forces due to acceleration, and the velocity measured by the encoder and the hill angle from the simulation can be utilized to provide additional forces simulating the effects of rolling friction, hills, and aerodynamic drag.

A stationary bike according to yet another aspect of the present invention utilizes measured acceleration rather than measured force as an input to the control system. In general, force is equal to mass times acceleration. Thus, rather than measuring force directly as described above, the acceleration can be measured (or calculated as the derivative of velocity, which, in turn, is the derivative of position) and multiplied times the effective mass of the system to thereby obtain "measured" force. This "measured" force may be utilized in substantially the same manner as described above in connection with the direct force measurement aspects of the present invention.

Still further, the position of the bike pedals may also be measured, and the difference between the measured positions may be utilized as a control input. For example, a virtual velocity calculated according to the control systems described above may be integrated to provide a virtual position. The difference between this virtual position and a measured position may then be utilized as the control input rather than a velocity difference. It will be appreciated that the gain/transfer function may be somewhat different if a position difference is utilized as a control input.

Alternator Control (FIGS. 20-25)

Use of an alternator in exercise equipment to absorb the energy generated by the exercising person is known. The advantages of using an alternator in exercise equipment are that an alternator is low in cost and easy to control e.g. in an alternator by use of both the rotor current field and the load, and thereby the forces applied to the exercising person.

In the following description of another aspect of the present invention, an alternator type device will be used as an example, but it will be understood that this is merely for purposes of explaining the concepts involved, and therefore does not limit the application of these concepts to alternators.

In a conventional alternator the rotor consists of a coil that generates a magnetic field. As the rotor rotates, this field couples to the stator coil in such a way a voltage is generated across the stator coil. In prior art arrangements, the form of the voltage across the stator field is typically a 3 phase AC waveform. Inside the alternator package 6 diodes are used in a conventional full-wave rectification circuit to generate DC from the AC stator voltage. In a vehicle application of an alternator, this DC voltage is used to charge the vehicle battery.

Figure 20:
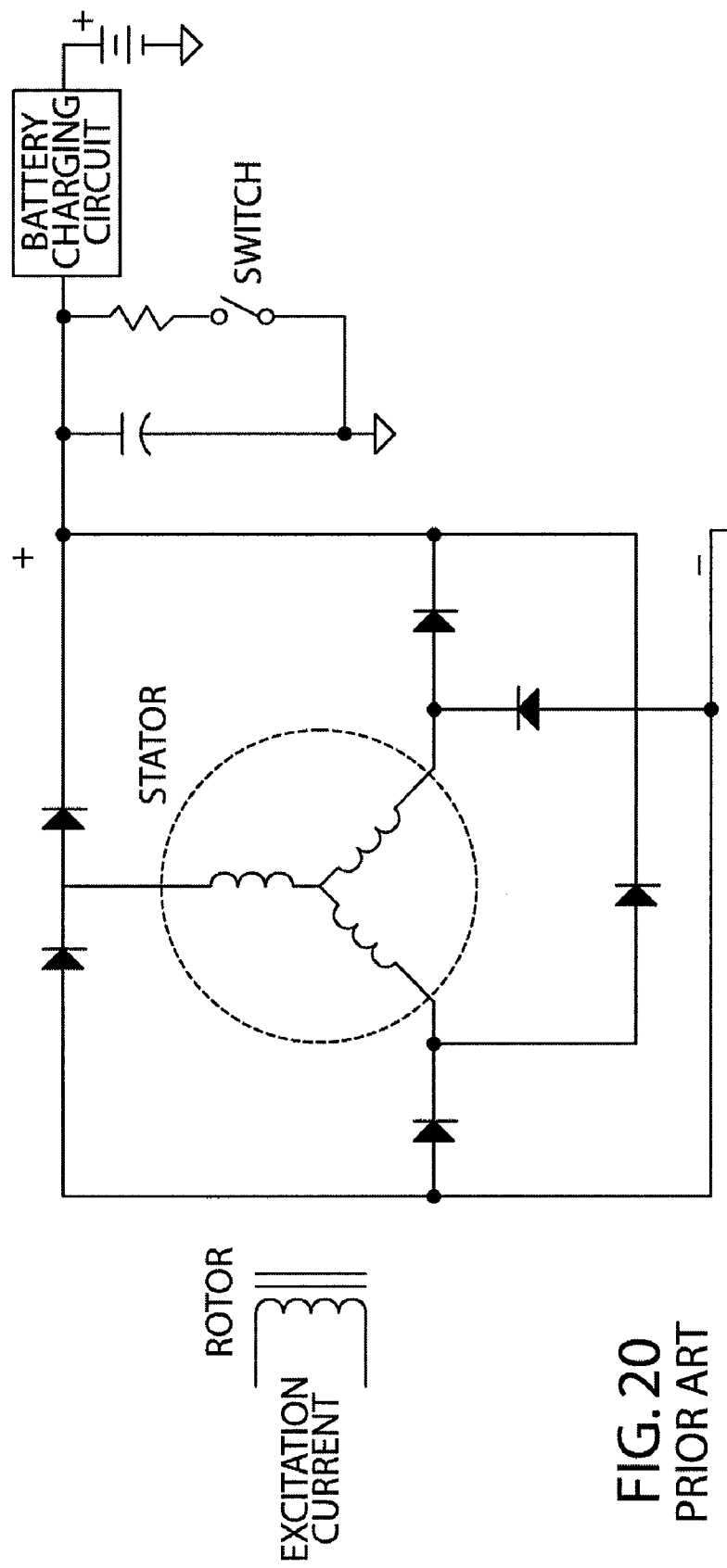
FIG. 20 is a circuit diagram of a prior art alternator control circuit.

When used in an exercise device, the DC voltage generated by the alternator is applied to a switchable load. A typical prior art alternator arrangement for exercise equipment is illustrated in FIG. 20. To change the braking force applied to the exercising person, the load is commonly switched on and off so that the average current passing out of the alternator is controlled. The average current times the average voltage equals the wattage being extracted from the exercising person. Sometimes, in addition to a switchable load, the rotor current is adjusted as well to charge the battery correctly.

In prior art arrangements, a microprocessor is typically used to control the load on the exercising person. The microprocessor changes the current in the rotor and switches the load on the alternator on and off to generate the desired load on the exercising person. Often the microprocessor uses both the switchable load and the rotor excitation current to adjust both the load on the exercising person and also the voltage and current applied to the exercise device's battery to charge it. Thus, the microprocessor has two control variables, rotor excitation current and load value, and also has two goals, obtaining correct exercise load and charging the battery correctly.

Figure 21:
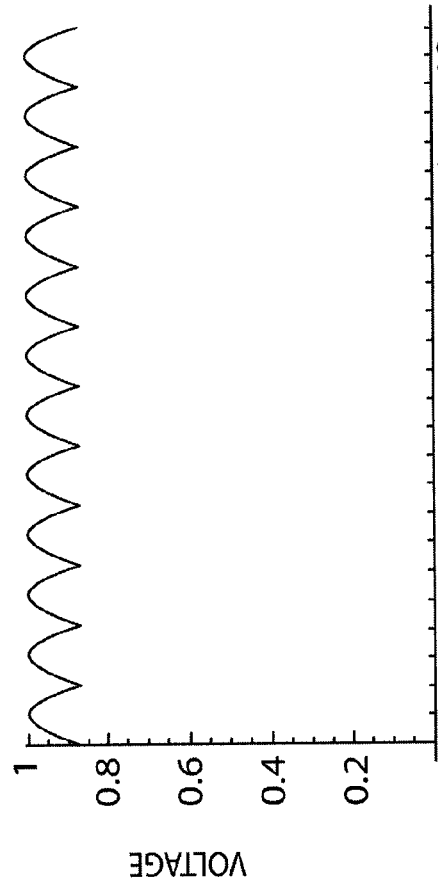
FIG. 21 is a diagram showing power ripple produced by the alternator control circuit of FIG. 20.
Figure 22:
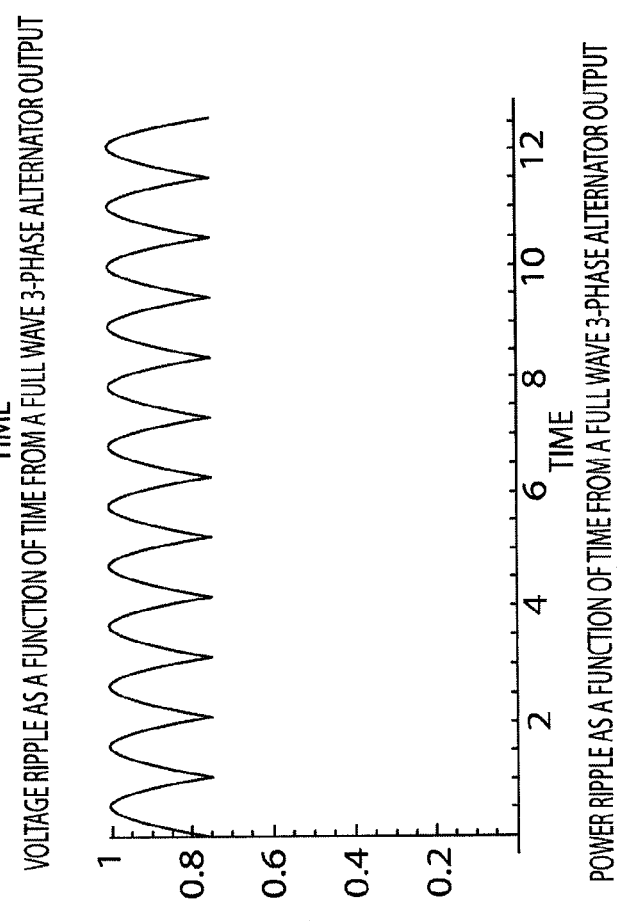
FIG. 22 is a graph showing voltage ripple produced by the alternator control circuit of FIG. 20.

Several disadvantages pertain to the use of an alternator in this way (i.e. use of a bridge and a DC load). First, torque ripple is caused by the ripple in the stator voltage. This torque ripple can be felt by the exercising person as a vibration or "bumpiness" in the resistance force applied to the exercise device. Typically, the torque ripple is about 25% of the torque generated by the alternator. Examples of power and voltage ripple as a function of time are shown in FIGS. 21 and 22. Another disadvantage is that an alternator used with a bridge rectifier does not utilize the alternator in an optimum way as a brake, because only a single pair of windings is generating current at any given time. Thus, the maximum power that can be extracted from the exercising person for a given alternator is less than could be obtained if the alternator's stator winding were loaded in such a way as to use all the stator windings at once. Yet another disadvantage is that a typical load circuit is very slow in responding to control changes in the exercise equipment, because the circuit used for the stator DC voltage commonly has a large capacitor to smooth the control behavior. Another disadvantage is that the rotor current cannot be set arbitrarily to obtain optimum exercise performance, because the stator needs to generate voltage in excess of the battery voltage in order to charge the battery (typically 12 volts). Therefore the rotor generates eddy current losses and other losses in the system that deleteriously affects the exercise device performance particularly at the lower range of resistances provided.

A circuit 155 (FIG. 23) according to one aspect of the present invention alleviates or eliminates these disadvantages. The circuit 155 eliminates all, or substantially all, torque ripple from the alternator. Also, the circuit 155 uses all the alternator windings simultaneously, such that a given alternator can generate 50% more load. Also, the circuit 155 is very fast in response to the control input of the brake (force control) system, and it also allows for arbitrary setting of the rotor current, so very large load dynamic range can be obtained while still charging the battery and avoiding generation of eddy current losses and the like that would otherwise effect exercise device performance.

Figure 23:
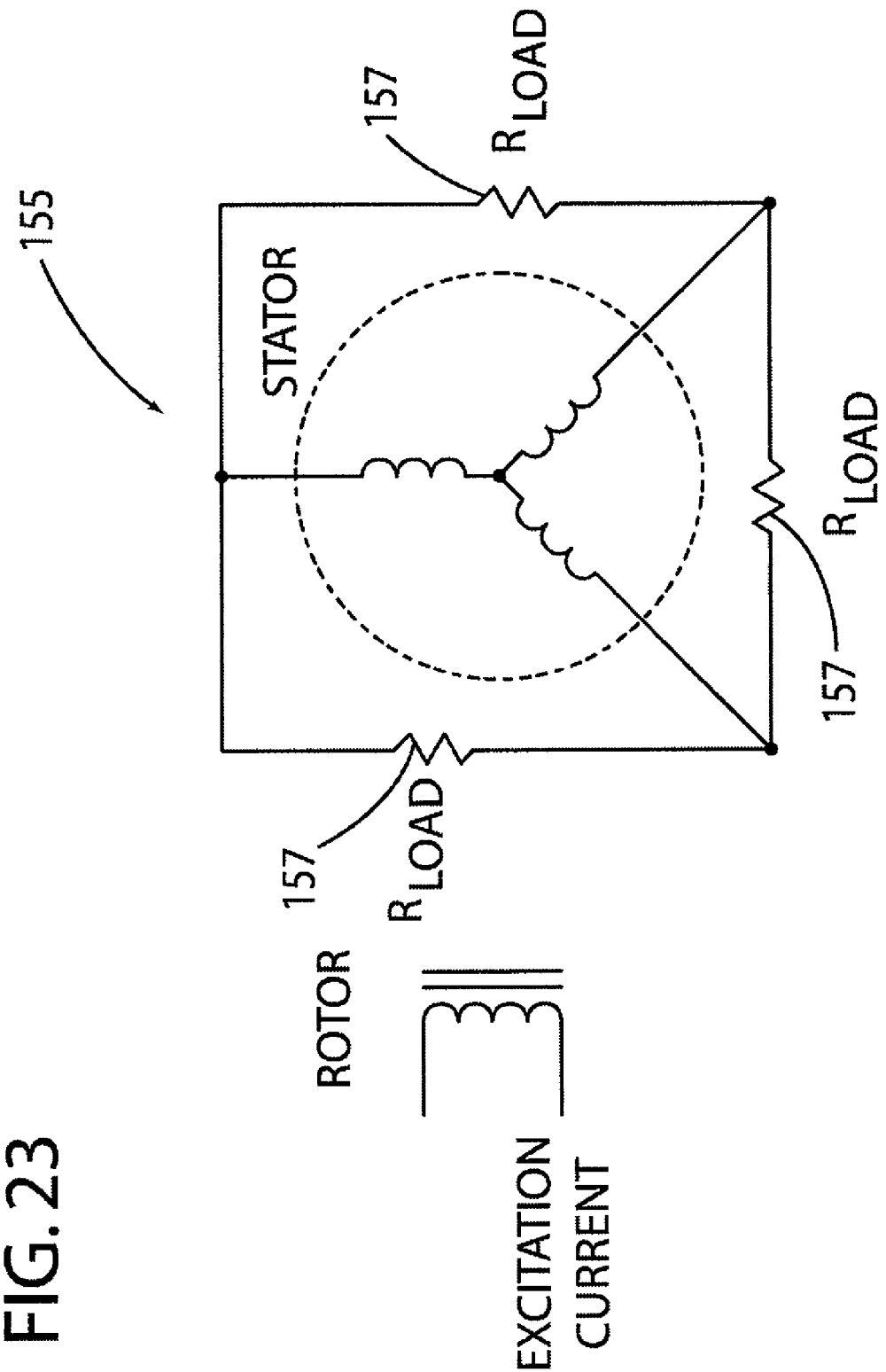
FIG. 23 is a circuit diagram of an alternator control arrangement according to another aspect of the present invention.
Figure 24:
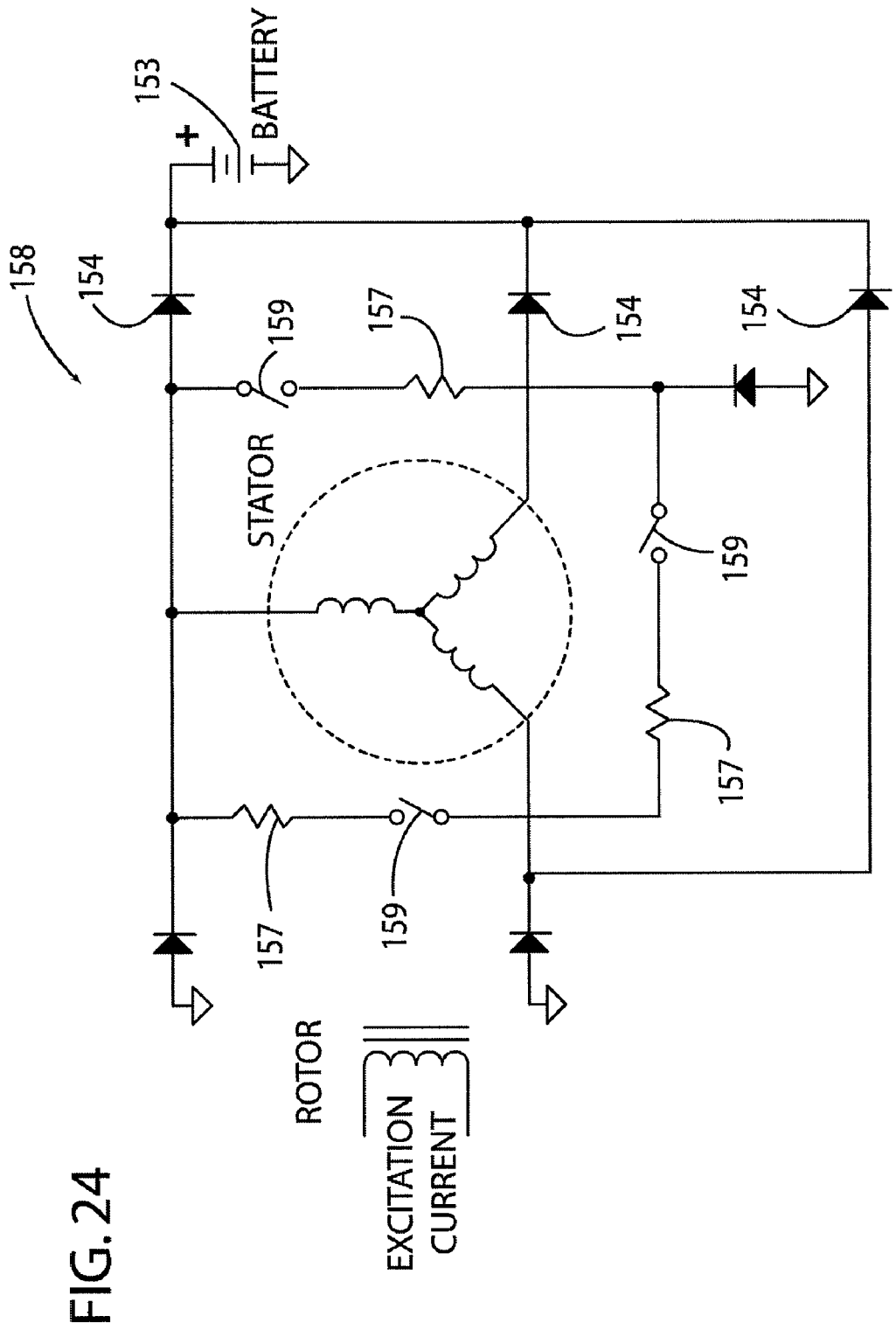
FIG. 24 is a circuit diagram of an alternator control arrangement according to another aspect of the present invention.

With reference to FIGS. 23 and 24, in circuits 155 and 158 according to the present invention the load on the AC voltage generated by the alternator stator. In circuits 155 and 158, the magnitude of the excitation current (also known as "field current") is controlled to thereby vary the resistance force developed by the alternator. In general, if the excitation current is zero, no current will flow through resistors 157 even if the rotor is moving, and the alternator will not generate any resistance force (torque). However, as the excitation current increases, current flows through the resistors and the alternator produces a resistance force felt by the user of the exercise equipment. It will be understood that the resistance torque of the alternator for a given excitation current is generally constant (i.e., the resistance torque does not vary with r.p.m. of the alternator). However, the power taken from the system by the alternator varies with r.p.m. Therefore, if the control system of the exercise equipment is configured to control the power of the alternator as the control variable, the alternator gain or transfer function will be configured to account for the variation of power due to r.p.m. (or other system component).

Significantly, the load configuration of circuits 155 and 158 has no intrinsic torque ripple. The reason for this is as follows. The 3 outputs of the alternator can be thought of as 3 sine wave voltage generators with voltages $A \sin(\omega t)$, $A \sin(\omega t+ \frac{2}{3}Pi)$, and $A \sin(\omega t-\frac{2}{3}Pi)$. These represent conventional 3 phase waveforms. The instantaneous power out of each winding is then $A \sin(\omega t)^2/Rload$, etc., and the sum of these three power terms is $1.5 A^2$, so it has no dependency on time at all. Therefore the power output of the alternator has no power ripple, and because of this and the fact that power=force×velocity, it has no torque ripple.

Additionally, circuits 155 and 158 generate current from all the windings at once. In contrast with a conventional circuit which generates approximately $A^2/Rload$ output power for a given stator winding peak voltage A, circuits 155 and 158 obtain $1.5 A^2/Rload$ power, or 1.5 times the power, without drawing higher than the allowable current from the stator windings. In other words, the load power factor in circuits 155 and 158 is 1, while the load power factor on a conventional circuit is $1/Sqrt[3]$. It is well known that a higher power factor results in lower internal heating for a given load in devices such as alternators and motors. Thus, the circuits 155 and 158 are capable of generating 1.5 times the load of a conventional circuit without overheating the alternator. Alternately, a smaller alternator can be used to generate the same load. This increase in power factor facilitates control according to the invention because a control system according to the invention may require high peak power from the same device (rather than a steady, unrealistic power output). This peak power may possibly be close to twice the power required during the use of a conventional alternator load on a conventional exercise bike.

Another advantage of circuits 155 and 158 is that the circuits respond very quickly to control changes. Only the rotor excitation current is used for the load control, and the alternator responds almost instantaneously to the rotor excitation current changes (on the order of less than 1 millisecond, which for exercise equipment applications is essentially instantaneous). Yet another advantage of circuits 155 and 158 is that the rotor excitation can run from 0 volts to full rotor voltage, so the dynamic range of control is very large. Since the power into the load is proportional to the square of the voltage on the stator, and the voltage on the stator is proportional to the excitation current, the power out of the alternator is proportional to the square of the excitation current. So a 100:1 change in rotor current results in a 10,000:1 change in the load power, a very large dynamic range.

The circuit 155 of FIG. 23 does not include a provision for charging a battery. However, as shown in FIG. 24, a circuit 158 according to another aspect of the present invention includes battery charging capabilities. In use, switches 159 are opened briefly at typically 20 kHz (for example 5 microseconds every 50 microseconds), and the voltage generated by the stator jumps to a higher voltage because the stator windings of the alternator act as flyback coils as in a flyback power supply. The stator coils are charged up with the current that flows through resistors 157, and when switches 159 open, the coils have charged up L I^2/2 energy. Each time switches 159 are opened some of this energy is discharged into the battery 153. The period of the open switches is so short that the current through the stator coils do not change very much. Also, the process occurs so quickly that there is no significant torque effect on the exercising person. The voltage jumps up until the diodes 154 forward conduct current into the battery, thereby charging battery 153 in spite of the fact that the voltage across the resistor loads on the stator average much less than the battery voltage. Because of the flyback effect, the battery charging can be accomplished without generating battery-level voltages on the stator windings. Because of this, the battery charging process does not force the rotor excitation to be great enough to generate the battery voltage on the stator. When operated at low excitation and low power, circuit 158 does not generate the eddy current and other losses that the conventional circuit generates at low output power. Circuit 158 also has only the current used to charge the battery passing through the diodes 154, and so the diodes 154 are much smaller, use much less power, and are much less expensive than typically used in prior control schemes and circuits.

A further advantage of allowing the rotor current to go to low values during the power control process is that alternators have losses caused by the magnetic fields generated by the rotor excitation current. By controlling the rotor excitation, and allowing it to go to zero when the user is applying little or no force to the equipment, the baseline forces of the system are minimized.

A microprocessor in the exercise equipment controls the period the switches 159 are off to control the flow of current into battery 153. Using the switch off period as a control, the battery charging can be easily controlled over a wide range of currents. The charging of the battery 153 is essentially independent of the stator voltage, so the microprocessor control system can charge the battery as required by the battery's current state of charge and other factors, without requiring the load presented to the exercising person to be unduly affected. The control system can take into account the power generated by the alternator that goes into the resistor loads, and also the power that goes into the battery, so that any exercise load power desired can be generated.

The alternator output used to charge battery 153 also can be used to operate the other circuits in the exercise equipment, such as displays, computers, controls, and the like. The power required to operate the exercise equipment is also accounted for in the exercise load calculation, so the exercising person feels the desired load independent of the operation of the charging or operating circuits.

Figure 25:
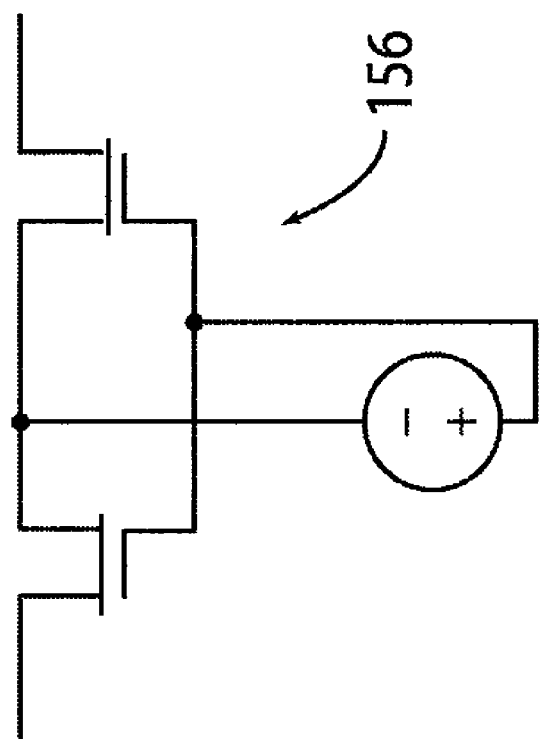
FIG. 25 is a circuit diagram of a bipolar current switch that can be utilized in an alternator control system according to another aspect of the present invention.

Switches 159 comprise bipolar high-current switches as shown in FIG. 25. Switches 159 are connected in series with stator load resistors 157. Although various switch configurations could be utilized a typical design for switches 156 is shown in FIG. 25.

Although the control system of the present invention may take various forms, it will be understood that the rider power estimation versions of FIGS. 1A, 1B and 2 and the force measurement systems of FIGS. 3-5 utilize a difference between a measured value related to a user's effect on the exercise equipment, and a virtual value that is determined, at least in part, upon the physics governing the actual physical activity being simulated.

The power estimation control systems described above utilizes the power generated by the rider to calculate the force input by the rider utilizing the relationship between force and power (power equals force times velocity). This calculated force is in turn, used to calculate the virtual acceleration utilizing the principle that force is equal to mass times acceleration. The acceleration is then integrated to provide the virtual velocity. The difference between the virtual velocity and the measured velocity is then used as the control input to the alternator or other force-generating device to increase the resistance force as the difference between the virtual velocity and the measured velocity increases.

The force-measurement versions of the control system also utilize the difference between the measured velocity and the virtual velocity. However, the force-measurement versions of the system use the measured user force rather than the user force calculated from power as described above.

In general, the control system may be configured to push the difference between the measured velocity and the virtual velocity to zero, or to a small difference.

Figure 26:
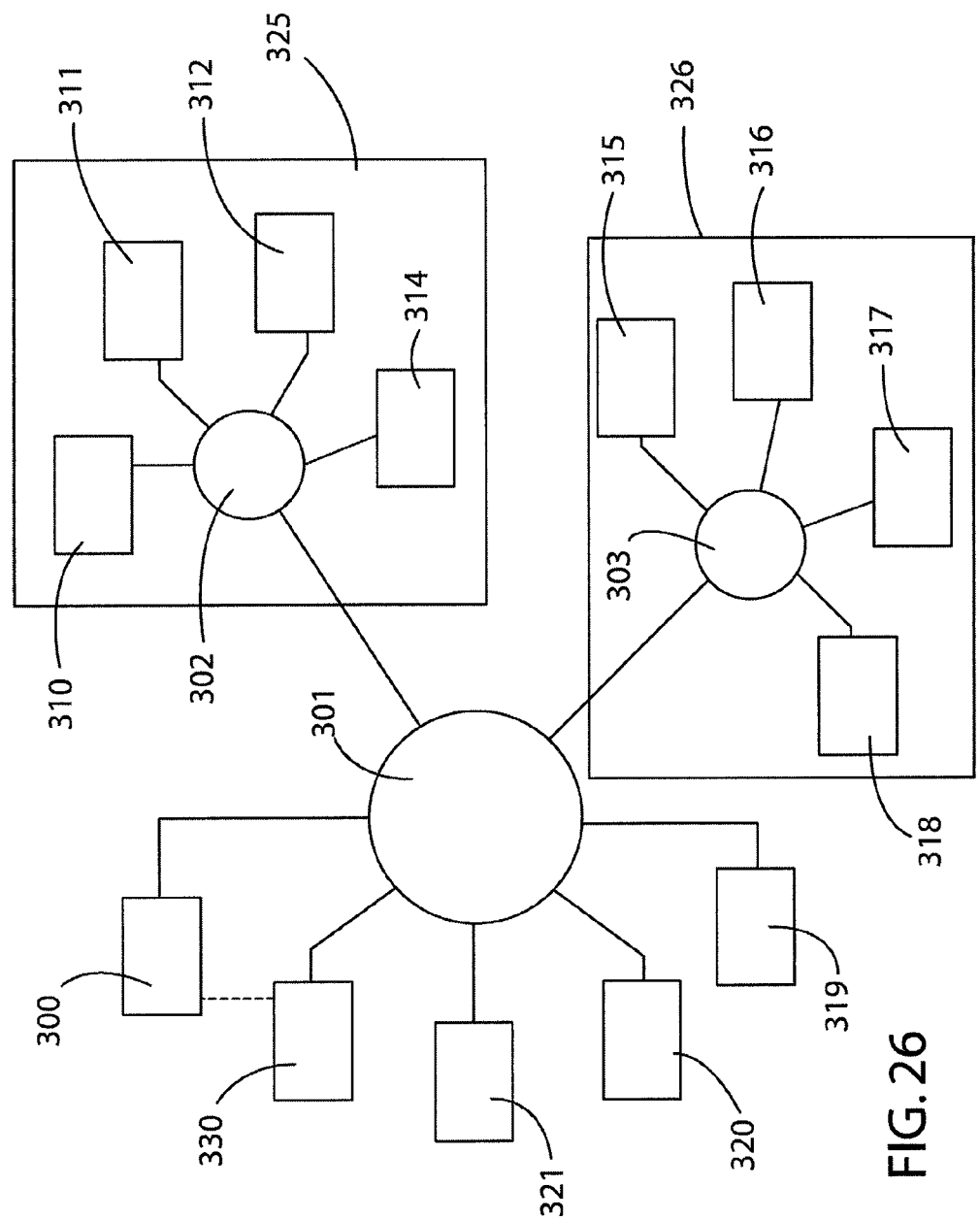
FIG. 26 is a schematic diagram of a plurality of exercise devices interconnected by a network according to another aspect of the present invention.

With reference to FIG. 26, in addition to the single-user control system described above, the exercise device 1 (e.g., stationary bike) may be interconnected via a network or the like and configured for group "rides" including a plurality of users. Such groups may be led by an instructor or leader at a remote location, and groups of users at one or more health clubs or the like may be in communication with the instructor and/or other users/riders via a computer network such as the internet or via other suitable communication systems. Also, one or more individual users/riders may have a bike in their home, workplace, or other such individual location that is also in communication with the instructor and/or other users/riders via the internet or other suitable communication system/device.

An instructor's bike 300 may be connected to a computer network (e.g. internet) or other suitable communication system/device 301, and the bikes 310-321 of the individual riders may be connected to the network 301. The bikes 310-321 and riders may be located virtually anywhere, provided an internet connection or other network connection is available. One or more Health Clubs 325, 326 or other such group workout facilities may also be connected to the internet, and a plurality of Health Club Users 310-318 may be connected to local networks 302, 303 at the Health Clubs 325, 326. Additional users may be connected directly to the network 301. The bikes 319-321 that are connected directly to the network 301 may be located in various geographic locations and the number of individual users 319-321 may actually be very large. Three individual users 319-321 are shown in FIG. 26 simply to illustrate the concepts associated with this aspect of the present invention. The instructor 300 may be located on the West Coast of the United States (or other location), and the individual users may be located throughout the United States and/or other countries. Similarly, individual users 310-318 at one or more Health Clubs 325, 326 may be simultaneously interconnected to the network 301 via local networks 302, 303, etc. It will be understood that the number of Health Clubs or other such facilities may be quite large, and the individual users 310-318 at the Health Clubs may be connected directly to the network 301 rather than through a local network 302, 303, etc. Also, the instructor 300 may be connected to a local network 302, 303, etc. to provide for instruction of a local group within Health Clubs 325, 326, etc. If the Health Club or other such facility has its own instructor, the local network 302, 303 may be connected to the primary network 301, or the local network 302, 303 may be disconnected from the primary network 301.

It will be readily apparent that the networks utilized may have various configurations in order to achieve desired connectivity. The figures and associated written description herein should be considered to be examples of network configurations according to one aspect of the present invention. However, these examples do not limit the scope or type of networks that may be employed.

Figure 27:
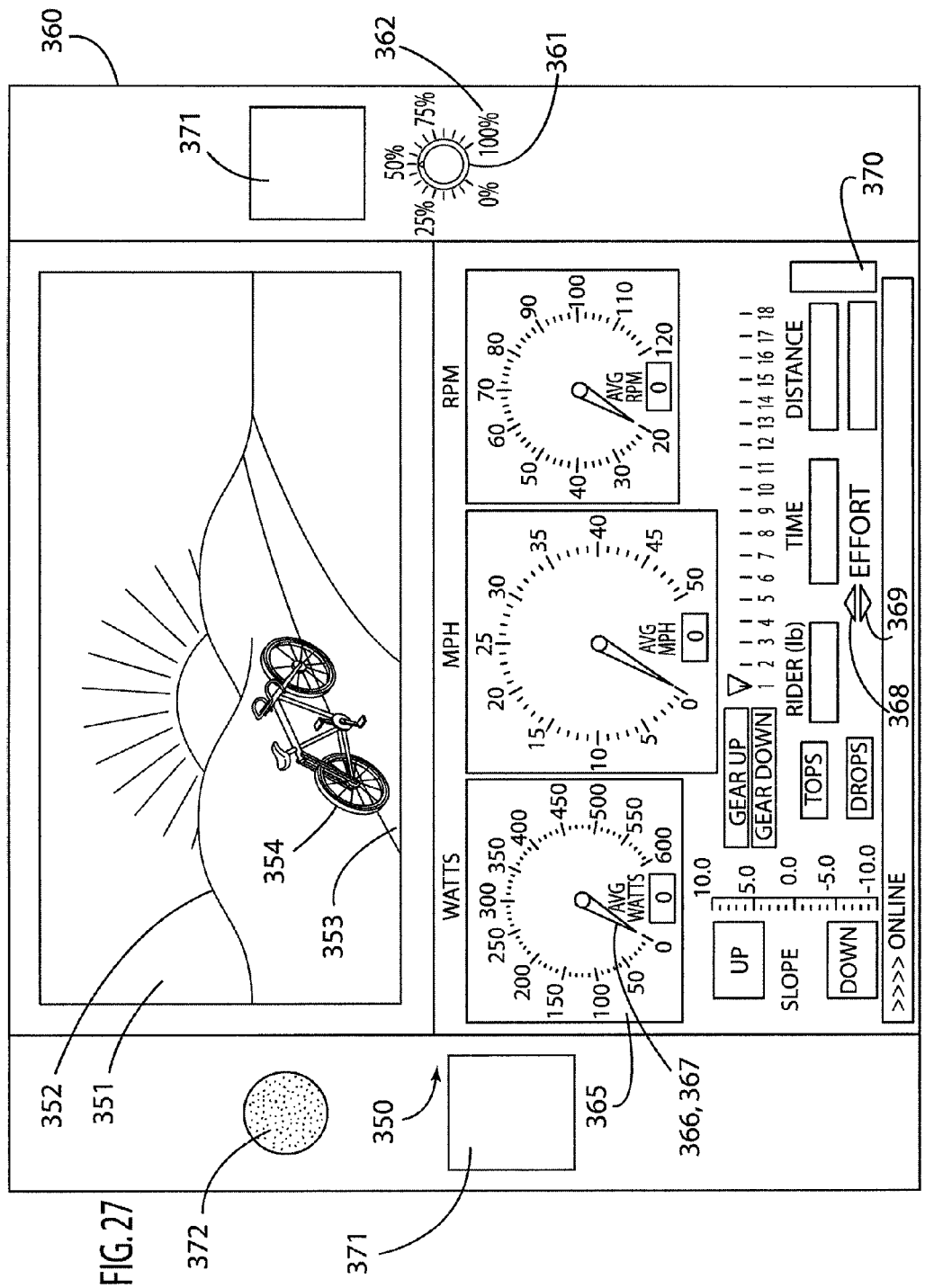
FIG. 27 is a display according to another aspect of the present invention.

A computer network/control system according to another aspect of the present invention includes a memory device that stores data for each user/rider/instructor. The system keeps track of all data related to virtual rides such as distance, hierarchical place or position within a group of riders, velocity, power, heart rate, etc., and stores this data in a relational database or similar data storage medium/technology. In this way individual comparisons/trends of individual performance can be made, or with respect to any group or subset thereof over time on any virtual course, or on a group of virtual courses. Access to such data may be granted via the internet or other network, and secure access may be maintained by anonymous passwords and usernames selected by users. The networked database system thereby provides a great deal of flexibility with respect to the features available to the users. For example, users may establish profiles of the types of information/data they would like the system to maintain/store, and the users may elect to receive emails or text messages or other informative messaging services or mediums regarding their exercise performance. Such data may be downloadable to spreadsheets, databases, or other data storage mediums/technologies, on personal computers, mobile computers, or any other device containing mobile computing technology such as mobile telephones etc. Each bike 1 may include a display screen 50 (FIGS. 1 and 11) that shows the power output, velocity, distance, slope, gear, and the like for the individual users. Alternately, each bike 1 may include a display screen 350 (FIG. 27) that includes a display 351 showing scenery 352 including, for example, a road 353 and other riders 354. The other riders 354 shown on display screen 351 may be visual representations of other users 310-321 connected to the network. Display 350 may comprise an LCD, plasma, CRT or other suitable such electronic display. As described in more detail below, the display 350 may include visual representations corresponding to gauges showing the rider power output in watts, virtual speed in, for example, miles per hour, and the individual rider's RPM, as well as the gear position and slope experienced by the rider. In the illustrated example, this information is generated by an LCD display screen or the like. However, it will be understood that actual gauges or the like may also be utilized to provide a display showing the rider's effort, speed, RPM, and other such variables.

A variety of real or fictitious courses including hill data and corresponding visual data may be utilized to provide the desired riding experience. For example, an actual riding course such as a portion of the Tour de France may be duplicated by measuring or estimating the hill angle $\theta$ (equation 1.3) along the entire actual course to thereby generate a database of hill angles at associated locations. The locations may comprise distances from a starting point for the course. Since the bikes utilize an equation of motion which solves for Velocity, the distance traveled along an actual or virtual course is known, and corresponding image data such as scenery 352 of the real course, as seen from the vantage point of an actual rider, may be displayed on screen 351 to provide the rider with a more realistic "ride". In general, the database includes a number of discrete hill angle measurements and associated locations/distances, and the controller interpolates or otherwise curve-fits the individual data points to generate natural smooth changes in virtual hill angles $\theta$. This provides the user(s) with varying ride difficulty closely corresponding to riding on the actual hills, with hill angles that change in a natural manner. Utilization of the equations of motion described in detail above provides a realistic simulation of hills and other actual riding conditions such as air resistance, wind, altitude, air density, air temperature, and the like. Use of the equations of motion in the control of the individual bikes or other exercise devices provides a more realistic experience when the devices are networked. This may be important of both workout/conditioning "rides", and for races and or other forms of group riding.

The image data shown on display screen 351 corresponding to a rider's location on the course is synchronized with the hill and/or position data so the rider sees the hills and other such images on display 351 at the same time the rider experiences the effects of the hills on riding effort. In this way, a group of riders may simultaneously experience the same hill angles $\theta$ and scenery 352. The image data and/or course data (e.g., hill angles) may be stored on the individual user's bikes 310-321 and displayed according to a position signal from the instructor's bike 300 such that the bikes 310-321 all display the same images at the same time. Alternately, image and other course data may be transmitted to the individual bikes 310-321 in a "real time" manner during the virtual ride so that individual riders see displayed images according to their own velocity. The image and other course data may be stored or the instructor's bike/device 300, or it may be stored in a separate server 330 or other suitable device that is connected to the network 301. Alternately, the image and course data may be stored on individual bikes to provide for use if the bike is not connected to a network. The device 330 may comprise a data storage device, but it may also be programmed to generate image data based upon a signal from the instructor's bike 300 or other device.

It will be recognized that other data, such as altitude data, from an actual course may also be utilized to provide virtual hill data. This data may then be utilized by the control systems of the bikes to generate hill angles $\theta$, or the control system may be configured to utilize the altitude data directly as a control input. Wind effects, rolling resistance, and other such factors may be simulated using measured data and/or computer-generated wind velocities or varying riding surfaces. Such course data may also represent a fictional course that is generated solely by a human or by a computer program. Each individual bike 1 may have its own memory, and the course data may be initially stored on a DVD or other data storage arrangement, and then transferred to a data storage/memory associated with each individual controller. Alternately, a DVD reader or other data access device or program may access some or all of the data on the DVD or other data storage device during operation of the bike to thereby provide the course data such as hill angle $\theta$ and distance to simulate a particular course. It will also be understood that the data for a particular course/ride may be supplied, either as a complete data set to be stored by the individual users (or Health Clubs), or the data may be distributed during or before the ride/exercise session utilizing the network 301 and/or networks 302, 303.

It will also be apparent that numerous courses/scenarios may be duplicated by providing an appropriate data set. For example, time trials, sprints, oval track races, and the like may all be simulated utilizing an appropriate data set. Also, one or more data sets of courses/rides may be generated and stored, and later transferred to the bike controllers for either individual exercise/user/rides, or for group exercise/use/rides.

It will also be apparent that the controller could be operably coupled to an existing device such as a personal computer (PC)/monitor, or a home video game system (e.g. XBOX®)/T.V. to generate images for the user. If the PC and/or video game has sufficient computing capability and the like, the PC and/or video game may comprise the display panel and or the controller utilized to control the pedaling resistance of the bike.

When multiple users are simultaneously riding on the same virtual course with an instructor (FIG. 26) for a group exercise/training session, it may be desirable to account for the different capabilities of individual users/riders. For example, if the instructor 300 is a highly conditioned, the instructor 300 will tend to ride at a substantially greater velocity through the virtual course than will the individual users/riders 310-321. Thus, if the individual users 310-321 are to stay at the same position in the virtual course as the instructor, a compensating feature that accounts for the capability of each individual rider may be utilized.

One example of a compensating feature involves the gear rollout utilized in the controllers shown in FIGS. 1A, 1B, 2, 2A, 3, 4, and 5. Each of the individual riders 310-321 (and the instructor 300) may select a different gear rollout to adjust the force required to ride up a given virtual hill. Also, the system may be configured such that all of the individual riders 310-321, and the instructor 300, are always at the same position on the virtual course regardless of the virtual velocity of each user, and all users experience the same hill angle and/or wind affects, or the like at the same time. If the system is configured in this manner, each user will travel the same distance on the virtual course, regardless of individual rider effort and ability (force, power, etc.). The total time on the virtual course and the time on each section of the course will be the same for each rider, regardless of the distances attained by each rider along the virtual course, and changes in the virtual course profile (e.g., hill angle) will occur at the same time for all riders. According to this aspect of the present invention, each rider encounters/experiences the same course characteristics (grade and rolling resistance) and circumstances (wind, air temp, humidity, etc.), but each rider may individually control his or her virtual gears/rollouts according to the gears/rollouts that are available to them on their own bikes as described in more detail below. At the end of such a virtual course profile, or during a virtual course, users may be provided with information such as:

The distance they attained along the course

Their finishing position, or place

Their average velocity

Their average power

Their average heart rate, etc.

After or during a virtual ride, each of the aforementioned variables can be made available to users as stand alone data, and or on a relative basis to other riders on the same virtual course, and or on a relative basis according to age, sex, height, weight, etc. Such data analysis and functionality is facilitated by the network systems described above. This information may be displayed on screen 350, or it may be supplied to individual users via a website, emails, or the like that can be accessed by user via personal computer ("PC"), or the like.

Thus, if the system is configured to ensure that all riders maintain the same position on the course, according to one aspect of the present invention, the virtual gear of each individual bike 1 may be adjusted to thereby adjust each individual rider's effort and cadence (pedaling rate) to account for differences in ability and/or effort expended by the individual riders;

Alternately, according to another aspect of the present invention, each individual bike's progress on a given course may be "keyed or indexed" a "local" instructor's bike (e.g., at the Health Club) such that regardless of the distance traveled by a user, the course profile will change according to the instructor's bike. Rather than being keyed or indexed to a local instructor, the individual bikes may be keyed or indexed to a remote instructor's bike or to the software program's commands residing on the network or residing on each individual bike.

Figure 29:
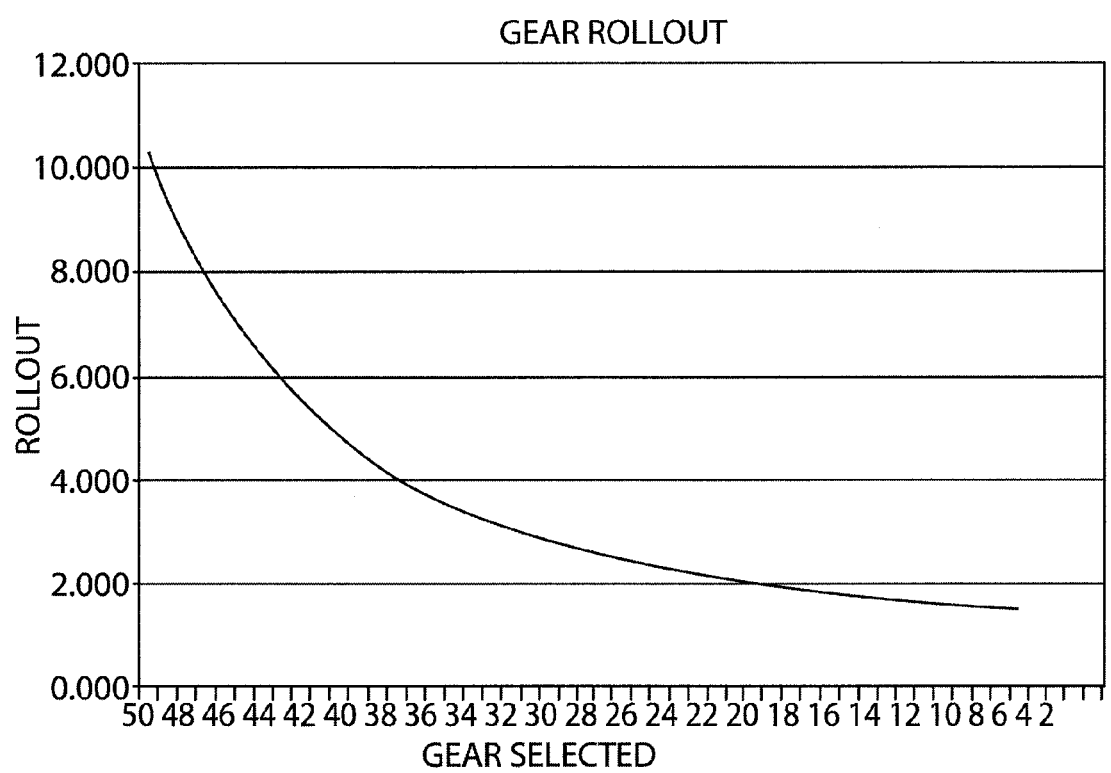
FIG. 29 is a graph showing a curve fit of the discrete gear rollouts of FIG. 28.

The gear rollout utilized in the controllers of FIGS. 1A, 1B, 2, 2A, 3, 4, and 5 may include a very large number of gears ratios (e.g., 50 or 100), and the controller may include an interpolation feature or the like to generate additional gear ratios between the actual gear ratios. One example of a gear 50 rollout is shown in FIG. 28. Interpolation of the discrete gear rollouts of FIG. 27 produces a continuously variable gear rollout as shown in FIG. 29. By interpolating, the controller provides a virtual continuously variable transmission to adjust the effort required by the individual riders. However, if a very large number of discrete gear ratios/rollouts are utilized, the differences between adjacent ratios become very small and the rider does not feel the discrete gear changes due to a change in gears/rollout.

The gear rollout may be adjusted manually utilizing an adjustment knob 361 (FIG. 27) as discussed in more detail below, or the gear rollout may be adjusted remotely by an instructor or automatically by a software program. The controller may be configured to automatically adjust the gear rollout according to a variety of different control schemes. For example, if a continuously variable gear rollout is utilized, a rider may select an optimum or desired RPM utilizing an input knob, button, or the like, and the controller will ensure automatic changes to the gear rollout continuously or in very small discreet increments to sustain the selected RPM. Such a selected RPM may be constant or variable, and RPM variations may be governed by a variety of means including, for example, the beat of music played during group or class rides. The RPM control feature may include automatic detection of a music beat, and the controller automatically selects an RPM equivalent to the number of music beats per minute.

As discussed above, as a user pushes on the pedals of the bike 1 (or a real bike), the force generated by the user intends to vary as a sine wave. Also, the angular rotation rate also varies somewhat in a generally sinusoidal manner during the 360 degrees of rotation of the pedal. If the controller is configured to adjust RPM to any predetermined value, the RPM may be adjusted on a time continuous basis to yield a sinusoidal wave with a specified amplitude including zero amplitude as might be the case in normal cycling going down a steep grade or along flat ground with a substantial tail wind. If the amplitude of the wave form were to be expressed as a percentage of the total virtual velocity of the user, theoretically any percentage amplitude of that sinusoidal wave form could be achievable by such continuous control of the gears/rollout such that the amplitude of the sinusoidal wave could theoretically be 100%, 0%, or negative 100% of the user's virtual velocity.

For purposes of automatic control of the gear/rollout and ultimately RPM, the RPM may be defined and distinguished from CADENCE, particularly in cycling applications. Cadence is different because the angular velocity throughout the 360 degree rotation of a bike's pedals will vary somewhat in a periodic manner, hence the sinusoidal wave effect discussed above. Thus, RPM or cadence control systems which are based in some way on the period (i.e. the length of time required to complete one revolution), should also take into account the desired sinusoidal wave effect (i.e. the variation in angular velocity throughout the 360 degree rotation of the pedals) if the controller is to provide control in a manner that results in realistic resistance force to a user throughout the full 360° of rotation of the pedals. Automatic adjustment of the gears/rollout and hence the RPM and or cadence may be accomplished very quickly (e.g. several hundred or several thousand gear changes per second), such that the feel or inertial effects of the bike's control system which is previously described could be reduced or eliminated. In order to avoid this potential reduction of elimination of the proper dynamic feel experienced by a rider, automatic adjustment of the gears/rollout and resulting RPM and or cadence may be accomplished in a manner that reduces or eliminates the effects of changes in gear rollout on the dynamic force simulation experienced by a rider.

One approach utilizes a "Newtonian coast down method" which conserves momentum and hence the inertial characteristics of the apparatus described herein. According to the Newtonian coast down method, cadence is controlled by automatic adjustment of the gear/rollout until such a period of time has transpired that, assuming no addition of force from the rider, the measured velocity (i.e., based upon measuring the rider's actual pedaling rate) would diminish as a result of the virtual losses (aerodynamic drag, rolling resistance, hill angle, etc.) to as little as zero velocity for a given set of riding conditions, circumstances, and or parameters, such as drag, resistance, weight, hill angle, etc. More preferably the detected or measured velocity based on the riders actual pedaling rate would diminish by a fraction or percentage such as ninety percent, eighty percent, seventy percent, sixty percent, fifty percent, forty percent, thirty percent, twenty percent, ten percent, one percent, 0.9 percent, 0.8 percent . . . 0.01 percent . . . 0.001 percent . . . , etc., whichever percentage is found to most accurately, realistically, or desirably conserve momentum and the inertial characteristics and feel of the bike's control system. Essentially, the controller performs a very rapid virtually instantaneous "coast down calculation" to determine how much time would need to transpire, in order for the velocity to decrease by the aforementioned specified percentage (i.e. a targeted amount of deceleration occurred). The cadence is then controlled via the automatic adjustment of rollout/gear such that the time-dependent percentage reduction in velocity is achieved (i.e. the targeted amount of deceleration is obtained). This specified reduction in velocity before a gear/rollout adjustment is made equates to some level of amount of momentum being conserved. It will be apparent that the gear/rollout adjustments may be upward or downward depending on the desired or targeted RPM or cadence. The coast down calculation may be made continuously or close to continuously as the user is pedaling. For example, the coast down calculation may be made 2000 times per second such that the corresponding gear/rollout changes are imperceptible to the rider.

Another approach is a "sinusoidal" control scheme wherein RPM and/or cadence are controlled relative to desired pedal positions (e.g., six o'clock, five o'clock, etc.) and matching the amplitude characteristics of predetermined sinusoidal-type waves. If synchronization of the RPM and/or cadence to a music beat and/or other is important, the controller can be configured to achieve predetermined crank arm/pedal positions at predetermined points in time. For example, preselected pedal positions such as 5 o'clock or 6 o'clock, etc. could be synchronized with to the beat of music. The versatility of this approach is virtually unlimited in terms of the sinusoidal characteristics which may be achieved. Specifically, according to one aspect of the present invention, the stationary bike may include a DC motor that provides for powered assist to compensate for frictional effects of the actual device 1 to accurately simulate an actual bicycle. If a powered assist is utilized, the force required from a user at, for example, the top dead center and bottom dead centers of a pedal can be reduced to zero (or less). If powered assist is utilized, the sinusoidal method can ensure that the pedals are always synchronized with music, or other cadence control criteria.

The "sinusoidal" control scheme may control cadence instantaneously (or close to instantaneously) irrespective of momentum, as a function of time to achieve a desired pedal position at a given time and or any desired sinusoidal wave characteristics. In this manner "instantaneous" cadence control occurs as a function of time such that the amplitude of sinusoidal wave could effectively be a percentage of the total measured/detected velocity (e.g., one hundred percent . . . ninety percent . . . fifty percent . . . ten percent . . . one percent . . . , or negative one percent . . . negative ten percent . . . negative fifty percent . . . negative ninety percent . . . negative one hundred percent). It will be understood that this approach to controlling RPM and/or cadence may utilize forms that are periodic in form, but not precisely sine waves. As discussed above, the forces generated by user and the angular velocity of the crank tend to vary in a manner that is sinusoidal in nature. However, these variations may not be precisely sinusoidal, and the control system therefore does not necessarily utilize a sine wave to achieve synchronization. In general, the waveform is preferably at least somewhat sinusoidal in nature.

The gear rollout for each individual rider may be set prior to initiation of an exercise session utilizing a fitness test or the like. When discussed herein in connection with fitness testing, "average power" is an average of work with respect to time. Calculation of average power eliminates or reduces the undulations of the force velocity curve during exercise and hence sinusoidal wave characteristics of the instantaneous power. The following discussion of average power does not, however, disregard the undulations of a force velocity curve and or sinusoidal wave forms which are essential for describing and or simulating human motion. The average power output by an individual rider can then be set as a percentage of the average power output by the instructor 300 utilizing a different gear rollout than the instructor. For example, if the instructor is tested to determine his or her fitness level (i.e., average power output capability), individual riders can then be tested to determine their average power output capability, and the average power output of each individual rider can be described as a fraction of the average power output of the instructor. If an individual rider has one half the average power output capability of the instructor, the gear rollout 69 can be set to provide an effort level (average power output) that is 50 percent of the instructor's at any given point on the course. Alternately, the output of a rider may be expressed as a percentage of the velocity of the instructor also. According to this approach, the gear rollouts (ratios) for a rider are set at a percentage of the instructor's based on, for example, the average velocity of an individual user over a given course or portion of a course compared to the average velocity of the instructor over the same course or portion thereof. Velocity it seems may be as an as good or better means than power since velocity is also an average of position with respect to time which corresponds more directly with percentage rollouts associated with gears.

Alternately, the bike/device 1 may include a manual adjustment knob 361 (FIG. 27) mounted to a console 360 or the like that permits each individual rider to adjust the effort level they experience as they are riding the course. In the illustrated example, the knob 361 provides for continuous adjustment between zero percent and 100 percent of the effort (i.e., average power output) of the instructor 300. However, it will be understood that the indicia 362 may comprise terms such as "minimum" and "maximum" rather than percentages. Furthermore, the display screen 350 may include not only the power output of the individual rider, but may also provide a visual indication of the power output of the instructor 300, so the individual user can readily determine what their power output is relative to that of the instructor at any point and time. In the illustrated example, the indicator 365 showing the power output in watts includes a single "needle" 366 corresponding to the power output of the individual rider. However, the indicator 365 may include a second needle 367 corresponding to the power output of the instructor 300. (It will be understood that the "needles" 366 and 367 are not actual needles, but rather are visual representations of needles shown on an LCD, plasma, or other such display). Similarly, the miles per hour, RPM, and gear positions for both the individual rider and the instructor may also be simultaneously displayed on display screen 350 to provide each individual rider with information concerning not only their own gear position, speed, and RPM, but also the gear position, speed, and RPM of the instructor 300. Alternately, rather than a dial 361, the display screen 351 may include touch screen features 368 and 369 to provide for user adjustment of the effort level. It will be understood that push buttons or the like may also be utilized to provide for upward and downward adjustment of the effort level by adjusting the gear rollout. The display 350 may also include an indicator 370 providing a visual representation of the effort level as determined by the adjustment in the gear rollout.

Another compensation feature that may be utilized to assist in keeping all riders 310-321 at the same position on the course "adjusts" the virtual slope/hill angle of the controllers of FIGS. 1A, 1B, 2, 2A, 3, 4, and 5 to adjust the effort required to pedal the bike 1 of an individual user. The slope angle may be multiplied by an adjustment factor that is set by the user utilizing a knob 361, touch screen features 368, 369, push buttons, or the like. The user can thereby select an adjustment factor that is a percentage of the hill angle (incline or decline) that the instructor 300 is on (experiencing) at a given point in time.

Because each individual user 310-321 has a different ability level, each user will generally set the adjustment factor at an appropriate level for his or her ability. Also, unless the adjustment factor is presently at a value set utilizing a fitness test or the like, an individual user may re-set the adjustment factor during the ride/exercise session if it is either too easy or too difficult to keep up with the instructor.

According to another aspect or mode of operation of the bike 1 of the present invention, an individual user/rider may have complete control over the setting of the adjustment factor and/or the individual rider's position relative to the instructor. For example, each individual may choose to set the adjustment factor such that no adjustment to the rollout and hill effort is provided (i.e., the gear rollout and hill angle of the rider remains the same as that of the instructor 300). In this mode of operation, the individual user may not be able to keep up with the instructor 300 and or other individuals/riders on the same virtual course and may fall back, riding at a substantially different location on the virtual course.

Alternately, the system may include a feature that automatically adjusts the pedaling effort to enable an individual user to stay within a predetermined distance of the group, without manually changing the adjustment factor. For example, the controller could vary the adjustment factor in a manner that is proportional to the distance of an individual user/rider 310-321 from the instructor 300 on the virtual course. For example, the adjustment factor could vary linearly from 1.0 (i.e. the rider experiences the actual hill angle of the virtual course using the same gear rollout as the instructor) if the rider is at the same virtual location as the instructor to 0.0 if the rider were to fall a preselected distance behind the instructor. Also, the adjustment factor could increase linearly above 1.0 if the user/rider gets ahead of the instructor on the virtual course.

Additional features could also be utilized to assist individual users/riders 310-321 in keeping up with the instructor 300. For example, the individual users/riders 310-321 could manually set the adjustment factor at a level providing for less effort, and the effort could vary linearly if the user/rider falls behind, or gets ahead of instructor. According to a specific example, the adjustment factor could be set at 0.60, and the adjustment factor would drop linearly to 0.0 if the rider fell behind the instructor 300 by a specified distance.

Also, the controller may provide a distance in front or in back of the instructor 300 or other individuals/riders on the virtual course in which the adjustment factor is not changed. For example a space of one hundred yards (or other suitable distance) in front or in back could be a "no adjustment zone" wherein the adjustment factor stays constant, either at 1.0, or a value that is preset by an individual user 310-321. However, if a user/rider falls more than one hundred yards behind the instructor 300, the adjustment factor would be reduced linearly to zero from the (negative) one hundred yard distance to a distance of, for example, one mile. Similarly, the adjustment factor could be increased linearly if the individual user/rider gets more than one hundred yards in front of the instructor 300.

It will be readily apparent that the adjustment factor could be changed according to other control schemes, and the linear change described above is provided as an example of one control scheme. Other schemes could utilize one or more "steps" (i.e. abrupt changes) in the adjustment factor, or a curved change in the adjustment factor, as the rider falls further behind the instructor 300 or surges ahead.

In addition to reducing (or increasing) the slope angle and/or changing the gear rollout of an individual rider, the rolling resistance and other frictional losses may also be modified by multiplying the friction loss by the same adjustment factor, or a different adjustment factor. Similarly, the aerodynamic drag may also be multiplied by an adjustment factor to provide for group exercise/rides. It will be apparent that aerodynamic losses (due to aerodynamic drag) are generally a function of the velocity squared. Thus, the aerodynamic force may be changed by multiplying the total aerodynamic force by an adjustment factor. Alternately, the virtual velocity may be multiplied by an adjustment factor prior to calculation of the aerodynamic forces to provide an "adjusted velocity" that is then squared to calculate the aerodynamic forces.

Adjustment of the rolling (friction) and aerodynamic losses may be done in addition to adjustment of the gear rollout hill angle, or a single one, or two, of the forces (losses) may be adjusted. Although the rolling/frictional losses and the aerodynamic losses are generally relatively small, it may be desirable to adjust these losses if, for example, the instructor 300 is a highly-conditioned athlete capable of riding at speeds at which aerodynamic and/or frictional losses become significant. Still further, the adjustment factor may include adjusting the rider's mass to reduce the effort required by a user when climbing hills and accelerating.

In addition to individual control of the adjustment factor(s), the instructor 300 may also vary the parameters of the individual users 310-321. For example, the instructor 300 may wish to demonstrate the effects on pedaling effort that would result from a gain (or loss) of ten pounds of body weight for each individual user/rider 310/321. Each controller of each bike 1 may be operably connected to a main control "panel" or the like having input capability permitting the instructor 300 (or other individual) to manually change the virtual mass of the rider, the aerodynamic drag, the hill angle, rolling resistance, wind velocity, or other factors for each user. Thus, the instructor 300 may vary the virtual conditions of the individual riders 310-321 to demonstrate the effects of various variables affecting the required effort.

In addition to adjustment of the losses, other control modifications may also be utilized to provide an adjustment factor that permits group riding. For example, the force (or power) generated by the instructor 300 may be measured and compared to the force or power generated by an individual user. The difference in forces (or power) could then be used to generate an adjustment factor that would be multiplied by one or more of the losses discussed above. It will be apparent that the instantaneous measured force or power may be fit to a curve representing the forces generated during one rotation of the pedals, with the difference in forces being taken at the same point on the force or power curves generated by the instructor and the individual user.

The effort required by an individual user may also be changed via the gain transfer function of the controllers of FIGS. 1A, 1B, 2, 2A, 3, 4, and 5. In general, the gain could be reduced by multiplying the gain by an adjustment to thereby reduce the resistance force generated by the controller.

In a group riding situation, it may also be desirable to simulate the effects of drafting. This can be accomplished by determining the positions of individual riders 310-321 relative to one another on the virtual course, and multiplying the aerodynamic force by a drafting factor. The drafting factor may be determined by measuring the actual aerodynamic drag of riders at various speeds and positions relative to other riders. The data may be stored as individual data points, and a curve-fit or the like may be used to interpolate aerodynamic effects falling between the measured data points. Similarly, the aerodynamic advantage of staying within the peleton (i.e. the main group of riders; also called the pack, bunch or field) can be determined and applied to each rider within the peleton.

Simulation of a group ride may include a side-to-side position of one or more riders in addition to the overall position of the riders on the virtual course. Inclusion of side-to-side position control permits riders to pass, draft, and block other riders to further simulate an actual group ride. In a group riding situation, the controller may also generate visual images of one or more other riders 354 so that each rider can see the other riders in front of him or her on display screen 351. Each user/rider may choose which, if any, of the other users/riders to display on screen 50. Thus, if several individuals in an exercise class wish to simulate riding with one another (and the instructor), the individuals can select one another for display to create a small virtual group of users/riders. Similarly, a group of users/riders at different physical locations may select one another for riding in a virtual group. In addition to the visual display 350, each bike may include one or more speakers 371 and a microphone 372 (or headset) that permits users/riders at remote locations to communicate with one another. Still further, the instructor 300 and/or other users may have a video camera or the like configured to generate images of the instructor 300 and/or users that can be shown on a display 350 to other users. In this way, visual and audio data of both the actual (stationary) instructor 300 and/or rider and the virtual instructor and/or users/riders can be transmitted to other users/riders.

Figure 30:
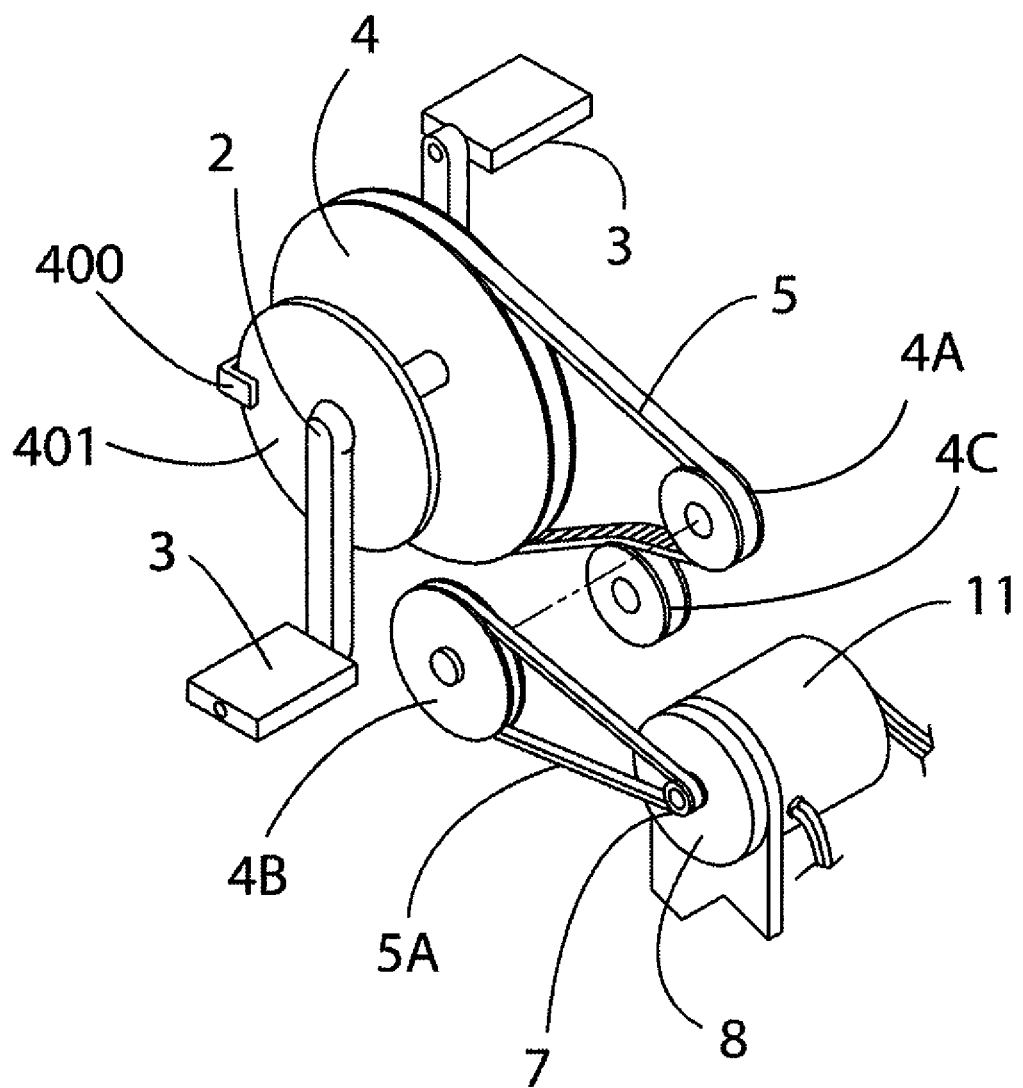
FIG. 30 is a partially fragmentary perspective view showing an exercise device including a force sensor according to another aspect of the present invention.

As discussed above in connection with FIGS. 2A, 3, 4, 5, 12, a force sensor may be utilized to measure the force generated by a user as an input to the control system. Various types of force sensors may be utilized for this purpose. An example of one suitable force sensor is shown in FIG. 30. In addition to the previously-described encoder 8 (mounted to the input shaft 7 of alternator 11), bike 1 may also include an encoder 400 mounted to a crank wheel 401 that rotates with the pedals 3. The encoders 8 and 400 provide position and/or velocity data concerning the angular position and/or velocity of the alternator 8 and the crank wheel 401/pedals 3. Because the flexible drive members/belts and or chains 5 and 5A and other drive components such as the frame of the apparatus (not shown) are somewhat resilient, a force applied to the pedals 3 will cause the angular position and/or velocity of the crank wheel 401 to change somewhat relative to the driven members 7 and encoder 8. In general, the force as a function of change in position may be given by an equation of the form F=Kx wherein F is the applied force, K is the stiffness of the system, and x is the change in position of encoder 400 relative to encoder 8. The stiffness of the belts 5 and 5A and other system components can be determined analytically or it can be measured. The force transmitted through the system can then be determined by measuring the change in position of encoder 400 relative to encoder 8. It will be understood that the relationship between force and displacement may be non-linear. If analytical methods or testing reveals that the stiffness is not a constant, an equation such as a curve fit or the like can be utilized to accurately calculate force based on the change in displacement as measured by encoder 8 and encoder 400. A data base (i.e., table) of discreet stiffness may also be developed by testing, and a curve fit equation or other suitable interpolation technique may be utilized to determine the system stiffness for a given set of operating conditions.

In the illustrated example, the drive system utilizes first and second belts 5 and 5A to provide for the gear reduction for proper operation of alternator 16. However, it will be understood the other drive systems may be utilized that include only a single belt, one or more chains, drive shafts, or the like. In each case, encoders can be positioned at different positions in the drive system, and the difference in position relative to each other can be utilized to calculate the force applied by a rider.

Also, the encoders 8 and 400 may also be utilized to measure the angular velocity of the crank/wheel 401 and the alternator 11. A differential equation including these velocities can then be developed to relate these velocities to the force being applied to the pedals 3. In this way, the velocities of the drive system components can also be utilized to determine the force applied at the pedals.

Figure 31:
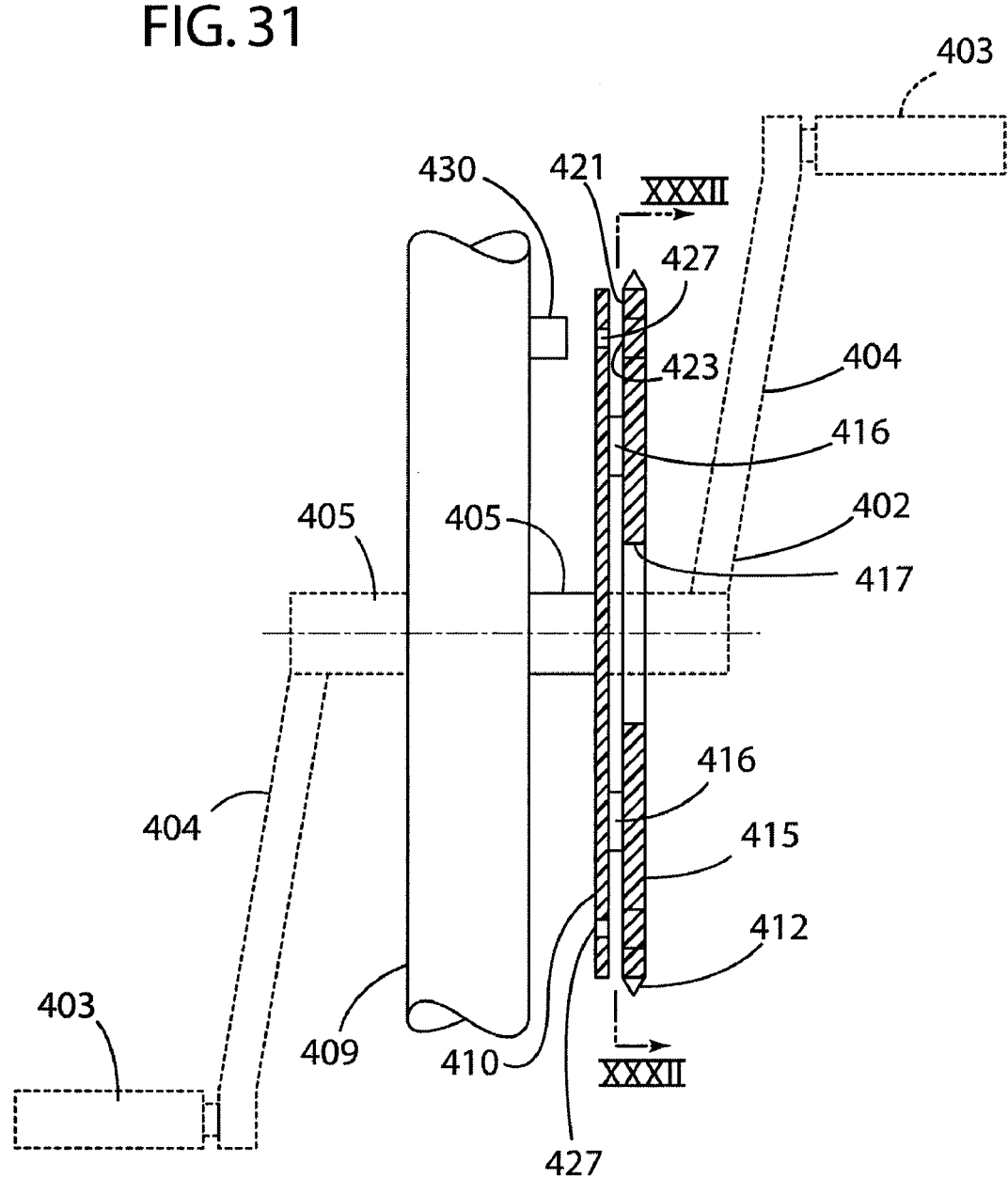
FIG. 31 is a partially schematic cross sectional view of a force sensor according to another aspect of the present invention taken along the line XXXI-XXXI.

A force sensor according to another aspect of the present invention is illustrated in FIGS. 31-33. A crank 402 includes a shaft 405 that rotatably mounts the crank 402 to a frame 409. Crank arms 404 extend from the shaft 405 to the pedals 403. A first disk 410 is fixed to the shaft 405, and therefore rotates with the shaft 405 and pedals 403. A second chainring/disk 415 is connected to the disk 410 by one or more spring members 416, and includes a plurality of teeth 412 that engage a chain or flexible belt such as the flexible belt 5 of FIG. 30 to thereby drive the belts 5 and 5A and transmit forces to the alternator 11. Chainring/disk 415 includes a central clearance opening 417 through which shaft 405 passes. Forces applied to the crank 402 and shaft 405 by a rider are transmitted into first disk 410, through spring members 416, and then into the second disk 415 and then to a belt or chain (not shown) engaging cogs 412. The spring members 416 are preferably made of a material that is at least somewhat resilient, such that the angular position of the first disk 410 changes relative to the position of second disk 415 when a force is applied to the crank 402 by a rider.

With further reference to FIG. 32, a ring-shaped strip of reflective material 420 is mounted to inner surface 421 of disk 415. With further reference to FIG. 33, the strip of reflective material 420 includes a plurality of lines 422 that form groups of lines 423. The groups of lines 423 are separated by gaps 424 of non-reflective material, and the lines 422 are separated by narrow strips 425 of non-reflective material. The lines 422 are preferably positioned a very small distance apart. As discussed in more detail below, the lines 422 may be configured to reflect either light or electromagnetic waves.

Disk 410 includes a plurality of openings 427 (see also FIG. 31) that are aligned with the groups of lines 423 if no force is applied to pedals 403. An emitter/detector 430 is mounted to the frame 409 of bike 1, and generates either light waves or electromagnetic waves that travel through the openings 427. The waves are reflected off the lines 422, and travel back through the openings 427 to the emitter/detector 430. The drive pulley/gear 415 may include clearance openings (not shown) aligned with the openings 427 to permit the light or electromagnetic waves to pass through the drive pulley/gear 415 without interference.

As discussed above, due to the resilience of the spring members 416, a force on the pedals 403 by a user causes the first disk 410 to move relative to the second disk 415. This, in turn, causes one of the edges 428 or 429 of opening 427 in second disk 415 to shift position relative to the lines 422, such that it covers one or more of the reflective lines 422. This reduces the amount of light or electromagnetic waves that are reflected from the lines 422 and detected by the emitter/detector 430. Because the amount of light detected by the emitter/detector 430 is reduced, the change in light intensity (or electromagnetic intensity) is directly related to the displacement of disk 410 relative to disk 415. The stiffness of the spring members 416 can be measured, such that the force being transmitted between the disks 410 and 415 can be calculated based upon the displacement of disk 410 relative to disk 415.

In a preferred embodiment, the emitter/detector 430 emits light that is reflected from lines 422. Reflective incremental optical encoders are commercially available from Avago Technologies of Böblinger Germany. A reflective optical encoder is disclosed in U.S. Pat. No. 7,182,258 the entire contents of which are incorporated by reference. Alternately, lines 422 may comprise magnetically charged surface areas, and the emitter/detector 430 may comprise an electromagnetic emitter that generates electromagnetic waves that are selectively reflected from lines 422. The change in the reflected electromagnetic waves can then be used to calculate the force applied to pedals 3. Magnetoresistive position sensors with incremental output are commercially available from ASM® Company of Moosinning, Germany. One example of such a sensor is PMIS2 POSIMAG® sensor. It will be understood that the magnetic strip forms a ring or circle when positioned on a disk or the like to form a force sensor according to the present invention.

Figure 34:
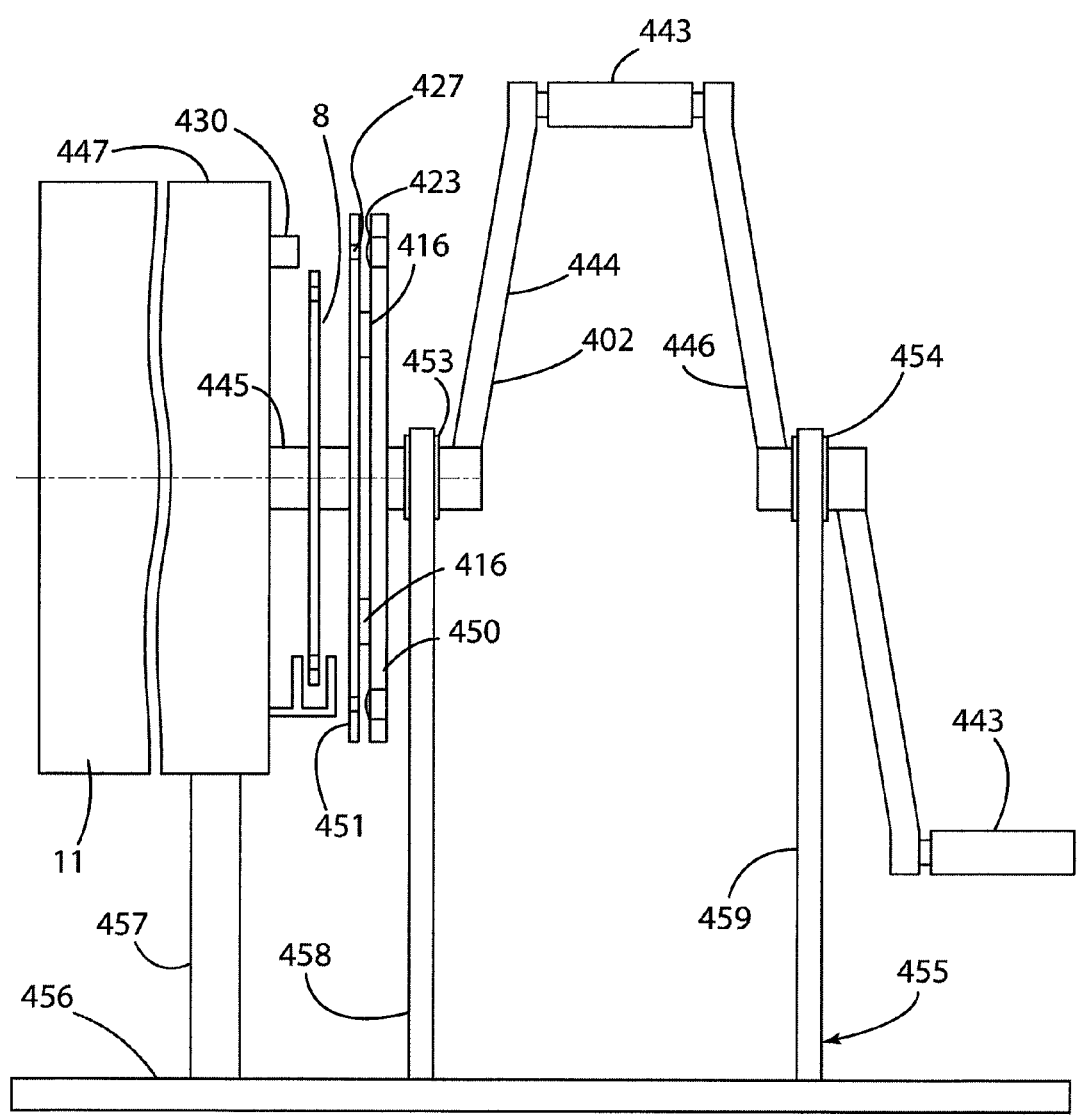
FIG. 34 is a partially fragmentary, schematic view of a force sensor arrangement according to another aspect of the present invention.

With further reference to FIG. 34, the exercise device/bike 1 of the present invention may include a drive system that does not include belts 5 and 5A, but rather has a pair of pedals 443 that are connected directly to a shaft 445 of alternator 11 via an elongated crank 444 having a central link 446. In the illustrated example, the crank 444 has an elongated shape that is somewhat similar to a crankshaft of an internal combustion piston engine. The bike of FIG. 34 includes a frame 455 having a base portion 456, a first upwardly extending portion 457 that is rigidly connected to the alternator 11. Frame 455 also includes second and third upwardly extending portions 458 and 459, respectively, that are rotatably connected to shaft 444 at bearings/support 453 and 454, respectively. The bearings 453 and 454 reduce or eliminate the bending loads (moment) that could otherwise be imposed on shaft 445. The frame 455 has a very compact shape, such that a bike 1 utilizing the frame 455 can be very compact, with a very small "footprint". This enables the bike 1 to be stored in a closet or other small space.

The crank 444 is rigidly connected to a disk 450 having groups of lines 422 arranged in groups 423 in substantially the same manner as discussed above in connection with the arrangement of FIGS. 31-33. The groups 423 of reflective lines are aligned with openings 427 in a second disk 451, and the first and second disks 450 and 451 are interconnected by spring members 416 (i.e. disk 450 is not connected to shaft 444.) An emitter/detector 430 is mounted to the housing 447 of alternator 11, and operates substantially the same manner as described above in connection with the arrangement of FIGS. 31-33.

An exercise device utilizing the crank and force sensor arrangement of FIG. 34 may utilize an electric DC motor rather than an alternator 11. Because a DC motor can be utilized to both generate electricity, and supply power, the DC motor may be utilized to provide powered assist during portions of the pedal cycle at which the user is generating little or no force on the pedals 443. For example, at the top dead center and bottom dead center positions, a rider typically does not generate much force on the pedals 443 (i.e., force in a direction that generates a torque). The device 1 may include frictional resistance and the like, such that some resistance force is generated by the device even if the DC motor/alternator 11 is not generating a load. Thus, in order to simulate the actual forces that would be felt by a rider on an actual bike, the DC motor/alternator 11 may generate powered assist during certain portions of the cycle.

An example of one way to utilize powered assist to compensate for the frictional affects in the device 1 is to measure the frictional losses and other such power losses in the system. A small amount of power can then be supplied to the DC motor or other powered assist mechanism at a level equal to the frictional losses. In this way, the DC motor will supply a constant level of power equal to the frictional losses that are present in the system, and the controller will generate variable force to simulate the affects of riding on an actual bike as described in more detail above. If the frictional and other system losses are determined to vary as a function of the input force by a rider, RPM, or the like, the losses may be measured under various operating conditions, and a look-up table or other such database can be generated. The controller can then retrieve the power loss data and interpolate to estimate the power loss at a given operating condition, and the controller can then generate a signal to the DC motor to produce an amount of power corresponding to the losses. It will be understood that this aspect of the control system may be configured to operate in a manner that does not substantially alter the operating principles of the control systems described in more detail above in connection with, for example, FIGS. 1A, 1B, 2, 2A, 3, 4, and 5.

It will be apparent that the DC motor/alternator 11 may be connected to a battery on the bike 1 to store energy generated during portions of the pedaling cycle wherein the rider is generating a positive torque, and the stored energy may be taken from the battery to provide for powered assist during portions of the pedaling cycle requiring such powered assist. Furthermore, it will also be apparent that the device 1 may be configured to be connected to a standard 120 volt AC power source, and the DC motor/alternator 11 may be powered utilizing the external power source.

Figure 34A:
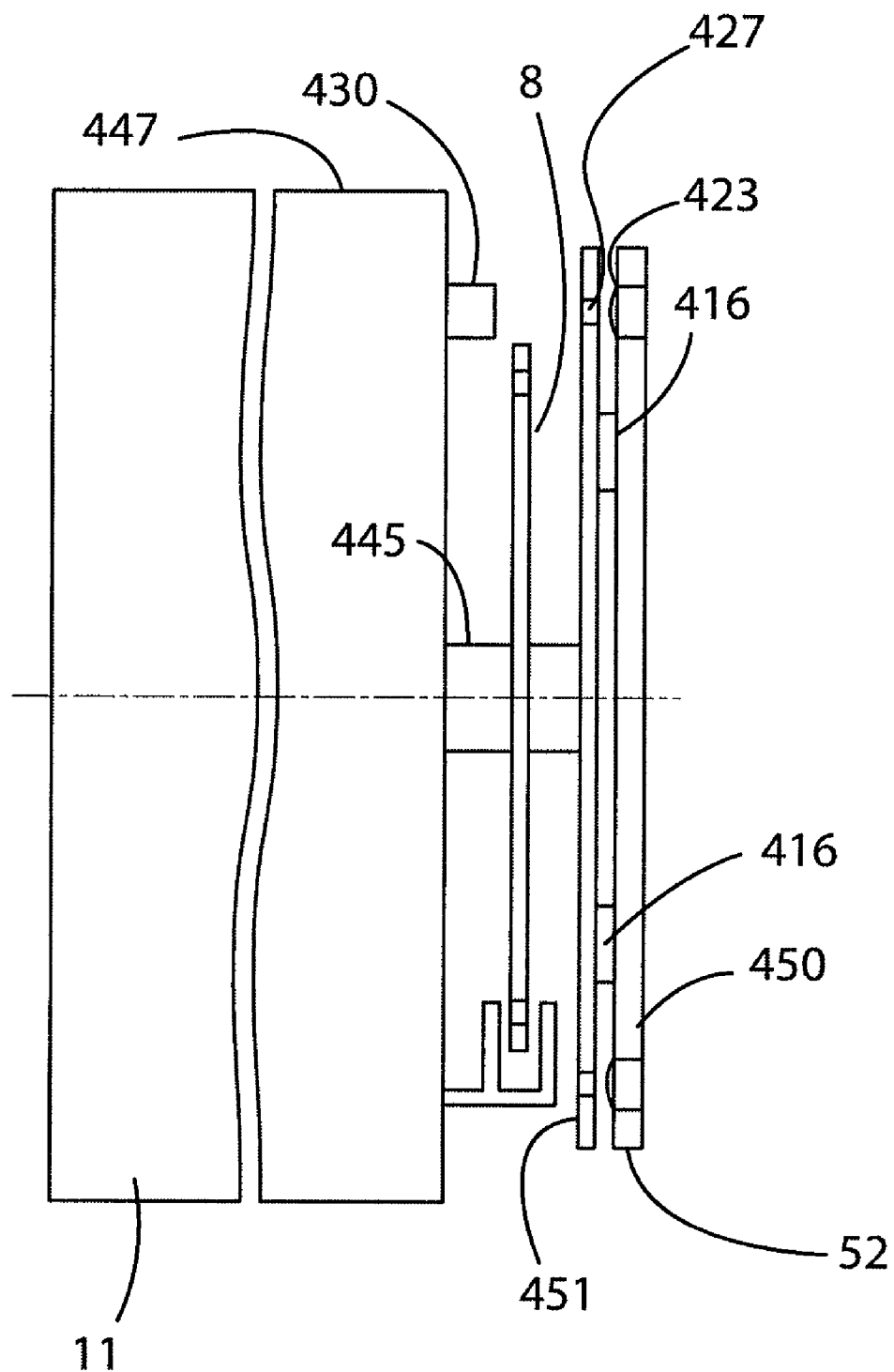
FIG. 34A is a partially fragmentary, schematic view of a force sensor arrangement according to another aspect of the present invention.

The crank 444 is rigidly secured directly to the disk 450, and disk 450 is not connected to shaft 445, such that a torque resulting from force applied to the pedals 443 by a user causes the angular position of disk 450 to change relative to disk 451 as the spring members 416 deflect. The emitter/detector 430 can therefore determine the change in position of disk 450 relative to disk 451 in substantially the same manner as discussed in more detail above, and the force (torque) applied by a user to pedal 443 can therefore be determined. Because the crank 444 of the device of FIG. 34 is connected directly to the alternator 11 without gear reduction, an electric motor may be operably connected to the shaft 445 and/or crank 444 to provide powered assist to ensure that the required resistance force is generated at the pedals 443. As described in more detail below, if the device/bike 1 is configured to include powered assist, the device may be configured to receive AC power form a standard 120 volt AC outlet, and the electric motor is preferably a DC motor With further reference to FIG. 34A, a force sensing arrangement according to another aspect of the invention includes a disk 451 that is mounted to a shaft 445 in substantially the same manner as described above in connection with FIG. 34. However, in contrast to the arrangement of FIG. 34, the force sensor of FIG. 34A does not include pedals 443 mounted adjacent the input shaft 445 of alternator 11. Rather, the sensor of FIG. 34A includes teeth 52 along the outer circular perimeter of disk 450 to engage a belt such as belt 5A (FIG. 30), chain, or the like. Forces applied to the pedals is transmitted from the crank 2 (FIG. 30) through one or more belts 5, 5A to disk 450. Disks 450 and 451 are interconnected via spring members 416, such that forces applied to disk 450 cause disk 450 to move relative to disk 451 as the spring members 416 deflect/deform. An emitter/detector 430 can thereby measure the relative displacement between the disks, and the applied force can be calculated in substantially in the same manner as described in more detail above.

As discussed above, an encoder 8 may be connected to the alternator 11 to provide the position and/or velocity of the alternator. However, the emitter/detector 430 and openings 427 of the devices illustrated in FIGS. 34 and 34A may be configured to provide position data of shaft 445, such that encoder 8 is not required. According to this aspect of the present invention, the emitter/detector 430, in combination with the disks 450 and 451, provide for measurement of both the overall angular position of the shaft 445 and the relative angular displacement and/or velocity of disk 450 relative to disk 451. The emitter/detector 430 may comprise either a light-based device, or it may comprise an electromagnetic device.

The force detectors described above in connection with FIGS. 30-34A may be used alone to detect force to provide for control of the exercise device as described in more detail above. However, the force detectors of FIGS. 30-34A may also be used in combination with an estimated user force that is determined (estimated) from the alternator power as described in more detail above. If the force sensors of FIG. 30-34A are used in combination with the force estimate drive from the power used by the alternator, the system can be configured to be self-calibrated with respect to the force detected. Because the force detector described in FIG. 30-34A will generate a slightly different force calculation than the force estimated based upon the alternator power. These two sets of data can be compared utilizing software to determine a statistical correlation between the forced generated by the two methods, and thereby calibrate the bike to provide a more accurate force reading for each particular bike. Calibration of the force sensors in this way provides for more uniform force readings from bike-to-bike that might otherwise occur due to manufacturing tolerances, different environmental conditions, wear, and the like.

Furthermore, if the force detected utilizing, for example, a detector according to FIGS. 30-34A begins to diverge over a period of time from the force estimated based upon the alternator power, this divergence may signal wear, or other mechanical or electrical problems or breakdowns in the system. Utilizing the two force detection methods permits technicians to test for wear in certain components, and/or other problems that may be causing the disparity in force readings. As described in more detail above, the bike or exercise devise 1 may be connected to a network. A centralized server or the like may be configured to record and track disparity of force data collected from individual bikes equipped with dual force detection methods, which may signal the owner/user that service or maintenance is required. Such a signal could be by e-mail, website, or other suitable arrangement. Accordingly, utilization of two force sensors provides for a test and maintenance evaluation system for the exercise devices. It will be readably apparent that this dual force measurement approach may be utilized for a wide variety of exercise devices such as elliptical machines, rowing machines, stair climbers, or the like.

Also, as discussed above, bike 1 may include a D.C. electric motor to compensate for friction in bike 1, and to simulate downhill riding conditions. If bike 1 includes a D.C. motor, the power supplied to the motor can also be used to measure the friction of bike 1. For example, the controller may be configured to send a very small but gradually increasing amount of electric power to the D.C. motor when the bike 1 is not in use, while simultaneously monitoring the position of the pedals or other movable drive train components utilizing one or more position sensors. Once the force provided by the D.C. motor is just sufficient to overcome the static friction in the system, this force can be used as an estimate of the friction of the drive train components of the bike 1. This force can be measured periodically and stored, and successive measurements can be compared to prior measurements. In the event the force required to move the pedals changes substantially, the controller can be configured to generate a signal to the display 50, 350 indicating that the bike needs to be serviced and/or checked for wear or other problems. If the bike is connected to a network 301 (FIG. 26), the signal may be sent to a remote computer or bike.

Also, rather than measuring the force/power required to overcome static friction, the forced power required to maintain a preselected pedal R.P.M. may also be measured to determine the frictional losses of bike 1. If the friction changes over time, the controller can be configured to compensate, thereby calibrating the bike 1.

The friction testing may be done utilizing a network (FIG. 26) from a remote location. For example, a computer may be connected to each of the bikes 310-321 by the network 301.

The computer may be programmed to send a test signal to the bikes 310-321 on a periodic basis during a time when the bikes are not in use. If bikes 310-321 are at health clubs, the computer may be programmed to send a test signal to the bikes during a time period when the club is closed, and club employees are not present. This could be done every night, every other night, once a week, once a month, once a year, etc. In this way, the bikes 310-321 can be checked automatically from a central location. If the power (force) required to overcome friction (static or dynamite) for one or more of the bikes 310-321 changes (typically increases) more than a preselected amount and/or the power/friction exceeds a predetermined maximum value, the computer can generate a signal to personnel at a primary maintenance facility and/or to the individual health club facilities. A signal may also be sent to each bike 310-321 for which a potential problem exists, and the individual bikes then display a signal on display screen 50, 350 indicating a potential problem exists. Thus, the D.C. motor can be utilized to monitor the bikes 310-321 for potential problems, and it can also be utilized to initially calibrate the bikes 310-321, and to recalibrate the bikes 310-321 over a period of time to account for changes in the frictional drag and the bike that may occur as the bikes 310-321 wears.

Figure 35:
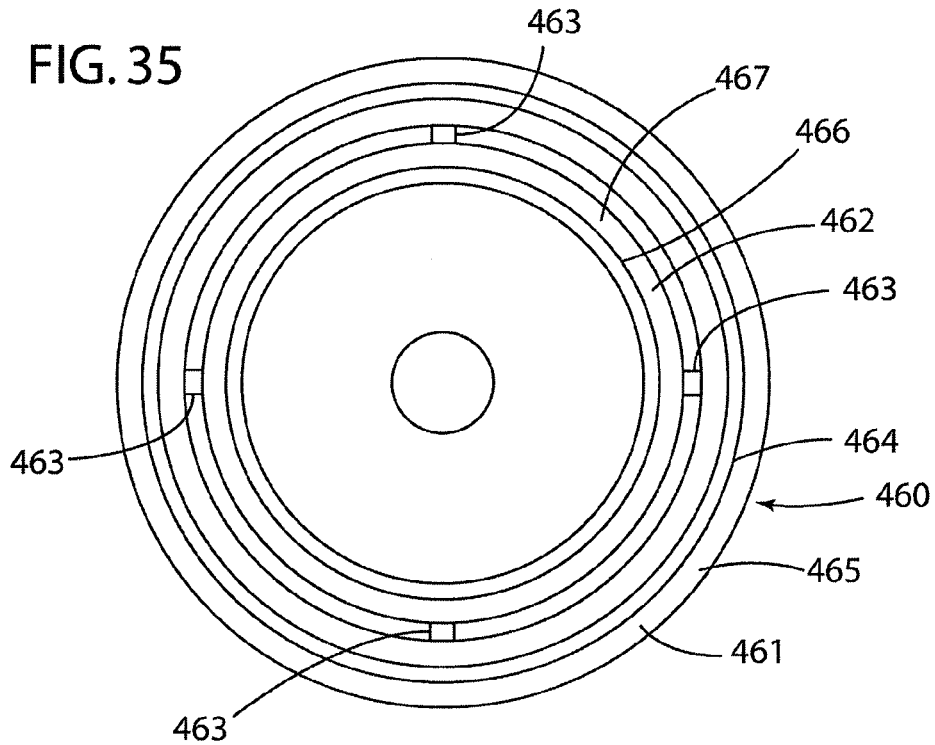
FIG. 35 is a partially fragmentary, schematic view of a force sensor arrangement according to another aspect of the present invention.
Figure 36:
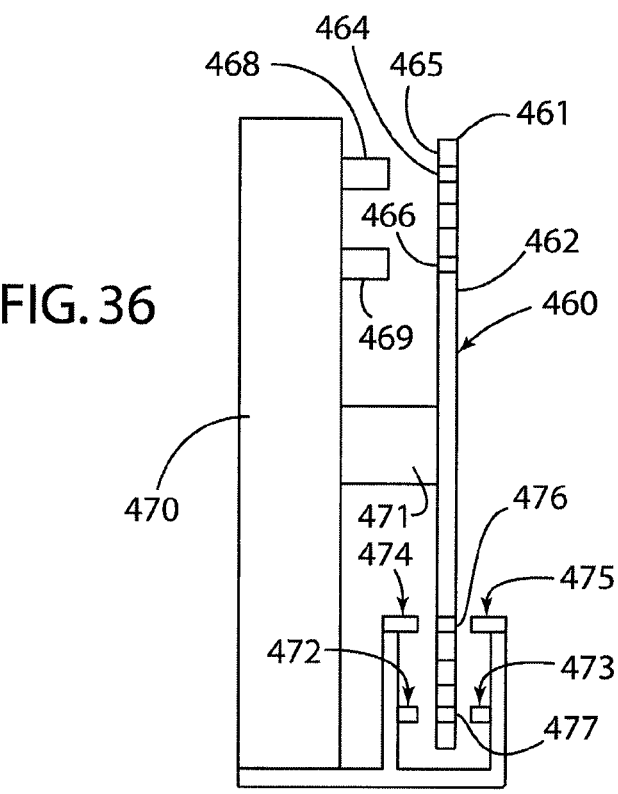
FIG. 36 is a partially schematic side elevational view of the force sensor of FIG. 35.

With reference to FIGS. 35 and 36, a force sensing arrangement according to another aspect of the present invention includes a disk assembly 460 including an outer ring 461 that is connected to an inner ring 462 via one or more spring connectors 463. A first reflective strip 464 is mounted to inner surface 465 of outer ring 461, and a second reflective strip 466 is mounted to inner surface 467 of inner ring 462. The reflective strips 464 and 466 form rings, and include a plurality of lines 422 forming groups of lines 423 in substantially the same manner as discussed above in connection with the arrangement of FIGS. 31-33. First and second emitter/detectors 468 and 469 are mounted to frame 470 in alignment with the reflective strips 464 and 466, respectively. Disk assembly 460 is rotatably mounted to the frame 470 of the bike by a shaft 471, and the pedals (not shown) are rigidly connected to the outer ring 461 of disk 460.

A force applied to the pedals is transmitted to the outer ring 461, and then through the spring connectors 463 into the inner ring 462. The force is then transmitted to the shaft 471. A drive pulley or gear such as the pulley 4 shown in FIGS. 1 and 1C may be fixed to the shaft 471 to thereby operably connect the pedals to the alternator. The emitter/detectors 468 and 469 sense the positions of the inner and outer rings 461 and 462, respectively, of the disk assembly 460 to a high degree of accuracy.

Instead of the emitter/detectors 468 and 469 separate emitters 472 and 474 and detectors 473 and 475 may be mounted on either side of the inner and outer disks 461 and 462, respectively. A series of openings 476 in disk assembly 460 align with emitter 474 and detector 475, and openings 477 in outer ring 461 align with emitter 472 and detector 473. Openings 476 and 477 are equally spaced from the axis of rotation of shaft 471 to form rings 464 and 466 of openings. As disk 460 and ring 461 rotate, detectors 473 and 475 generate a series of "pulses" as the openings 477 and 476, respectively, move past detectors 473 and 475. Because the spacing between the openings 476 and 477 is known, the time between the pulses can be utilized to determine the rotational rate of disk 460 and ring 461. Also, the change in timing of pulses from detector 473 relative to pulses from detector 475 can be used to determine a change in position of disk 460 relative to ring 461. For example, if pulses from detectors 473 and 475 occur at precisely the same moment if no force is applied to ring 461 by the pedals, a change in timing of the pulses will occur if springs 463 deflect upon application of a force. If the angular velocity of the disk 460 and ring 461 are known, the difference in pulse timing can be used to determine a relative change of position of disk 460 and ring 461. Such photo or electromagnetic sensors can determine the position of the inner and outer rings 461 with a high degree of accuracy. Because the position of the outer ring 461 changes relative to inner ring 462 upon application of a force by the rider, the change in relative angular positions between the inner and outer rings 461 and 462, respectively, can be utilized to determine the force input by a rider based upon the stiffness of the springs connectors 463. In this way, the force input by the rider can be determined and utilized in the control systems described above.

Figure 37:
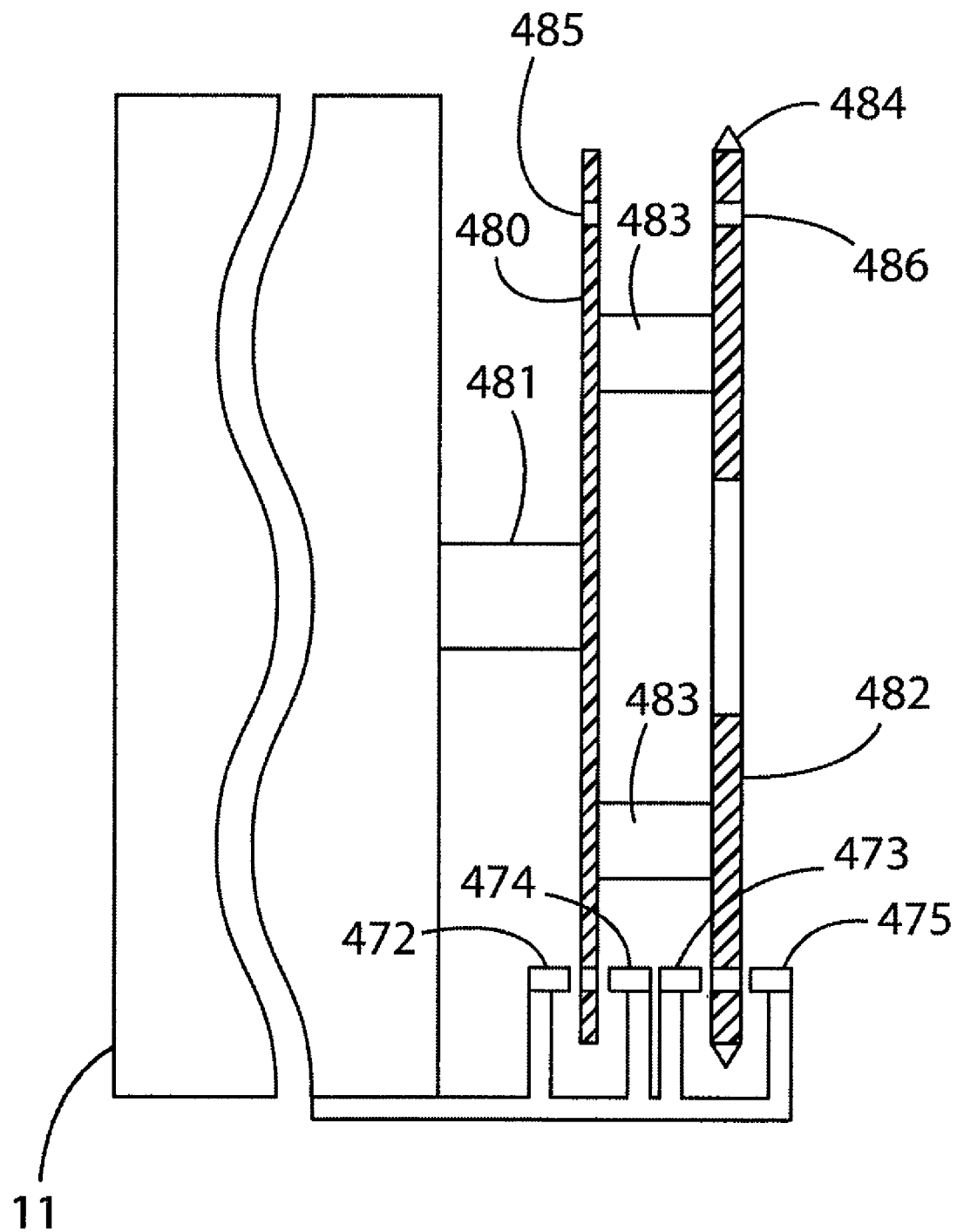
FIG. 37 is a partially schematic view of a force sensor according to another aspect of the present invention.

With further reference to FIG. 37, photo sensors with emitters 472 and 473, and detectors 474 and 475 may be also used on any of the apparatuses of FIGS. 31-34A in place of or as opposed to the combined emitter/detectors. A force sensing arrangement according to the aspect of the invention includes a disk 480 that is mounted to a shaft 481 in substantially the same manner as described above in connection with FIGS. 31, 34, and 34A. A second disk 483 is mounted to disk 480 by spring members 483. Teeth 484 on disk 482 engage a belt, chain, or the like, and the forces applied to disk 482 cause disk 482 to move relative to disk 480 as spring members 483 deflect. In contrast to the arrangements of FIGS. 31-34A, photo sensors are used to determine the position of the disks 480 and 482. Both disks 480 and 482 have identical series of holes 485 and 486 through the disks forming rings. The photo sensors with emitters 472 and 473, and detectors 474 and 475 sense the positions of the disks 480 and 482, respectively, to a high degree of accuracy. Force applied to the pedals may be transmitted from the crank 2 (FIG. 30) through one or more belts 5, 5A to disk 482 or directly via a drive shaft similar to 445 in FIG. 34. Because the position of disk 482 changes relative to disk 480 upon application of a force by the rider, the change in relative angular positions between disk 480 and disk 482, respectively, can be utilized to determine the force input by a rider based upon the stiffness of the spring connectors 483. In this way, the force input by the rider can be determined and utilized in the control systems described above.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A stationary exercise bike system, comprising:
 a support structure;
 a pair of pedals rotatably connected to the support structure;
 a force-generating device configured to provide a variable resistance force that varies an amount of force required to move the pedals;
 a controller operably connected to the force-generating device to selectively vary a resistance force of the pedals in a manner that tends to cause a rotational rate of the pedals to be synchronized with a musical beat of a preselected musical recording.

2. The stationary exercise bike system of claim 1, wherein:
 the stationary exercise bike provides variable resistance based, at least in part, on a hill angle corresponding to an apparent position on terrain being simulated.

3. The stationary exercise bike system of claim 2, wherein:
the variable resistance is increased and decreased relative to a zero degree hill angle when the apparent position correspond to uphill and downhill terrain, respectively.

4. The stationary exercise bike system of claim 3, wherein:
the stationary exercise bike comprises a first stationary exercise bike, and including:
a plurality of additional stationary exercise bikes that are operably connected to the first stationary exercise bike and provide variable resistances; and
wherein increasing and decreasing resistance provided by at least selected ones of the additional exercise bikes to simulate hills is synchronized such that the selected ones of the additional stationary exercise bikes provide increased and decreased resistance at substantially the same time.

5. The stationary exercise bike system of claim 4, wherein:
a selected one of the exercise bikes comprises a lead exercise bike defining an apparent position on the terrain being simulated, and wherein at least selected ones of the stationary bikes other than the lead exercise bike define apparent positions on the terrain being simulated that are substantially the same as the apparent position of the lead exercise bike.

6. The stationary exercise bike system of claim 5, wherein:
the system includes a compensating feature that provides different resistance levels for different users.

7. The stationary exercise bike system of claim 6, wherein:
the compensating feature comprises a gear rollout that is increased or decreased to provide different resistance levels for different users.

8. The stationary exercise bike system of claim 7, wherein:
each stationary exercise bike includes a controller that simulates inertial affects utilizing a difference between a calculated velocity and a measured velocity to determine a resistance to be provided to a user.

9. The stationary exercise bike system of claim 8, wherein:
the compensating feature varies the resistance of individual stationary bikes such that the pedal positions of the individual stationary bikes are substantially the same.

10. The stationary exercise bike system of claim 9, wherein:
the pedal positions are synchronized at a selected rotational rate.

11. The stationary exercise bike system of claim 10, wherein:
the selected RPM corresponds to a musical beat of music provided to at least some of the stationary exercise bikes of the system.

12. The stationary exercise bike system of claim 11, wherein:
the gear rollout for individual ones of the stationary exercise bikes is set based, at least in part, on fitness test results for individual users.

13. The stationary exercise bike system of claim 12, wherein:
the fitness test results include an average power output capability, and the gear rollout for individual stationary bikes is set to provide an effort level that is a fractional percentage of a lead user power output capability of a selected lead user.

14. The stationary exercise bike system of claim 6, wherein:
the compensating feature comprises a manual input device on each exercise bike that permits individual users to manually change the resistance levels.

15. The stationary exercise bike system of claim 6, wherein:
the compensating feature provides different hill angles for different users.

16. The stationary exercise bike system of claim 6, wherein:
each user has an ability level; and
each stationary exercise bike simulates frictional losses of an actual bike, and wherein the compensating feature includes adjusting the frictional losses to compensate for the ability levels of individual users.

17. The stationary exercise bike system of claim 6, wherein:
each user defines an ability level; and
each stationary exercise bike simulates wind resistance, and the compensating feature includes adjusting the wind resistance to compensate for the ability levels of individual users.

18. The stationary exercise bike system of claim 6, wherein:
each user defines an ability level; and
the stationary exercise bikes include internal bike models that determine a difference between a calculated variable and a measured variable and use the difference as an input to define a gain, and wherein the gain is adjusted to compensate for the ability levels of individual users.

19. The stationary exercise bike system of claim 6, wherein:
the ability level of each user is proportional to the average power output capability of each user as determined by a fitness test.

20. The stationary exercise bike system of claim 4, wherein:
the stationary exercise bikes are operably interconnected by a computer network.

21. The stationary exercise bike system of claim 20, wherein:
each stationary exercise bike includes a control system that simulates inertial effects utilizing a difference between a calculated velocity and a measured velocity.

22. The stationary exercise bike system of claim 21, wherein:
each stationary exercise bike includes a control system that simulates inertial effects utilizing a difference between a calculated force and a measured force.

23. The stationary exercise bike system of claim 1, including:
an electric motor that is operably connected to the pedals, and wherein:
the controller is operably connected to the electric motor, and wherein the controller causes the electric motor to provide power to the pedals in a manner tending to cause the pedals to rotate.

24. The stationary exercise bike system of claim 23, wherein:
the stationary exercise bike defines frictional power losses, and the power provided by the electric motor is less than the frictional losses during at least some operating conditions.

25. The stationary exercise bike system of claim 24, wherein:
the electric motor comprises a DC electric motor.

26. The stationary exercise bike system of claim 23, wherein:
the pedals define top dead center positions and bottom dead center positions, and wherein:

the electric motor provides power to the pedals at the top and bottom dead center positions.

27. The stationary exercise bike system of claim 23, wherein:
a force-generating device providing a resistance force to the pedals; and wherein:
the controller is configured to simulate inertial effects by controlling power provided by the electric motor to the pedals and the resistance force of the force-generating device.

28. The stationary exercise bike system of claim 1, including:
a force sensor configured to measure a force applied to the pedals by a user, wherein the force sensor measures a relative displacement of first and second points on the stationary exercise bike that are interconnected by a drive structure defining a stiffness whereby a force can be determined based on the relative displacement and the stiffness; and wherein:
the controller is operably connected to the force-generating device and the force sensor, and wherein the controller varies the resistance force generated by the force-generating device to simulate inertial effects based, at least in part, on a force measured by the force sensor.

29. The stationary exercise bike system of claim 28, wherein:
the first and second points rotate.

30. The stationary exercise bike system of claim 29, including:
a crank wheel that rotates with the pedals; and wherein:
the force-generating device comprises an alternator having a rotating member;
the force sensor includes a first encoder measuring a position of the crank pedals, and a second encoder measuring a position of the rotating member.

31. The stationary exercise bike system of claim 30, wherein:
the drive structure includes at least one elongated flexible drive member forming a loop.

32. The stationary exercise bike system of claim 31, wherein:
the elongated flexible drive member comprises a belt.

33. The stationary exercise bike system of claim 32, including:
a rotating shaft to which the pedals are fixed;
a first structure extending radially outward from the shaft and rotating with the shaft;
a second structure having a generally circular perimeter with a plurality of cogs on the perimeter engaging the elongated flexible drive member; and wherein:
the first point is on the first structure and the second point is on the second structure, and the drive structure extends between and interconnects the first and second structures such that force applied to the pedals is transmitted through the drive structure.

34. The stationary exercise bike system of claim 33, wherein:
the first structure comprises a disk.

35. The stationary exercise bike system of claim 34, wherein
the drive structure comprises a plurality of spring members.

36. The stationary exercise bike system of claim 33, wherein:
the force sensor comprises reflective material including a plurality of discrete reflective portions spaced at intervals, the sensor further comprising:

an emitter and detector mounted to the support structure, and wherein the other of the first and second structures includes an edge portion generally aligned with the discrete reflective portions such that a signal from the emitter is at least partially obscured by the edge portion and wherein relative movement of the first and second structures causes the edge portion to move relative to the reflective portions such that a signal received by the dector changes whereby a position of the first structure relative to the second structure can be determined based on a signal strength received by the detector.

37. The stationary exercise bike system of claim 33, wherein:
the emitter and detector utilize light to generate the signal.

38. The stationary exercise bike system of claim 36, wherein:
the emitter and detector utilize electromagnetic waves to generate the signal.

39. The stationary exercise bike system of claim 36, wherein:
the first structure comprises a disk, and the second structure defines a circular perimeter and includes a plurality of cogs extending around the perimeter, and wherein the disk includes at least one opening therethrough forming the edge portion.

40. The stationary exercise bike system of claim 29, wherein:
the pedals rotate about an axis of rotation, and
the force-generating device includes a rotating output member; and including:
first and second arms extending away from a first rotating base portion, and wherein the axis of rotation passes through the rotating base portion and a first one of the pedals is mounted to an end portion of the first arm and a second one of the pedals is mounted to an end portion of the second arm, and wherein the second pedal defines first and second opposite sides and the end portion of the second arm is positioned adjacent the first opposite side of the second pedal;
a third arm extending away from a second rotating base portion and defining an end portion positioned adjacent the second opposite side of the second pedal; and wherein:
the second rotating base portion is connected to the rotating output member.

41. The stationary exercise bike system of claim 40, wherein:
first and second bearings; and wherein:
the first and second rotating base portions comprise first and second shaft sections, respectively, and wherein the first and second shaft sections are rotatably connected to the support structure by the first and second bearings, respectively.

42. The stationary exercise bike system of claim 41, wherein:
the axis of rotation comprises a first axis of rotation;
the rotating output member defines a second axis of rotation that is coaxial with the first axis of rotation.

43. The stationary exercise bike system of claim 41, wherein:
the rotating output member is fixed to the rotating base portion and rotates at the same angular velocity as the rotating base portion.

44. The stationary exercise bike system of claim 28, wherein:
the force-generating device includes a rotating output member and an emitter and a detector mounted to the support structure; and including:
a first disk fixed to the rotating output member, the first disk having at least one edge portion; and
a second disk mounted to the first disk by at least one spring member forming the drive structure, the second disk defining a first surface facing the first disk and including a perimeter having a plurality of cogs disposed about the perimeter, and a plurality of discrete reflective portions on the first surface generally aligned with the reflective portions such that a signal from the emitter is at least partially obscured by the edge portion whereby relative movement of the first and second disks changes a signal strength detected by the detector such that a change in position of the first disk relative to the second disk can be determined.

45. The stationary exercise bike system of claim 44, wherein:
the emitter and detector utilize light to generate the signal.

46. The stationary exercise bike system of claim 44, wherein:
the emitter and detector utilize electromagnetic waves to generate the signal.

47. The stationary exercise bike system of claim 44, wherein:
an encoder mounted to the rotating output member.

48. The stationary exercise bike system of claim 44, wherein:
the first disk includes a plurality of openings forming a plurality of edge portions.

49. The stationary exercise bike system of claim 28, wherein:
the discrete reflective portions form a ring.

50. The stationary exercise bike system of claim 28, including:
a shaft rotatably mounted to the support structure;
a first structure fixed to the shaft and extending radially outwardly from the shaft;
a second structure connected to the first structure by the drive structure, wherein the drive structure extends radially outwardly from the first structure;
a plurality of discrete reflective surfaces on the first and second structures with substantially non-reflective surfaces between the discrete reflective surfaces;
a first emitter configured to generate a signal that is reflected from the discrete reflective surfaces on the first structure;
a first detector configured to detect a signal from the first emitter that is reflected from the discrete reflective surfaces on the first structure;
a second emitter configured to generate a signal that is reflected from the discrete reflective surfaces on the second structure;
a second detector configured to detect a signal from the second emitter that is reflected from the discrete reflective surfaces on the second structure, whereby the position of the first structure relative to the second structure can be determined based on the signals detected by the first and second detectors, and wherein the drive structure has a predetermined stiffness such that a magnitude of a force transmitted through the drive structure can be determined.

51. The stationary exercise bike system of claim 50, wherein:
the first structure comprises a disk, and the second structure comprises a ring.

52. The stationary exercise bike system of claim 51, wherein:
the drive structure comprises a plurality of spring members.

53. The stationary exercise bike system of claim 28, including:
a shaft rotatably mounted to the support structure;
a first structure fixed to the shaft and extending radially outwardly from the shaft, the first structure defining first and second opposite sides and a plurality of openings extending through the first structure;
a second structure connected to the first structure by the drive structure such that a force applied to the pedals is transmitted from the first structure to the second structure, the second structure defining first and second opposite sides, and a plurality of openings extending through the second structure;
a first emitter mounted on the support structure on the first side of the first structure such that a signal from the first emitter passes through the openings through the first structure as the first structure rotates;
a first detector mounted on the support structure on the second side of the first structure such that the first detector detects signals from the first emitter when the signals pass through the openings in the first structure;
a second emitter mounted on the support structure on the first side of the second structure such that a signal from the second emitter passes through the openings through the second structure as the second structure rotates;
a second detector mounted on the support structure on the second side of the second structure such that the second detector detects signals from the second emitter when the signals pass through the openings in the second structure;
whereby a position of the first structure relative to the second structure can be determined based on signals detected by the first and second detectors.

54. The stationary exercise bike system of claim 53, wherein:
the first structure comprises a disk, and the second structure comprises a ring.

55. The stationary exercise bike system of claim 54, wherein:
the drive structure comprises a plurality of springs.

56. The stationary exercise bike system of claim 53, wherein:
the first and second emitters emit light, and the first and second detectors detect light.

57. The stationary exercise bike system of claim 28, including:
a first disk member rotatably connected to the support structure for rotation about an axis of rotation, and defining first and second opposite sides and a plurality of openings through the first member;
a second disk member connected to the first disk member by the drive structure, the second disk member defining first and second opposite sides and including a plurality of openings therethrough, and wherein the first and second disk members are spaced apart along the axis of rotation;
a first emitter positioned on the first side of the first disk member;

a first detector positioned on the second side of the first disk member whereby a signal from the first emitter passes through the openings through the first disk such that it can be detected by the first detector;

a second emitter positioned on the first side of the second disk member;

a second detector positioned on the second side of the second disk member whereby a signal from the second emitter passes through the openings through the second disk such that it can be detected by the second detector;

whereby differences between signals received by the first and second detectors is utilized to determine a relative position of the first and second disk members to thereby calculate a force transmitted between the first and second disk members through the drive structure.

58. The stationary exercise bike system of claim 57, wherein:
the drive structure comprises a plurality of spring members.

59. The stationary exercise bike system of claim 57, wherein:
the openings through the first disk member form a first ring;
the openings through the second disk form a second ring; and
the first and second rings are circular with substantially the same diameter.

60. The stationary exercise bike system of claim 57, wherein:
a selected one of the first and second disk members has a circular perimeter and a plurality of cogs extending about the perimeter.

61. The stationary exercise bike system of claim 60, wherein:
the force-generating device includes a rotating output member, and wherein the first disk member is mounted to the rotating output member.

62. The stationary exercise bike system of claim 1, including:
a sensor configured to determine a measured rotational velocity of the pedals; and
wherein:
the controller causes the resistance force to vary to simulate inertial effects of a rolling bike, and wherein the controller utilizes the measured rotational velocity of the pedals in determining the resistance force, and wherein the measured rotational velocity is modified by a gear rollout value to define a velocity input that is utilized by the controller to simulate inertial effects.

63. The stationary exercise bike system of claim 62, wherein:
the measured rotational velocity is multiplied by the gear rollout value.

64. The stationary exercise bike system of claim 63, wherein:
the gear rollout value is selected from a plurality of discrete gear rollout values corresponding to actual gear ratios.

65. The stationary exercise bike system of claim 64, wherein:
the stationary exercise bike includes an input feature whereby a user can manually select a gear rollout from a plurality of gear rollouts.

66. The stationary exercise bike system of claim 64, wherein:
the controller is programmed to select a gear rollout during operation based, at least in part, upon predefined criteria.

67. The stationary exercise bike system of claim 66, wherein:
the predefined criteria include a user's ability level that has been entered into the system.

68. The stationary exercise bike system of claim 63, wherein:
the controller determines a virtual velocity utilizing the principle of conservation of momentum;
the controller determines a difference between the velocity input and the virtual velocity, and wherein the difference is multiplied by a gain to control the resistance force.

69. The stationary exercise bike system of claim 68, wherein:
the stationary exercise bike is operably connected to a plurality of stationary exercise bikes having controllers that are configured to simulate inertial effects in substantially the same manner as the controller of the first stationary exercise bike;
at least a selected one of the plurality of stationary exercise bikes determines a gear rollout based on at least a selected one of the operating parameters of the first stationary exercise bike.

70. The stationary exercise bike system of claim 69, wherein:
the stationary exercise bikes are configured to provide resistance forces that simulate riding a bike along a predefined course and define positions on the course, and wherein the controllers of the at least two of the stationary exercise bikes are configured such that the two stationary exercise bikes stay at substantially the same positions relative to one another on the course; and
the controller of at least one of the two stationary exercise bikes varies the gear rollout to adjust an effort required of a user.

71. The stationary exercise bike system of claim 62, wherein:
the gear rollout comprises a plurality of discrete numerical values.

72. The stationary exercise bike system of claim 71, wherein:
the discrete numerical values correspond to gear ratios of an actual bike.

73. The stationary exercise bike system of claim 62, wherein:
the gear rollout comprises a substantially continuously variable numerical value.

74. The stationary exercise bike system of claim 73, wherein:
the gear rollout is determined by interpolating a plurality of discrete gear rollouts.

75. The stationary exercise bike system of claim 23, wherein:
the controller is configured to determine how much force the D.C. motor requires to rotate the pedals to thereby determine frictional losses of the stationary exercise bike.

76. The stationary exercise bike system of claim 75, wherein:
the controller stores frictional loss data and compares current loss data to stored frictional loss data to determine if a change in frictional losses exceeds a predefined amount.

77. The stationary exercise bike system of claim 75, wherein:
the controller is operably connected to a network, and information pertaining to the frictional losses is transmitted over the network to a remote receiver.

78. The stationary exercise bike system of claim 23, wherein:

the controller is configured to cause the electric motor to move the pedals at a first time, and to determine a first amount of electrical power required to move the peals at the first time, and wherein the controller is configured to move the pedals a second time that is seven days after the first time, and to determine a second amount of electrical power required to move the pedals at the second time, and wherein the controller is configured to determine a difference between the first and second amounts of power and to compare the difference to a predefined value.

* * * * *